United States Patent [19]

Yaksich et al.

[11] Patent Number: 5,563,998

[45] Date of Patent: *Oct. 8, 1996

[54] FORMS AUTOMATION SYSTEM IMPLEMENTATION

[75] Inventors: Mary J. Yaksich, Grand Island; Andrew C. Andersen, Williamsville; Samuel D. Bevilacqua, Tonawanda; Donald S. Carr, Kenmore; Susan M. Hoellig, Cheektowaga, all of N.Y.; Anthony P. Hoholik, Garnee, Ill.; Darlene R. Sprague, Grand Island; Donna L. Yarwood, Amherst, both of N.Y.

[73] Assignee: Moore Business Forms, Inc., Grand Island, N.Y.

[ * ] Notice: The term of this patent shall not extend beyond the expiration date of Pat. No. 5,563,999.

[21] Appl. No.: 598,883

[22] Filed: Oct. 19, 1990

[51] Int. Cl.[6] ................................ G06F 17/60
[52] U.S. Cl. ................................ 395/149
[58] Field of Search .................. 395/149, 148, 395/153, 154, 161, 200, 600

[56] References Cited

U.S. PATENT DOCUMENTS

| | | | |
|---|---|---|---|
| 4,495,582 | 1/1985 | Dessert et al. | 364/469 |
| 4,571,699 | 2/1986 | Herzog et al. | 395/200 |
| 4,598,376 | 7/1986 | Burton | 364/470 |
| 4,649,513 | 3/1987 | Martin et al. | 364/900 |
| 4,712,929 | 12/1987 | Kitaoka | 400/76 |
| 4,714,995 | 12/1987 | Materna et al. | 395/600 |
| 4,839,829 | 6/1989 | Freedman | 364/519 |
| 4,870,611 | 9/1989 | Martin et al. | 364/900 |
| 4,939,670 | 7/1990 | Freiman et al. | 364/519 |
| 5,091,868 | 2/1992 | Pickens et al. | 395/148 |

FOREIGN PATENT DOCUMENTS

| | | |
|---|---|---|
| 388579 | 9/1990 | European Pat. Off. . |
| 63-066632 | 3/1988 | Japan . |
| 2202064 | 9/1988 | United Kingdom . |

OTHER PUBLICATIONS

IBM FAWN brochure, IBM Corporation, White Plains, New York; Jun., 1989; Four pages document.

Kerrigan, "Electronic Form Systems . . . "; Business Forms & Systems, vol. 26, No. 10, May, 1988, p. 42.

Fan et al, "FormPlus: A Form Authoring Toolkit"; Proceedings of the 14th Int'l. Computer Software & Applns. Conference, 1990; pp. 255–260.

*Primary Examiner*—Heather R. Herndon
*Assistant Examiner*—Anton W. Fetting
*Attorney, Agent, or Firm*—Nixon & Vanderhye P.C.

[57] ABSTRACT

A system and method for the electronic design, storage, and distribution of business forms maximizes all of these functions, utilizing a forms automation platform and a central library facility. The forms automation platform includes customer profile, form profile, form field description, and distribution information files each having a unique customer identifier, and typically also having a unique form identifier, and including detailed information about each form. The central library facility includes customer profile, geographic profile, printer profile, distribution data, form profile, and form output format files; again unique customer identifiers, as well as specific form identifiers, are provided. Forms are automatically distributed by the central library facility to end user sites, at which remote computers are located, by polling for forms to be released, establishing a session with the end users to which release is to be made, and then electronically transferring the forms. Form profile information that is typically stored—in order to effectively process requests—include the software package used to design the form, a description of the form, the date of form creation and/or last revision, the number of parts, whether the form has landscape or portrait mode, the length, and the width of the form.

20 Claims, 27 Drawing Sheets

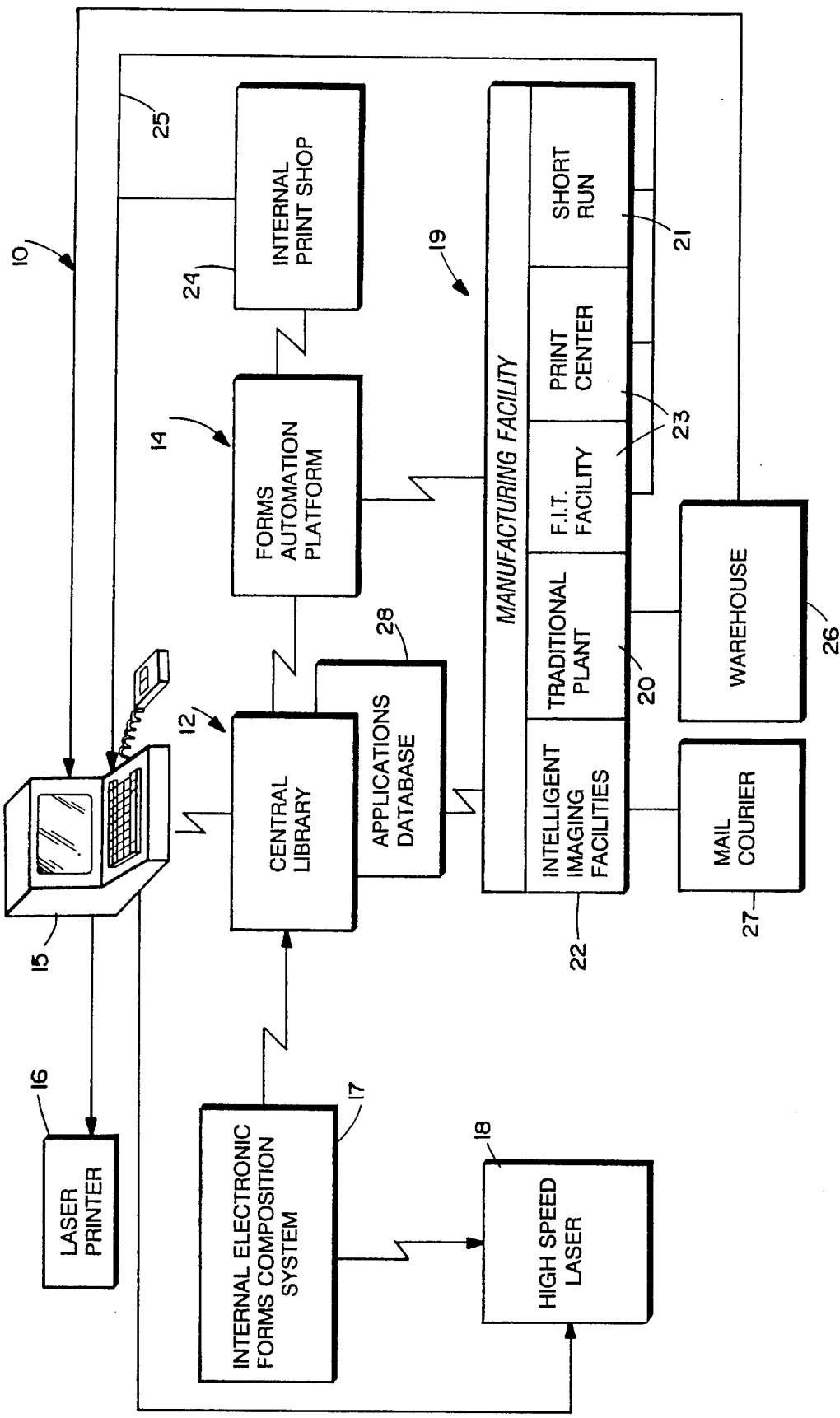

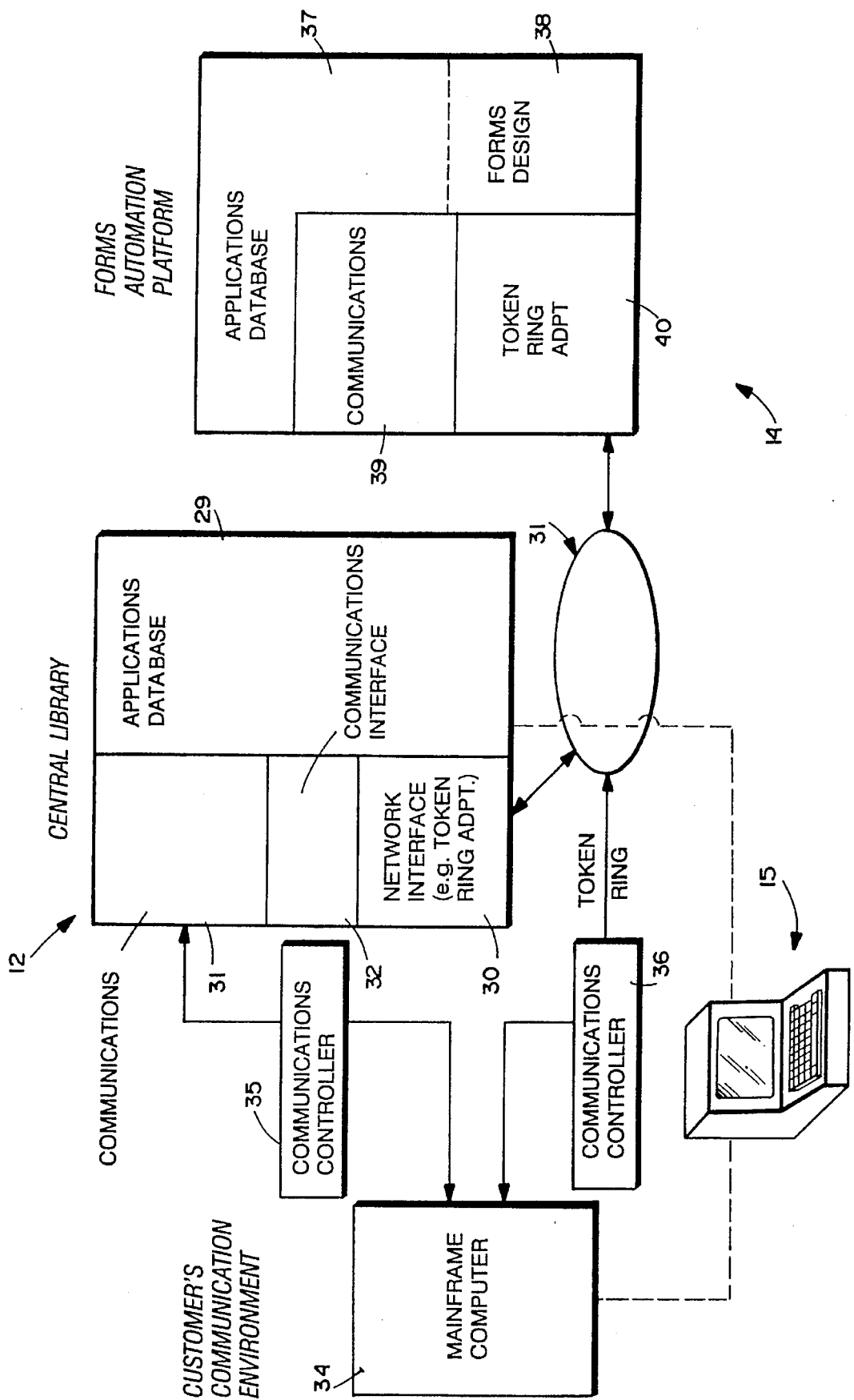

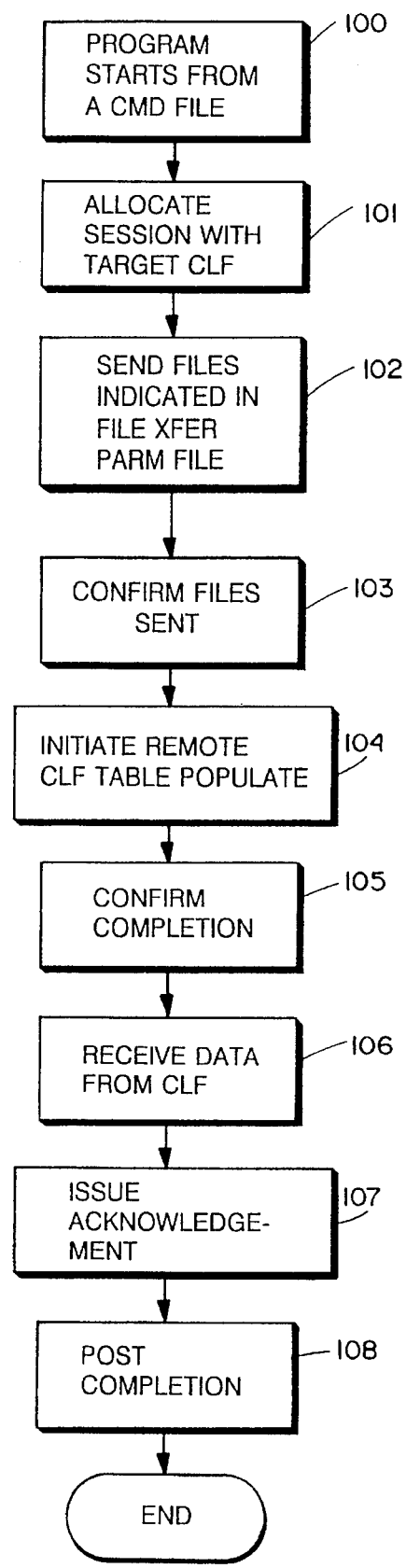
Fig. 9 FAP>CLF

CLF

CENTRAL LIBRARY FACILITY DATA MODEL DIAGRAM

SEND FORM

SEND PRINT REQUEST

FORMS AUTOMATION SYSTEM IMPLEMENTATION

BACKGROUND AND SUMMARY OF THE INVENTION

Conventionally, large organizations that use large volumes of many different types of business forms have the forms printed in paper form internally or by a manufacturer of business forms, and then store the forms in one or more warehouses for distribution to each of the geographically remote user locations of that organization. Distribution costs can be significant, especially if the locations are widely disseminated, and there can be significant costs associated with the warehousing, inventory and obsolescence of preprinted paper forms. If attempts are made to do away with inventorying of preprinted forms, electronic forms may be stored for printing of paper forms on demand, however typically systems capable of electronic storage and retrieval are marketed by vendors supplying only one type of equipment, so that the systems are not versatile enough to be utilized even within a single location of the organization unless all printers and related equipment at that location are compatible. Further, such systems do not have conventional preprinted forms manufacture integrated therewith, and are therefore limited.

Also, when new forms are required, they are typically designed at a location where the need for the form is first recognized. The newly designed form may, or may not, become part of the forms package available to other interested parts of the organization, and even if it ultimately becomes available, may go through a redundant design sequence before being adopted by the organization headquarters. Usually, no centralized forms facility is provided, requiring redundant entry and processing of information in electronic or hard copy format.

According to the present invention, a detailed implementation is provided for a system and method which overcome the major elements of the problems identified above. According to the present invention, it is possible for a large consumer of forms, having numerous geographically remote user locations with varying needs for many different types of forms, to eliminate or minimize the warehousing, inventory, and obsolescence costs associated with preprinted forms, to minimize the number of preprinted forms utilized, to minimize redundant entry and processing of information, and to provide centralized design, control and management of electronic forms. According to the invention, the same form may be printed at a number of geographically remote locations on different types of printers, the forms can be distributed and updated automatically and efficiently, and if a form is needed but not readily reproducible on in house equipment, an order for the form may be transmitted to a vendor's manufacturing facility or facilities (e.g. located geographically proximate the remote user locations to be served) for production and distribution.

The system according to the invention comprises as basic components first and second computer means, which comprise a central library facility (CLF), and a forms automation platform (FAP). Two way communication is provided between the CLF and FAP by appropriate communications software and protocol modules. The CLF is typically located at a centralized facility of the forms consumer (customer), while the FAP is typically located at a centralized facility of the vendor (forms manufacturer), although it may be located wherever convenient for performing the desired tasks to a particular customer's satisfaction. A third computer means; typically a PC, is located at end user sites to communicate with the CLF and receive distributed forms therefrom.

The primary functions that take place at the FAP are: electronic forms design (at a centralized location), using one or more conventional design packages such as PERFORM, F3, JETFORM or MECA III; creating, maintaining, updating, and ensuring the integrity of a display image library; logically associating print formats and distribution profile information received for each form within the display image library; converting display images to print formats based on the distribution profile specified for each form; downloading the print images to the CLF; executing electronic forms update processing; communication with the CLF; and communication with other print facilities (e.g. a manufacturer of business forms, and internal print shop, or the like). A release date is entered at the FAP, and managed at the CLF.

A FAP may service multiple CLFs and must then associate specific forms with specific CLFs. The FAP will generate print formats based on those printers supported by the customer to which the forms will be distributed.

The major functions of the CLF are file management and distribution, including the collection, assimilation and output of management information. The CLF also logically associates formats (print formats) and distribution profile information received for each form. The CLF electronically stores all of the forms previously supplied by the FAP, and effects transmission thereof to remote locations having use for them, and effects display or printing of forms—regardless of exact printer configuration—at the remote user locations. The CLF collects and downloads the form images to the end users (i.e. the third computer means) on a release date, after polling of the computer in which they are located. This may be done completely automatically, or after manual verification.

According to one aspect of the invention, a method is provided comprising the steps of: (a) at a centralized location, storing the plurality of business forms in electronic format including by providing each with the following data associated therewith: identification code for the form; verbal description of the form; software package used to design the form; date of form creation and/or last revision; number of parts to the form; whether the form has landscape or portrait mode; length of the form; and width of the form; (b) based upon geographic location, volume requirements, form construction, and equipment profile, determining which of the geographically remote use locations will be provided with business forms in electronic and/or preprinted form, and storing that information at said centralized location; and (c) through electronic scheduling or in response to commands inputted at the centralized location, automatically distributing forms in electronic and/or preprinted form from the centralized location to the geographically remote use locations for that particular form, according to the determinations provided in step (b).

According to another aspect of the invention, a method is provided utilizing first and second computers at different locations and comprising the steps of: (a) at the first computer, creating a plurality of business forms in electronic format, including printer formats; (b) allocating a session with the second computer; (c) designating appropriate business forms for transfer; (d) electronically transferring the designated forms from the first computer to the second computer; (e) confirming that the transfer has taken place; and (f) initiating a table population function at the second computer, and confirming when that function has been completed.

A system for producing business forms according to the invention comprises: first computer means comprising a forms automation platform means: for establishing each of a plurality of business forms in electronic format; for determining print format information for the forms; and for converting the electronic format to appropriate print formats based upon the distribution profile information and print format information, to design a business form in electronic format; second computer means at each of a plurality of end user sites; third computer means comprising a central library means: for processing requests for distribution to effect electronic distribution of forms; and for providing information about print formats and distribution profiles to the second computer means, the means including a display and an inputting means for inputting commands regarding the specific business form or forms requested, and for inputting variable information, if any, to be contained in the business forms to be produced; communications means for providing communication between the forms automation platform means and the central library means, and between the central library means and the end user sites; and the third computer means comprising a file comprising customer profile information including an identification uniquely identifying each customer, and address information for the customer; a geographic profile including the customer identification and a unique code for each different geographic location of the customer's facilities; a printer profile file including the customer identification, and a code identifying each printer, and the type of printer, at each geographic location of the customer; a distribution data file including the customer identification, a code to uniquely identify each form for a customer, and the code to uniquely identify each printer; a form profile data file including the customer identification, and the code to identify each form for a customer; and a form output file including the customer identification, and the code to uniquely identify each form of the customer.

The first computer means of the above system may have a customer profile file including an identifier uniquely identifying a customer and a customer's address; a form profile file including the unique customer identifier, a unique identifier of a form for a customer, and physical information about the form; a form file name file including the unique customer identifier and unique identifier for the form, and the type of printer the form is designed for; and a distribution information form including the unique customer identifier, an indicator of whether or not a form has been selected for distribution to the third computer means, the unique form identifier, and the date of distribution of the form.

Another method according to the invention comprises the steps of: (a) storing in electronic format in a computer a plurality of different business forms; (b) also storing in the computer predefined commands, including date and extent of distribution commands, relating to the distribution of the electronic business forms; (c) periodically polling the computer to locate applicable data commands; (d) identifying forms for distribution in the computer; (e) establishing a session between the computer and an end user; (f) transferring the forms electronically from the computer to the end user; and (g) acknowledging receipt of the forms by the end user from the computer.

It is the primary object of the present invention to provide for the detailed implementation necessary to effective and efficient creation and production of electronic and preprinted business forms for large consumers of forms having multiple locations. This and other objects of the invention will become clear from an inspection of the detailed description of the invention, and from the appended claims.

BRIEF DESCRIPTION OF THE DRAWINGS

FIG. 1 is a schematic block diagram comprising a high level functional overview of an exemplary system which is implemented according to the invention;

FIG. 9 is a flow diagram illustrating access to the CLF from the FAP;

DETAILED DESCRIPTION OF THE DRAWINGS

Figure 2:
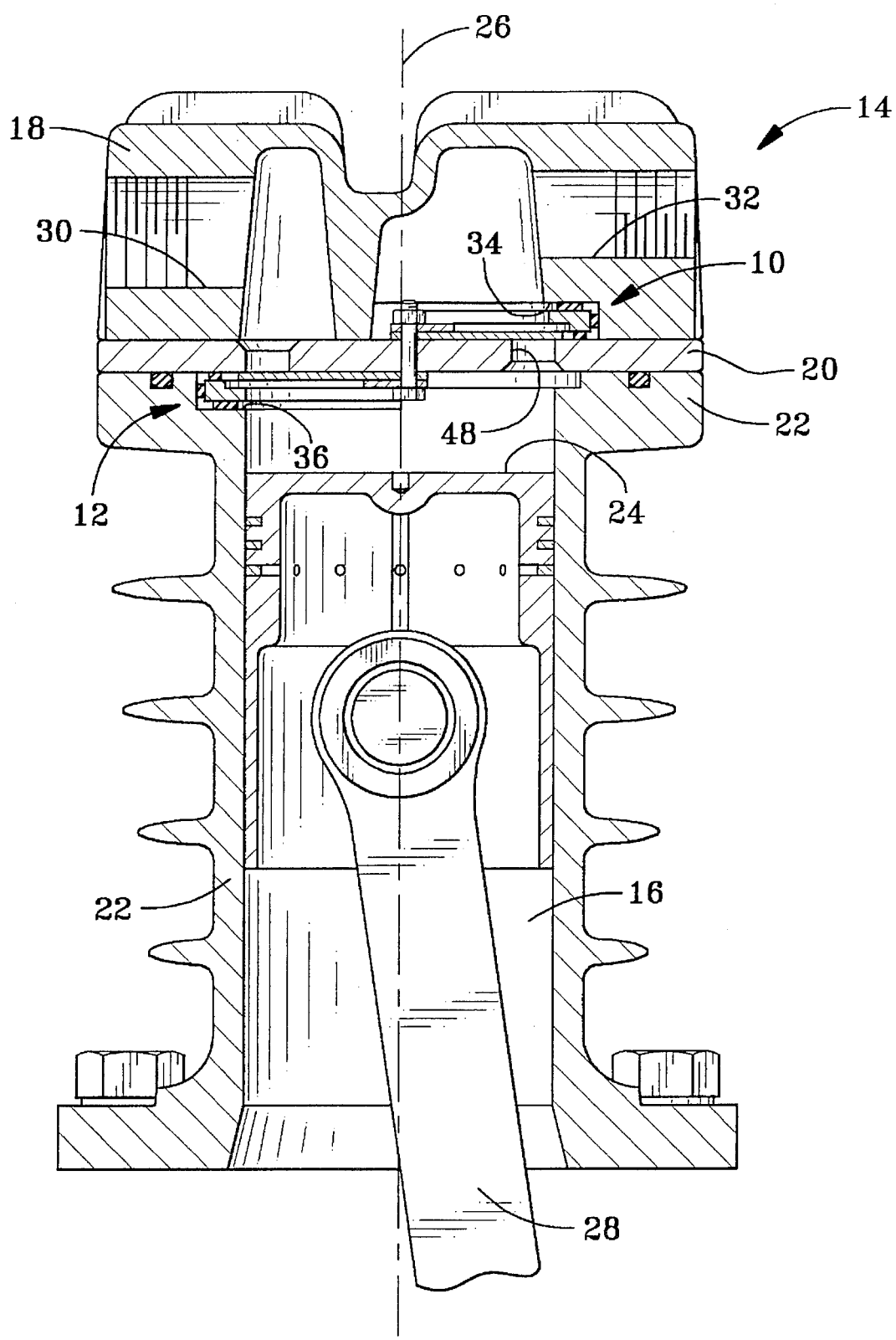
FIG. 2 is a block diagram showing one embodiment of a more detailed interrelationship between the components of the FIG. 1 system.

The forms automation system according to the present invention is illustrated generally by reference numeral 10 in FIGS. 1 and 2. The forms automation system 10 will be utilized by those consumers of business forms who have large numbers of business forms (both type and amount) that will be utilized at a number of geographically remote use locations. The system 10 is designed to be marketed by a business forms manufacturing company that has conventional forms production facilities, although it could be marketed by a wide variety of different types of companies. The system 10 is particularly useful when it it implemented in such a way that forms may be produced directly at the use locations, or in a conventional manufacturing facility, depending upon the construction of that particular form, the extent of its distribution, the quantity of forms utilized, and the like.

In this description, the term "vendor" or "manufacturer" when utilized refers to the entity providing the forms automation system according to the invention, typically a conventional business forms manufacturer. The term "customer" or "user" refers to the vendor's customer, namely the organization that has a plurality of geographically remote use locations, and consumes the business forms (also encompassing multiple departments that are remote within the same building, for example).

The major objectives of the system 10 are to provide for the centralized design of business forms, the centralized management and distribution of electronic and pre-printed (paper) forms, the co-existence of the same form in both paper and electronic formats, and the flexibility to meet the user's requirements. The major components of the system 10 comprise computer means providing the central library facility (hereinafter denoted by the acronym "CLF") 12, and computer means providing the forms automation platform (hereinafter denoted by the acronym "FAP") 14. The CLF 12 is preferably located in one of the customer's facilities (e.g. the same facility that has the main frame computer 34). This also typically is one of the use locations. The FAP 14 may, under some circumstances, be located at a customer's facility, but more typically is located at one of the vendor's facilities. In any case, the CLF 12 and FAP 14 provide for centralized design, management, and distribution of business forms. Appropriate conventional communications components are provided to inter-relate the CLF 12 and FAP 14, and to communicate with a variety of other stations.

In the schematic illustration in FIG. 1, the end user station 15 comprises a plurality of geographically remote use locations, each of which may have a printer—such as a laser printer 16—associated therewith. A computer, such as a PC, is provided at each of the use stations 15, as schematically illustrated in FIGS. 1 and 2, interfaced (two way communication) with the CLF 12. The PC and CLF may utilize IBM's OS/2 (version 1.2), or an equivalent multi-tasking operating system.

The CLF 12 may also control an internal electronic forms composition system 17 maintained by the organization having the geographically remote use locations 15, which may in turn control a high speed printing device, such as a high speed laser printer 18, or other non-impact printer. Both the CLF 12 and FAP 14 may also provide information to a standard business forms manufacturing facility, shown generally by reference numeral 19, for producing business forms. For example, the CLF 12 could access facility 19 through an external applications data base 28. Different types of manufacturing facilities encompassed by facility 19 may—for a large conventional business forms manufacturer such as Moore Business Forms, Inc.—include a traditional plant 20, a short run facility 21, an intelligent imaging facility 22, or other types of facilities 23. Also, the FAP 14 may control an internal print shop 24 at the FAP 14 location, for providing camera ready copy. The printing facilities 21, 23, and 24 deliver printed forms—as indicated by line 25—to the use locations 15 via a motor vehicle or the like (e.g. a common carrier), while the traditional plant 20 supplies paper forms to the use locations 15 through a warehouse 26 run by the forms manufacturer, a contractor, or another. The imaging facilities 22 typically provide paper forms to the use locations 15 via mail or a courier service 27 or the like.

As illustrated schematically in FIG. 2, the CLF 12 includes an internal applications data base 29 (and associated database access mechanisms), and includes as part of the preferred embodiment communication facilitating components thereof, such as a vendor supplied token ring (or other network adapter) 30 communicating with an (e.g. token ring) electronic data network 31. The applications data base 29 may have as its data model "SQL", a commercially available package, such as that sold by IBM with its OS/2 (version 1.2) system. A conventional communications interface component 32, such as an IBM 3270 standard protocol interface, is also preferably provided, as is the communications protocol module 33. The CLF 12 may be provided on main frame computer 34 directly at a customer (user's) location, with a front end processor 35—such as an IBM 3745/3720—interconnected between the module 33 and the computer 34, and a front end processor 36—e.g. an IBM 3745/3720—connected between the main frame computer 34 and the token ring network 31.

The forms automation platform 14 includes a commercially available applications database 37 (such as that sold by Oracle Systems Corp. under the trademark "Oracle"), with a component thereof 38 providing custom design of the forms. The forms design function is preferably accomplished utilizing a compatible commercially available primary design software package, such as Perform, sold by Delrina Technology, JETFORM, sold by Indigo, or MECCA III ("DOCS"), sold by Amgraph. A communications protocol module 39 is also utilized (such as an IBM SDLC), while the token ring adapter 40 is provided for optional communications over token ring network 31.

Figure 4:
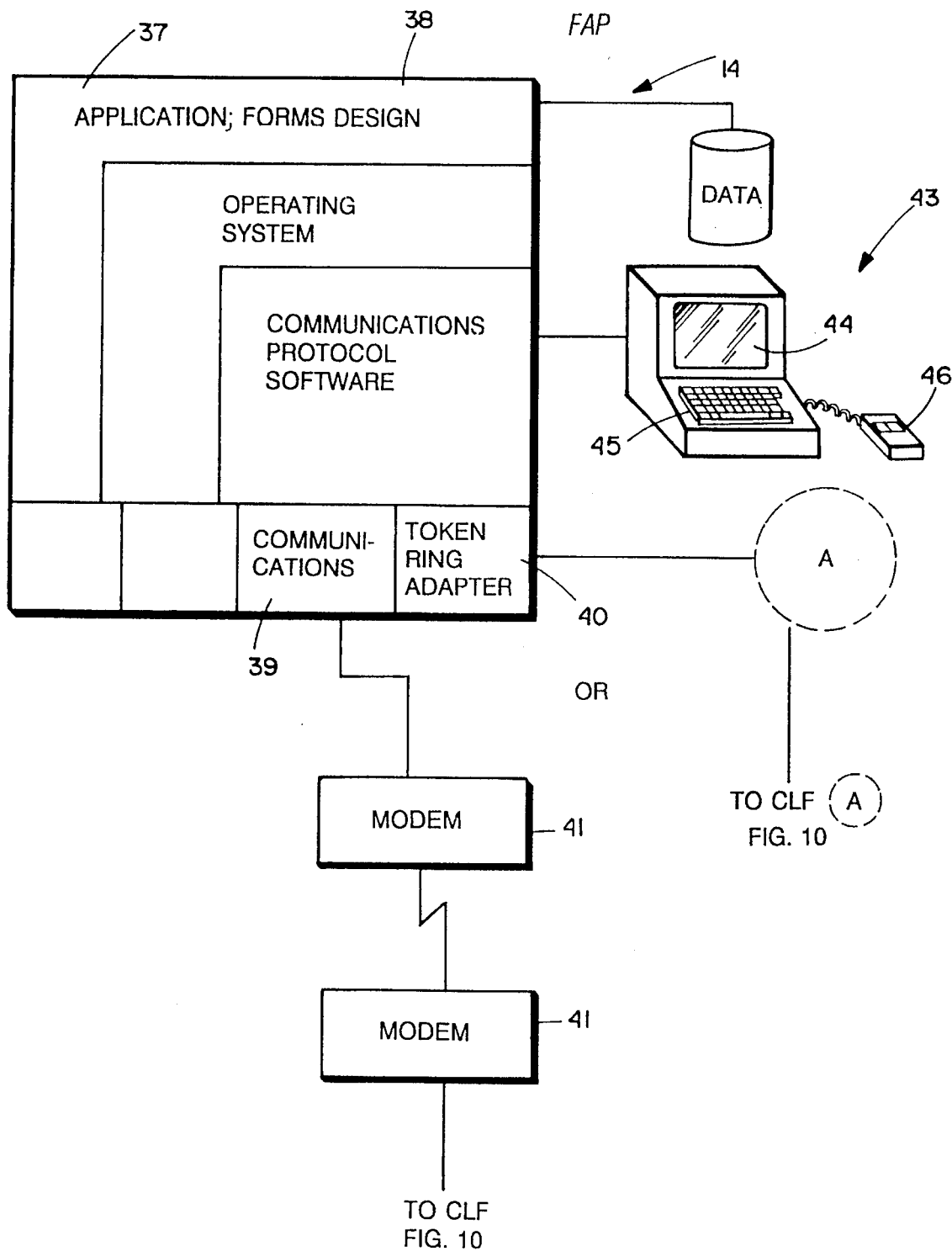
FIG. 4 is a schematic view of the FAP.

One of the primary functions of the FAP 14 is to provide for the centralized design of business forms. It is the entry point into the system 10, and contains software that controls the execution of the other processes within the system 10. As earlier indicated, forms design packages are associated therewith, such as the DOCS, or PERFORM, packages. The forms may be designed elsewhere and downloaded to the FAP 14 prior to transmission to the CLF 12. The FAP 14 communicates with the CLF (preferably two way) by modems 41, or a token ring, or networked protocols defined by the IEEE 802.5 or 802.2 standards. A terminal 43 (see FIG. 4), including a display screen 44, and inputting means such as a keyboard 45 and/or mouse 46, are provided as a human interface to the FAP 14. Other technologies could also be utilized, such as scanners and digitalization apparatus.

In addition to the forms design packages, the FAP 14 contains application software for a number of other functions. A file management function manages display (source) images for all released forms and forms that are scheduled for up-date/release. This software creates, maintains, updates and ensures the integrity of the display image library.

A user friendly interface function is provided by software that allows the operator to be queried for information regarding print formats and distribution profiles for each form. This information is logically associated with the display image within the file management system function so that whenever an electronic form is created or up-dated, it will have the necessary components. The forms administrator at the FAP 14 will obtain the following information for each electronic form created or up-dated: form identification; form description; form processing (e.g. new/update); the design software used to design the form; the release date; the security level; the distribution profile (user sites, output devices/sites, generic customer environment information); the paper base production requirements (e.g. manufacturing facilities, or internal print shops for camera ready copy); and variable data field encoding.

The FAP 14 also converts the display images to appropriate print formats based upon the distribution profile specified for each form. This is typically done right in the forms design package 38 itself (e.g. in PERFORM). The operator inputs what printer formats the form is to be provided in, and the package 38 does the necessary formatting (either single or multiple). That is, if a form is to be distributed at a first location having a first printer with a first printer format, and to a second geographically remote user location, having a second printer with a second printer format (e.g. a different manufacturer for the second printer than the first printer), the display images must be converted to print formats for both the first and second printers. That is, the same electronic business form will exist in different formats. The print image files will be validated for existence, having been previously formatted based upon the customer profile, and downloaded to the CLF 12. The CLF 12 may effect distribution on a scheduled release date. Of course this is practiced with any number of printers.

The system 10 may have any one of the following output formats: display image; encoded display image; print format; and production output. The display image format may require no conversion, and—for example—can be used to merely display the form on a screen (e.g. the screen 44 of the CLF 12). For the encoded display image format, the operator at the FAP 14 has encoded the variable data fields, and this format is used for merging variable data with the electronic form in a conventional manner via a batch process at the user site. This format, too, can be sent to a display terminal (e.g. 44). Print formats should be able to support output to postscript printers, as well as for printers for all other major manufacturers such as IBM, Hewlett Packard, Xerox, etc. The production output formats will support an output for a manufacturing production facility 19, via a PC to PC (e.g. DOCS to DOCS ) transmission. This output may be used to produce camera ready copy. This will insure the most updated form at all times. It also will provide an output to control an internal print shop 24 for producing camera ready copy.

As earlier indicated, the FAP 14 communicates with the CLF 12 via modems 41, token ring 31, or the like. Print images and form profiles are transferred to the CLF 12, and update processing within the CLF 12 is scheduled. Display and print images for updated forms will be downloaded to the CLF 12, and appropriate file management functions, such as archiving, will be scheduled and performed.

Figure 7:
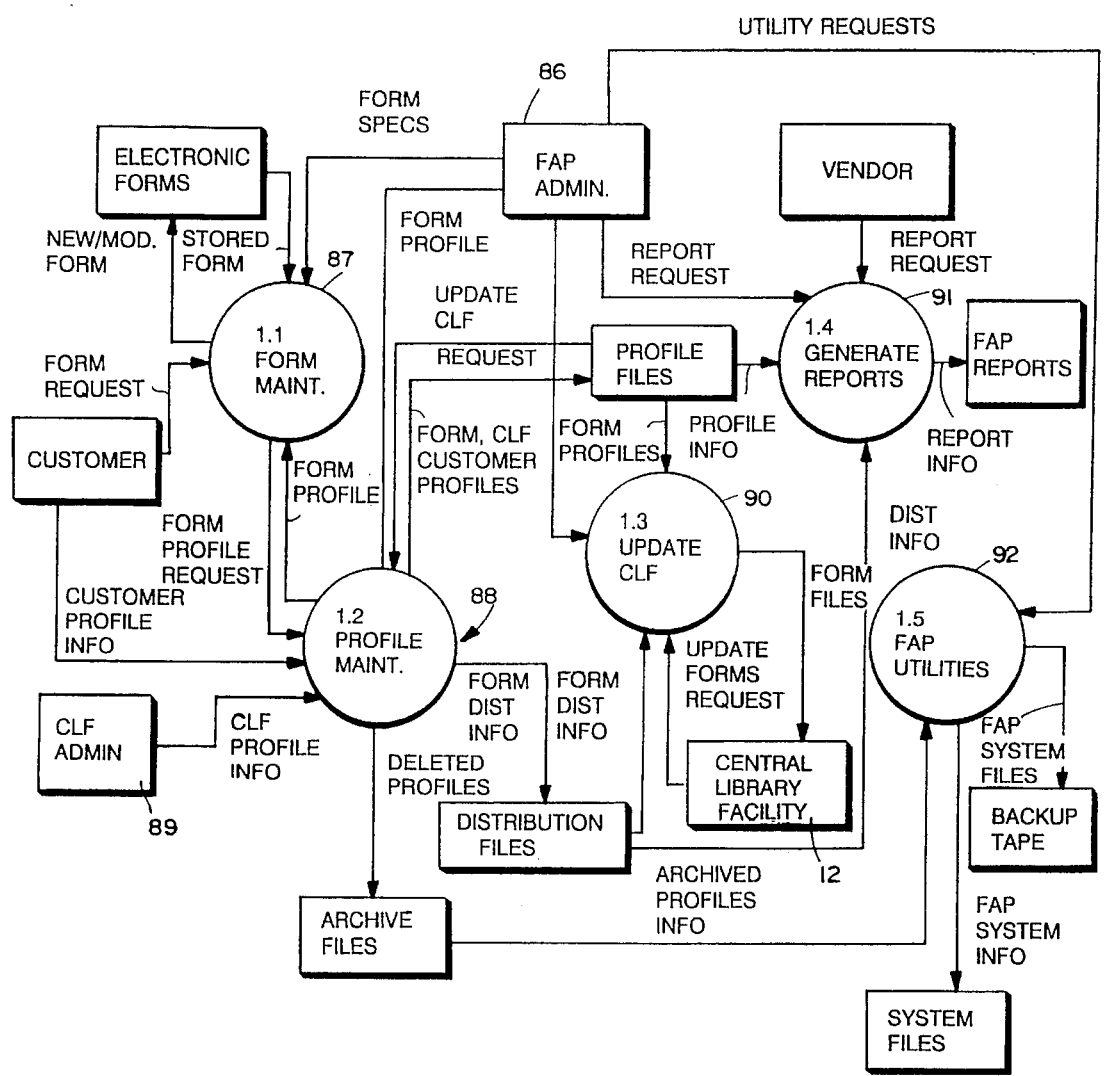
FIG. 7 is a data flow diagram of exemplary program control processes performed by the FAP, for detailed implementation according to the invention.
Figure 8A:
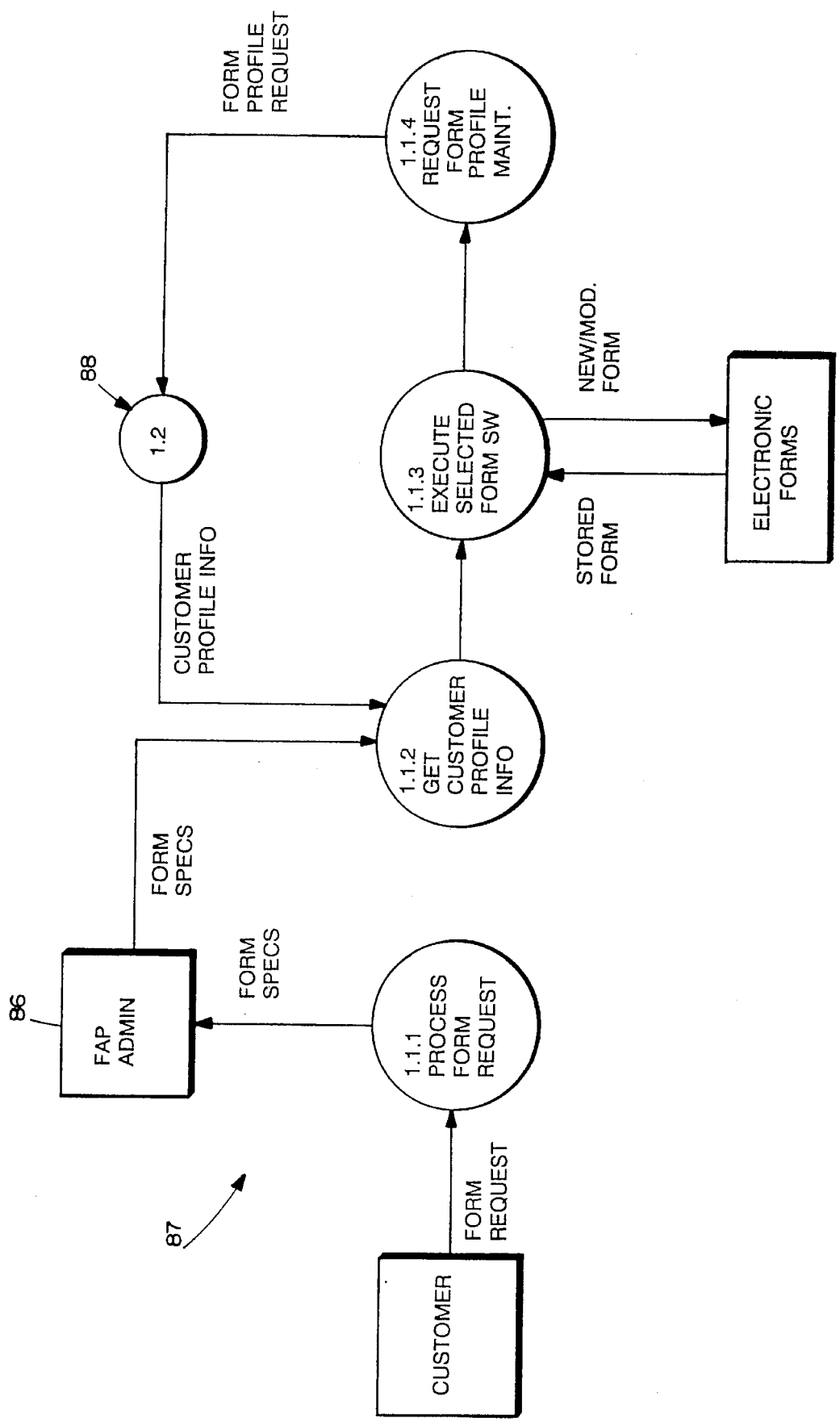
FIGS. 8a–8e are schematics giving lower level breakdowns of the major elements of FIG. 7.
Figure 8B:
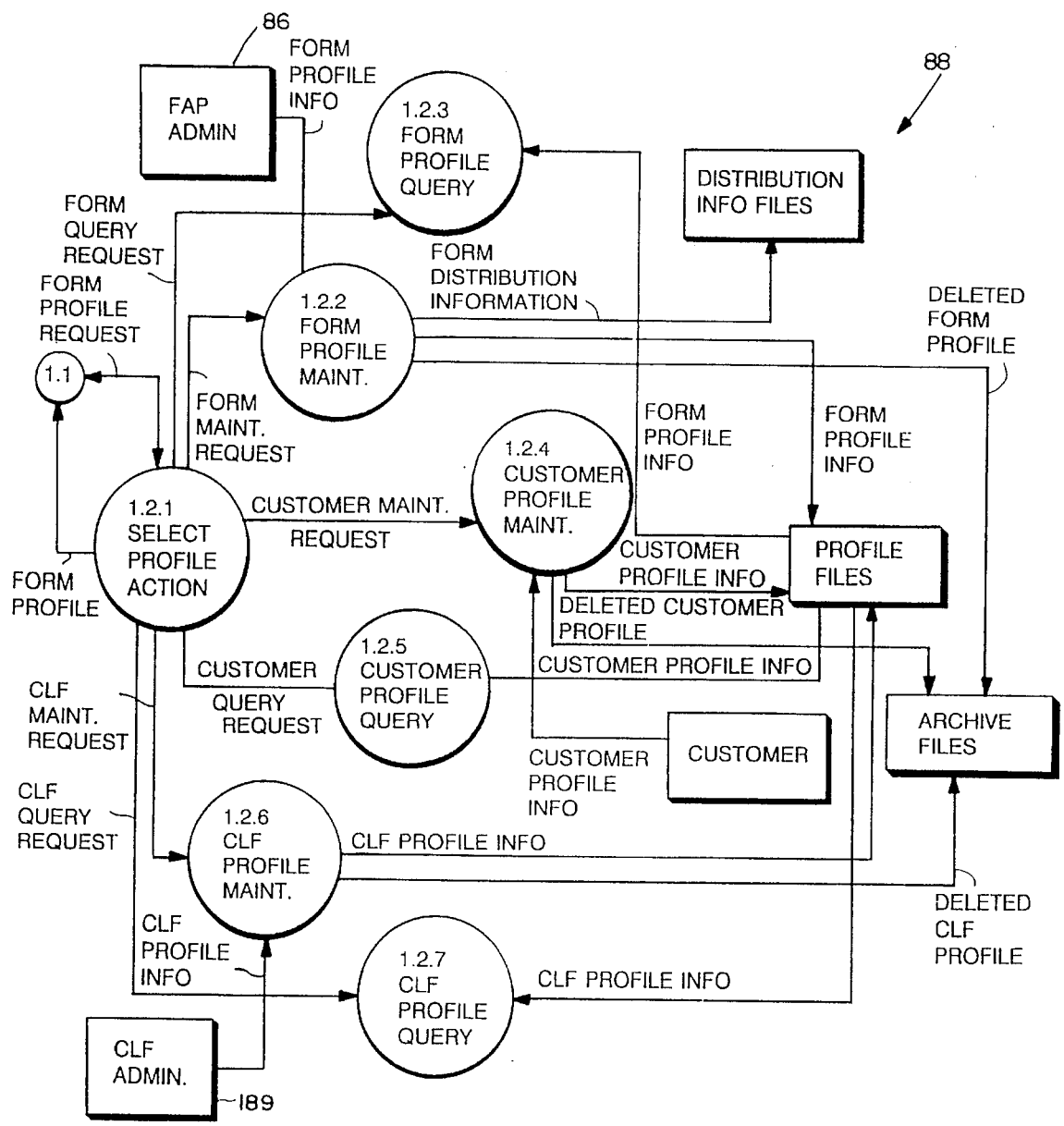
Figure 8C:
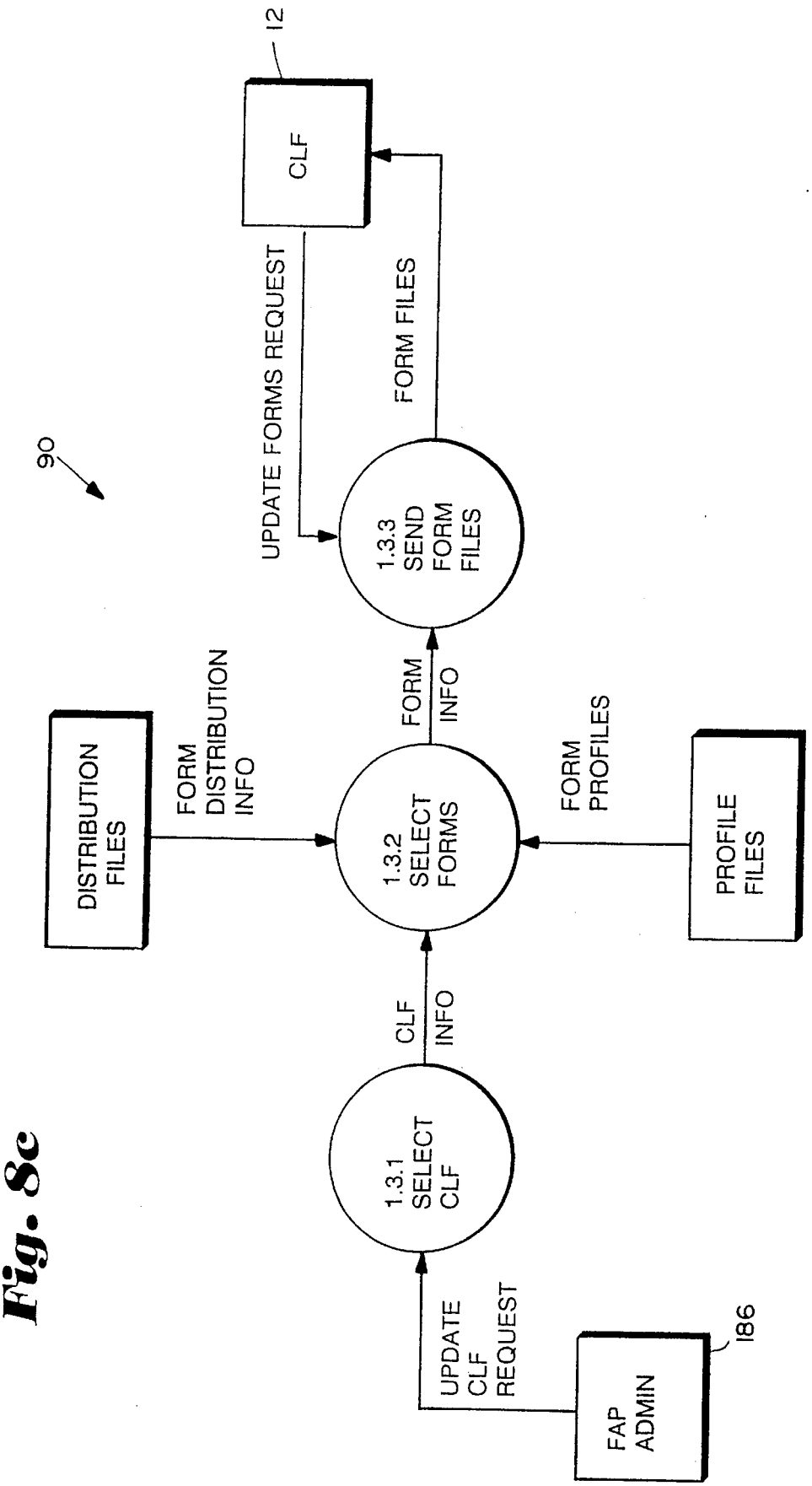
Figure 8D:
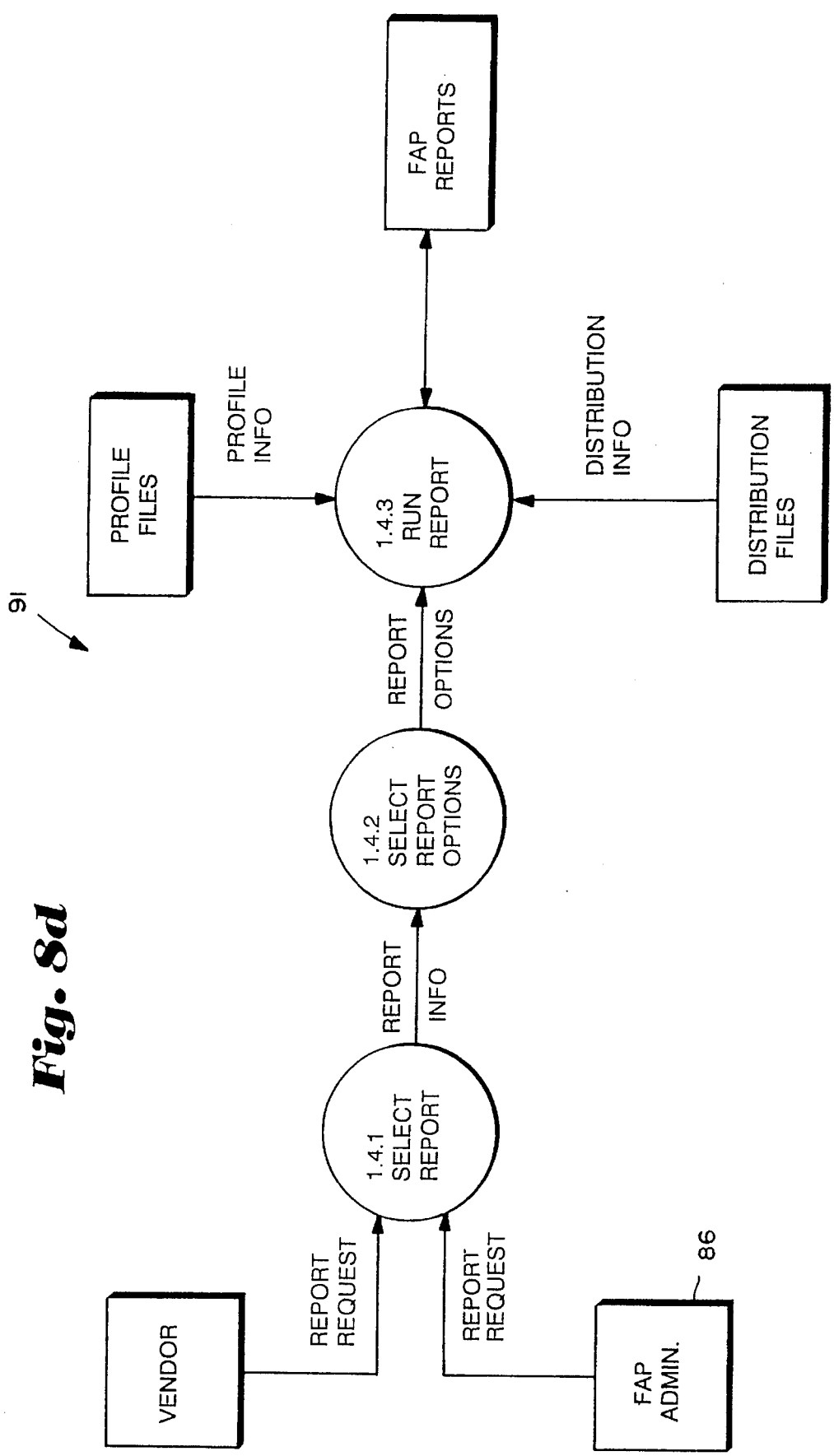
Figure 8E:
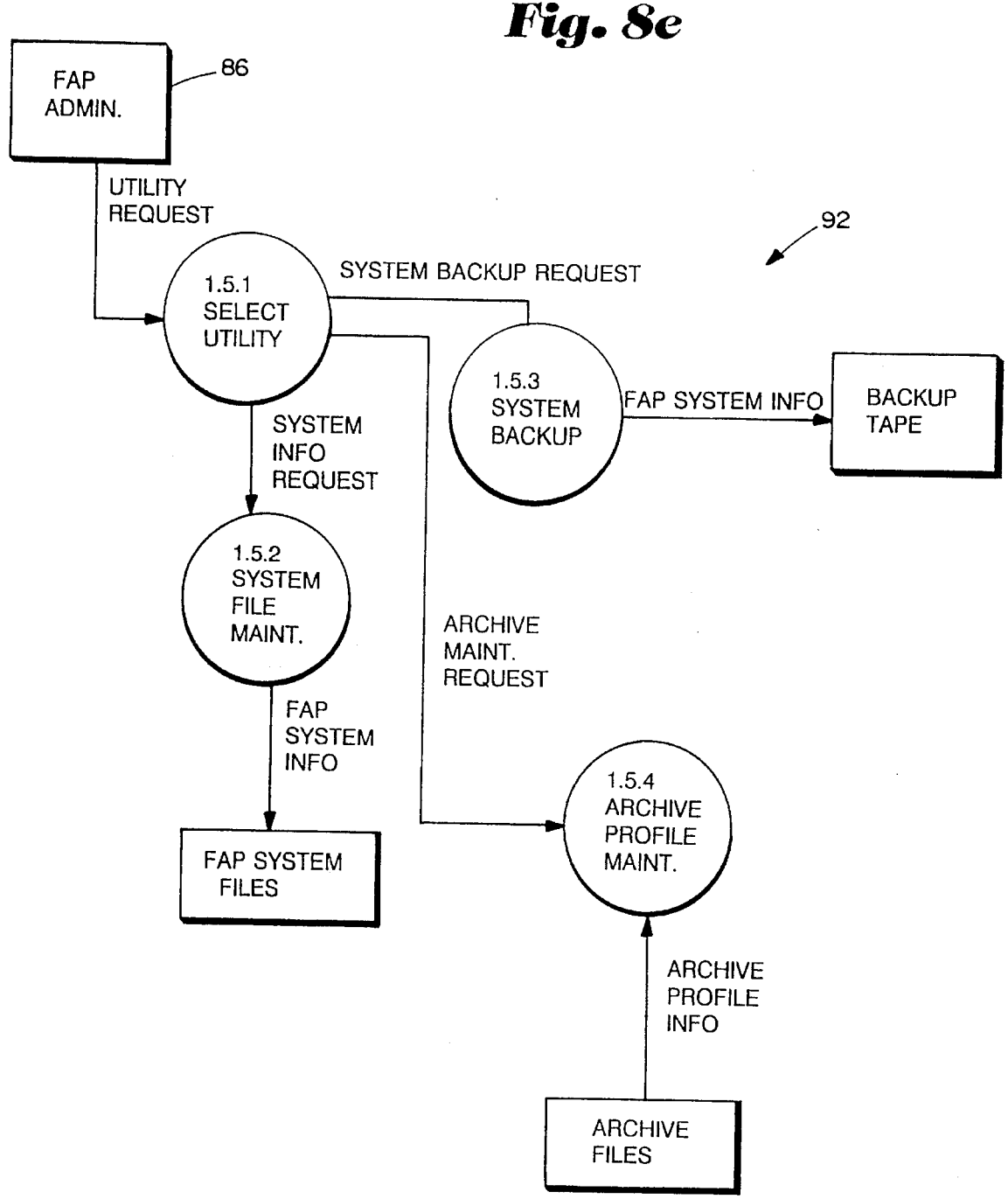

Major components of the data flow diagram of FIG. 7 include the FAP administrator software 86, form maintenance process 87, profile maintenance process 88, CLF administrative software 89, CLF update process 90, a report generation process 91, and the FAP utility process 92. FIG. 8a illustrates a detail data flow diagram for the form maintenance process 87. FIG. 8b illustrates a detail data flow diagram for the profile maintenance process 88. FIG. 8c illustrates detail data flow diagram for the CLF update process 90. FIG. 8d illustrates a detail data flow diagram for the report generation process 91; and FIG. 8e illustrates a detail data flow diagram for the FAP utility process 92.

Figure 5:
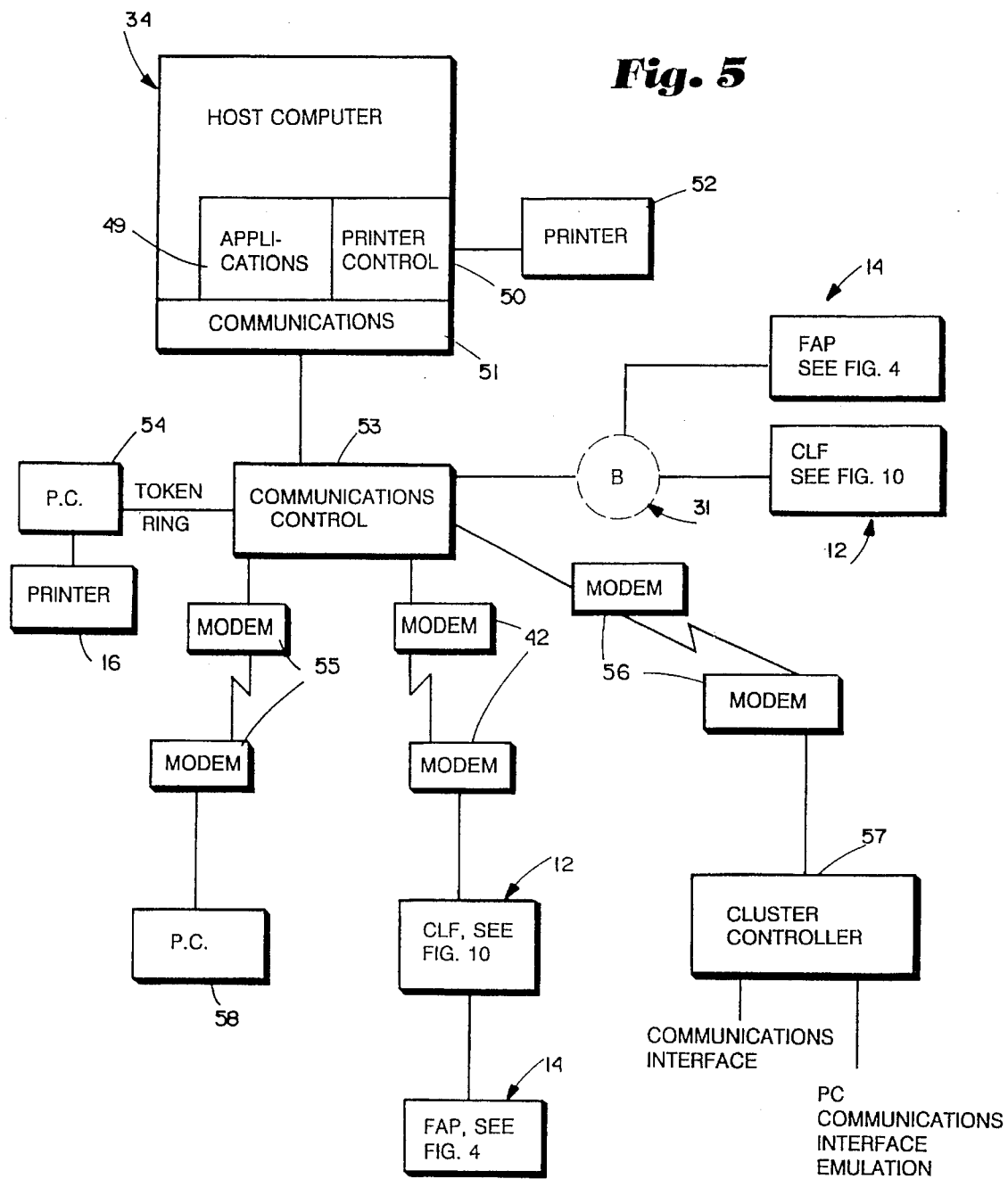
FIG. 5 is a schematic like that of FIG. 4 for a host computer utilizable with the CLF and the FAP.

FIG. 5 provides a schematic of a conventional host computer 34 and its interrelationship to other components in a typical configuration. The computer 34 may include applications software 49, a printer control 50, and a communications module 51. A printer 52, such as an IBM 3800, is controlled by the printer controller 50 software, e.g. JES AND AFP, both by IBM. Other printers 52, such as the Xerox 9700, of course may also be utilized. The communications module 51, such as an IBM SNA, is interconnected with a communications controller 53, such an an IBM 37XX FEP. A personal computer 54 may be interconnected to the controller 53 via a token ring or other link, and control a locally attached printer 16, or access other printers in the network. The controller 53 is connected through modems 55 to other PCs 54 (at sites 15). Controller 53 can communicate through the token ring 31 with the CLF 12 and FAP 14, or through modems 42 with the CLF 12. Communications may also be provided optionally through modems 56 with a cluster controller 57—such as an IBM 3174/3274—which in turn is interconnected with a communications interface (such as an IBM 3270) and a PC (such as a 3270 emulation PC). PC 58 may function as a print/file server to support multiple devices.

The controller 53 (typically located on host 34) will run a version of a network control program (e.g. OS/2 version 1.2 from IBM) that supports peer to peer networking. The PC 54 has a Moore Forms Print Server. Therefore, CLF 12 communicates directly with PC 54 through controller 53 automatically, without "bothering" host 34.

The major menu items provided to the user of the FAP 14 are provided on menu screens. The main menu will allow selection of the forms design program, updating the central library with selected forms, defining a form profile for a current form, defining form fields for a current form, customer profile information, CLF profile information, and a customer profile query. Many others may also be provided. Typical screens for each of these above specific menu items are as follows:

For forms design, a list of the design software defined for a particular customer will be displayed, e.g.:

---

Form    Profile    Library    Reports    Utility    Exit
Run Form Design Program
Enter Customer ID: 3-1234567-00000
       Form SW
       JFDESIGN
       PERFORM
       F3
Char Mode:  Replace  Page 3    Count: 3

---

For downloading information (e.g. forms and release dates) to the CLF 12:

---

Update    Exit
Update Central Library with Selected Forms.
CLF ID:    SAVANNAH    CENTRAL LIBRARY UPDATE

| Select | Customer ID | Form ID | Rev | Status | Dist Date |
|---|---|---|---|---|---|
|  | 3-1234567-00000 | TINFORM | 0 | Completed |  |
|  | 3-1234567-00000 | SIGDEMO | 0 | Completed |  |
|  | 3-1234567-00000 | UMIVFILL | 0 | Completed |  |

Press [F5] to return to menu
To select Form for Library Update, enter '*'.
To save selections, press [F10].
    Char Mode:  Replace  Page 1    Count: 3

---

For encoding a variable data information field, which is sent to the CLF 12 and verified there:

---

Profile    Query    Ext
Define Form Profile for current form.
                       FORM FIELDS
Field Name    TIMFLD1             Sequence 1        Location 2×4in
Field Type     CHAR      Length 8       Format*******X
Validation     NONE
Calculation    NONE
Field Name    TIMFLD2             Sequence 2        Location 2×3in
Field Type     CHAR      Length 10      Format********X
Validation     NONE
Calculation    NONE
Field Name    TIMFLD3             Sequence 3        Location 4×4in
Field Type     DATE      Length 8       FormatMM-DD-YY
Validation     NONE
Calculation    NONE
Press [F5] to return to menu
Char Mode:  Replace  Page 2    Count: 3

---

For illustrating form profile information for form which has been created:

```
    Fields      Query      Exit
Define Form Fields for current form.
                                        FORM PROFILE INFORMATION
Cust ID     3-1234567-00000        Cust Name    XYZ BANK
Form ID     TINFORM     Descr      CUSTOMER ADD & TIN CHANGES-HP W/S2 CART.
Revision    0      Form Status     NEW          Release Status COMPLETED
Form Path   C:\XYZBANK
Form Width      8.5            No. of Pages 1  FORM FILES:
Form Length     11             No. of Parts 1  File Name      PD   Type   CLF ID
Orientation     PORTRAIT       Duplex N        TINFORM.IFD    HP   S      SAVANNAH
Form SW         JFDESIGN                       TINFORM.MDF    HP   C      SAVANNAH
                                               TINFORM.PRT    HP   P      SAVANNAH
              By                 Date
Created      FAP                 19-NOV-90
Modified     FAP                 19-NOV-90
Released
Press [F5] to return to menu
Char Mode:  Replace  Page 1      Count: 1
```

An exemplary screen for inputting data, e.g. customer profiles, is:

```
      Query     Exit
Move to query screen
                     CUSTOMER PROFILE INFORMATION
      Cust ID 3-1234567-00000   Directory C:\CSBANK
Cust Name XYZ BANK              Phone Number (800) 800-8000
      Contact S. Jones          Fax Number (800) 800-8001
          CUSTOMER ADDRESS:         SHIPPING ADDRESS:
Addr        222 MAIN STREET     Addr 222 MAIN STREET
City        SPRINGFIELD              City        SPRINGFIELD
State ME    Zip 00001   Cntry USA    State ME    Zip 00001   Cntry USA
                        Attn S. JONES
HW/SW       HW/SW Name:        Description
S           JFDESIGN           JETFORM DESIGN V. 2.1
H           HPLJIID            HEWLETT-PACKARD LASERJET IID
S           PERFORM            PERFORM V.2.1
Press [F5] to return to menu
Char Mode:   Replace   Page 1      Count 1
```

An exemplary screen for inputting CLF profile information is:

```
      Query     Exit
Move to query screen
                   CENTRAL LIBRARY FACILITY PROFILE
                              INFORMATION
                                             Customer ID
CLF ID        SPRINGFIELD                    3-1234567-00000
Location      XYZ BANK, SPRINGFIELD,
              ME
Description   IBM PS/2 MODEL 80,
              )S/2 V. 1.2
Administrator S. JONES
Phone         (800) 800-8000
Number
Modem         (800) 800-8002
Number
Fax Number    (800) 800-8001
Press [F5] to move to menu
Char Mode:  Replace  Page 1   Count 1
Exit
Return to master record
```

An exemplary customer profile query screen is:

```
                CUSTOMER PROFILE
                     QUERY
                     Cust ID
                 3-1234567-00000
```

-continued

| CLF ID | Hardware/Software | |
|---|---|---|
| | Type | Name |
| SAVANNAH | H | HPLJIID |
| | S | JFDESIGN |
| | S | PERFORM |

Figure 6:
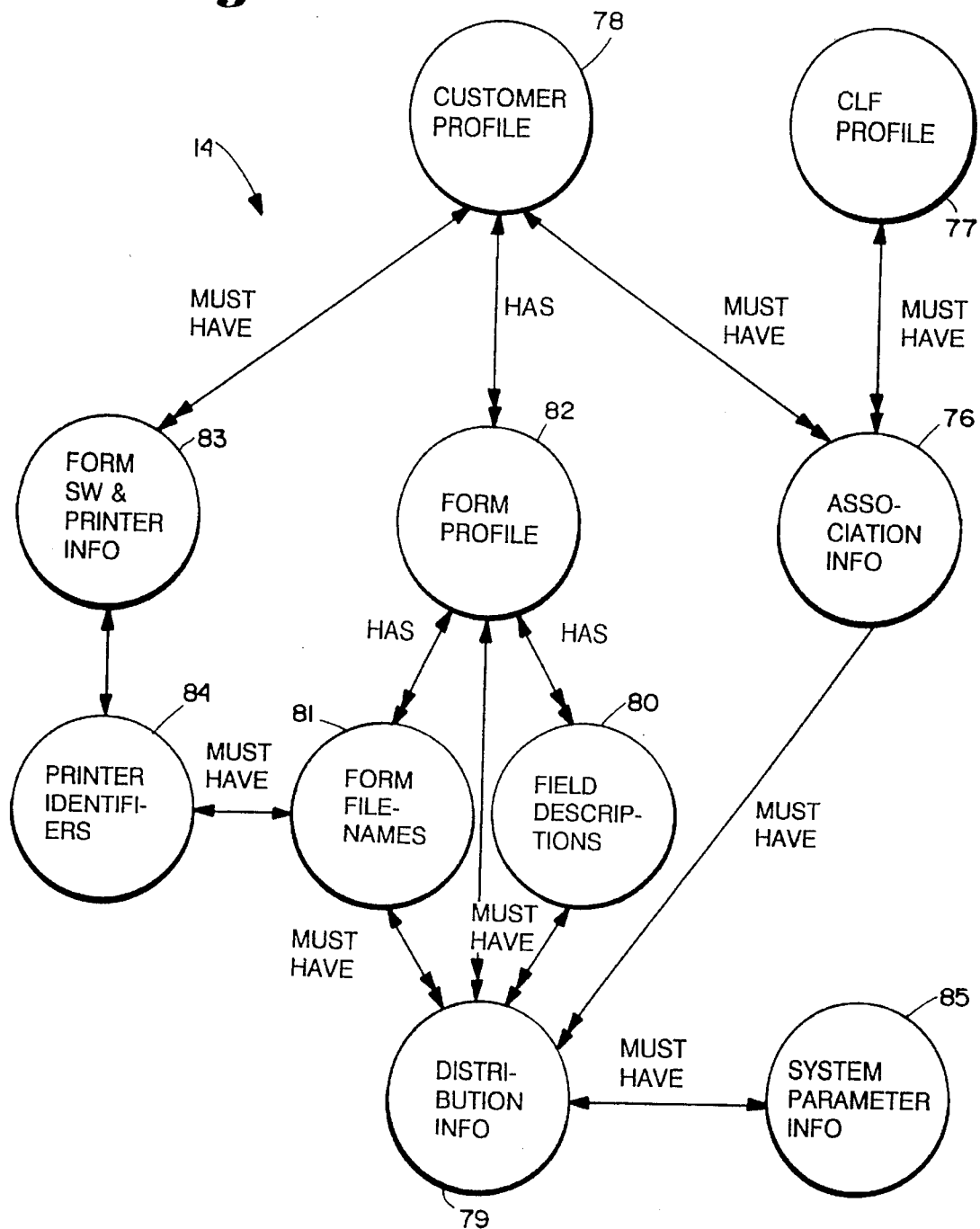
FIG. 6 is a data model diagram for data structures provided by the FAP, for detailed implementation according to the invention.

The data model diagram for FAP 14 is provided in FIG. 6. The same conventions are utilized here and as in the CLF data model diagram of FIG. 11. The connections in FIG. 6 refer to the relationship between the two entities; i.e. two entities connected by an arrow with one arrow head at one end and a double arrow head at the other end are said to have a "one-to-many" relationship. In a relational database construct, this means that for each parent record in the first entity there may/shall exist many child records in the second entity. A glossary of the individual tables of the FAP 14 illustrated in FIG. 6 is as follows:

| FORMS AUTOMATION PLATFORM TABLES | | |
|---|---|---|
| DATA ENTITY NAME | ALIAS | Ref. # |
| ASSOCIATION INFO | CUSTOMER/CLF ASSOCIATION TABLE | 76 |
| CLF PROFILE | CLF MASTER TABLE | 77 |

FORMS AUTOMATION PLATFORM TABLES

| DATA ENTITY NAME | ALIAS | Ref. # |
|---|---|---|
| CUSTOMER PROFILE | CUSTOMER MASTER TABLE | 78 |
| DISTRIBUTION INFO | FORM DISTRIBUTION TABLE | 79 |
| FIELD DESCRIPTIONS | FORM FIELD DEFINITION TABLE | 80 |
| FORM FILENAMES | FORM DISTRIBUTION FILENAMES TABLE | 81 |
| FORM PROFILES | FORM MASTER TABLE | 82 |
| FORM SW & PRINTER INFO | FORMS SW/PRINTERS TABLE | 83 |
| PRINTER IDENTIFIERS | FORM FILE PRINTER TYPES TABLE | 84 |
| SYSTEM PARAMETER INFO | FAP SYSTEM PARAMETER TABLE | 85 |

Each file typically has a number of elements, either of the number or character type, having predefined lengths. A listing of the elements, type (characters or numerical), field length, and description of the elements, for each of the tables 76–85 of FIG. 6 is as follows:

NAME: CLF PROFILE; 77

ALIAS: CLF MASTER TABLE

| ELEMENT NAME | COLUMN NAME | TYPE | LENGTH | DESCRIPTION |
|---|---|---|---|---|
| CLF ID | CLF-ID | CHAR | (8) | Uniquely identifies a Central Library Facility. |
| CLF DESCRIPTION | CLF_DESC | CHAR | (40) | Description of the Central Library Facility environment. |
| CLF LOCATION | LOCATION | CHAR | (25) | Description of the Central Library Facility Location. |
| CLF ADMINISTRATOR | ADMIN | CHAR | (30) | Name of the CLF Administrator. |
| CLF PHONE NUMBER | PHONE_NO | CHAR | (15) | Phone number of the CLF location. |
| CLF MODEM NUMBER | MODEM_NO | CHAR | (15) | Modem phone number of the CLF location. |
| CLF FAX NUMBER | FAX_NO | CHAR | (15) | Fax phone number of the CLF location. |

PRIMARY KEY:

(CLF-ID)

INDEXES:

None defined.

RELATIONSHIP TO OTHER TABLES:

PARENT OF:

CUSTOMER/CLF ASSOCIATION TABLE - CLF_CUST

CREATED IN:

FAPDB.SQL script

CREATE TABLE CFL_MAST (

| CLF_ID | CHAR | (8), |
|---|---|---|
| CLF-DESC | CHAR | (40), |
| LOCATION | CHAR | (25), |
| ADMIN | CHAR | (30), |
| PHONE_NO | CHAR | (15), |
| MODEM_NO | CHAR | (15), |
| FAX_NO | CHAR | (15) |

);

NAME:  CUSTOMER PROFILE; 78
ALIAS: CUSTOMER MASTER TABLE

| ELEMENT NAME | COLUMN NAME | TYPE | LENGTH | DESCRIPTION |
|---|---|---|---|---|
| CUSTOMER ID | CUST_ID | CHAR | (15) | Customer Identifier. Uniquely identifies a customer. |
| CUSTOMER NAME | CUST_NAME | CHAR | (30) | Customer's full name. |
| FORM PATHNAME | FORM_PATH | CHAR | (75) | Full Pathname on system where customer's forms are located. |
| NO OF REVISIONS | NO_REVS | NUMBER | (1) | Number of revisions supported on the system for a customer. |
| ADDRESS LINE 1 | ADDR1 | CHAR | (30) | Street address line 1. |
| ADDRESS LINE 2 | ADDR2 | CHAR | (30) | Street address line 2. |
| CITY | CITY | CHAR | (25) | City address line. |
| STATE/PROVINCE | STATE | CHAR | (4) | State or province address line. |
| ZIP | ZIP | CHAR | (10) | Zip code address line. |
| COUNTRY | COUNTRY | CHAR | (4) | Country address line. |
| CONTACT NAME | CONTACT | CHAR | (30) | Name of customer contact person. |
| PHONE NUMBER | PHONE_NO | CHAR | (15) | Phone number of customer. |
| FAX NUMBER | FAX_NO | CHAR | (15) | Fax phone number of customer. |
| SHIPPING LINE 1 | SHIP_ADDR1 | CHAR | (30) | Shipping address line 1. |
| SHIPPING LINE 2 | SHIP_ADDR2 | CHAR | (30) | Shipping address line 2. |
| SHIPPING CITY | SHIP_CITY | CHAR | (25) | Shipping city address line. |
| SHIPPING STATE/PRO | SHIP-STATE | CHAR | (4) | Shipping state or province line. |
| SHIPPING ZIP | SHIP_ZIP | CHAR | (10) | Shipping zip code address line. |
| SHIPPING COUNTRY | SHIP-COUNTRY | CHAR | (4) | Shipping country address line. |
| SHIPPING ATTENTION | SHIP_ATTN | CHAR | (30) | Name of person for ship-to attention. |

PRIMARY KEY:

(CUST_ID)

INDEXES:

None defined.

RELATIONSHIP TO OTHER TABLES:

PARENT OF:

FORM SW & PRINTER INFO TABLE - CUST_MWSW

ASSOCIATION INFO TABLE - CLF_CUST

FORM PROFILE TABLE - FORM_MAST

DEPENDENT OF:

CREATED IN:

FAPDB.SQL script

```
CREATE TABLE CUST_MAST
(
    CUST_ID         CHAR    (15),
    CUST_NAME       CHAR    (30),
    FORM_PATH       CHAR    (75),
    NO_REVS         NUMBER  (1),
    ADDR1           CHAR    (30),
    ADDR2           CHAR    (30),
    CITY            CHAR    (25),
    STATE           CHAR    (4),
    ZIP             CHAR    (10),
    COUNTRY         CHAR    (4),
    CONTACT         CHAR    (30),
    PHONE_NO        CHAR    (15),
    FAX_NO          CHAR    (15),
    SHIP_ADDR1      CHAR    (30),
    SHIP_ADDR2      CHAR    (30),
    SHIP_CITY       CHAR    (25),
    SHIP_STATE      CHAR    (4),
    SHIP_ZIP        CHAR    (10),
    SHIP_COUNTRY    CHAR    (4),
    SHIP_ATTN       CHAR    (30),
);
```

```
HDR_FILE        CHAR        (12),
DIST_FILE       CHAR        (12)
);
```

---

NAME:   FIELD DESCRIPTION; 80
ALIAS:  FORM FIELD DEFINITION TABLE

| ELEMENT NAME | COLUMN NAME | TYPE | LENGTH | DESCRIPTION |
|---|---|---|---|---|
| CUSTOMER ID | CUST_ID | CHAR | (15) | Customer ID. Uniquely identifies a customer. |
| FORM ID | FORM_ID | CHAR | (8) | Uniquely identifies a form for a customer. |
| FORM REV | FORM_REV | NUMBER | (1) | Uniquely identifies a revision of a form. |
| FORM FIELD NUMBER | FLD_NO | NUMBER | (3) | Form field number or tabbing order. |
| FORM FIELD NAME | FLD_NAME | CHAR | (20) | Form field name. |
| FORM FIELD LOC | FLD_LOC | CHAR | (20) | Form field coordinate location. |
| FORM FIELD LENGTH | FLD_LEN | NUMBER | (5) | Form field length. |
| FORM FIELD TYPE | FLD_TYPE | CHAR | (10) | Form field data type. |
| FORM FIELD FORMAT | FLD_FORMAT | CHAR | (30) | Form field data format. |
| FORM FIELD VAL | FLD_VAL | CHAR | (50) | Form field validation. |
| FORM FIELD CALC | FLD_CALC | CHAR | (80) | Form field calculation. |

PRIMARY KEY:

(CUST_ID, FORM_ID, FORM_REV)

INDEXES:

None defined.

RELATIONSHIP TO OTHER TABLES:

DEPENDENT OF:

FORM PROFILE TABLE - FORM_MAST

CREATED IN:

FAPDB.SQL script

```
CREATE TABLE FORM_FLDS
(
```

FORM PROFILE - FORM_MAST TABLE

CREATED IN:

FAPDB.SQL script

CREATE TABLE FORM_FILES

```
(
CUST_ID         CHAR      (15),
FORM_ID         CHAR      (8),
FORM_REV        NUMBER    (1),
CLF_ID          CHAR      (8),
FILE_NAME       CHAR      (12),
FILE_TYPE       CHAR      (1),
FILE_EXT        CHAR      (2)
);
```

---

NAME: FORM PROFILE; 82

ALIAS: FORM MASTER TABLE

| ELEMENT NAME | COLUMN NAME | TYPE | LENGTH | DESCRIPTION |
|---|---|---|---|---|
| CUSTOMER ID | CUST_ID | CHAR | (15) | Customer ID. Uniquely identifies a customer. |
| FORM ID | FORM_ID | CHAR | (8) | Uniquely identifies a form for a customer. |
| FORM REV | FORM_REV | NUMBER | (1) | Uniquely identifies a revision of a form. |
| FORM DESCRIPTION | FORM_DESC | CHAR | (40) | Description of form. |
| FORM CATEGORY | FORM_CAT | CHAR | (10) | Category that form belongs to. NOT USED. |
| FORM SUB CATEGORY | FORM_SUB | CHAR | (10) | Sub category that form belongs to within category. NOT USED. |
| FORM PATHNAME | FORM_PATH | CHAR | (75) | Full pathname of directory where form is stored. |
| FORM DESIGN SW | FORM_SW | CHAR | (8) | Executable name of form design software used. |
| FORM DESIGN STATUS | FORM_STATUS | CHAR | (1) | Design status of the form. |
| RELEASE STATUS | REL_STATUS | CHAR | (1) | Release status of the form. |
| FORM WIDTH | FORM_WDTH | NUMBER | (4, 2) | Width of form. |
| FORM LENGTH | FORM_LEN | NUMBER | (4, 2) | Length of form |
| NUMBER OF PAGES | NO_PAGES | NUMBER | (3) | Number of pages in the form. |
| NUMBER OF PARTS | NO_PARTS | NUMBER | (3) | Number of parts to the form. |

```
    REL_STATUS         CHAR        (1),
    FORM_WDTH          NUMBER      (4, 2),
    FORM_LEN           NUMBER      (4, 2),
    NO_PAGES           NUMBER      (3),
    NO_PARTS           NUMBER      (3),
    DUPLEX             CHAR        (1),
    PG_ORIENT          CHAR        (9),
    CREATE_DATE        DATE,
    CREATE_NAME        CHAR        (10),
    MOD_DATE           DATE,
    MOD_NAME           CHAR        (10),
    REL_DATE           DATE,
    REL_NAME           CHAR        (10)
);
```

---

NAME:   FORMS SW/PRINTERS; 83

ALIAS:  FORMS SW/PRINTERS TABLE

| ELEMENT NAME | COLUMN NAME | TYPE | LENGTH | DESCRIPTION |
|---|---|---|---|---|
| CUSTOMER ID | CUST_ID | CHAR | (15) | Customer ID. Uniquely identifies a customer. |
| HW/SW INDICATOR | HWSW_TYPE | CHAR | (1) | Indicates whether entry is hardware (printer) or software. |
| HW/SW NAME | HWSW_NAME | CHAR | (8) | Executable or invokable name of hardware of software. |
| HW/SW DESCRIPTION | HWSW_DESC | CHAR | (40) | Description of hardware or software. |

PRIMARY KEY:

(CLF_ID, CUST_ID)

INDEXES:

None defined.

RELATIONSHIP TO OTHER TABLES:

DEPENDENT OF:

CUSTOMER MASTER TABLE - CUST_MAST

CREATED IN:

FAPDB.SQL script

CREATE TABLE CUST_NWSW (

| | | |
|---|---|---|
| CUST_ID | CHAR | (15), |
| HWSW_TYPE | CHAR | (1), |
| HWSW_NAME | CHAR | (8), |
| HWSW_DESC | CHAR | (40) |

);

---

NAME: PRINTER IDENTIFIERS; 84

ALIAS: PRINTER TYPE TABLE

| ELEMENT NAME | COLUMN NAME | TYPE | LENGTH | DESCRIPTION |
|---|---|---|---|---|
| FORM SW NAME | FORM_SW | CHAR | (8) | Form software executable name. |
| FORM FILE TYPE | FILE_TYPE | CHAR | (1) | Form software file type. |
| PRINTER TYPE | FILE_EXT | CHAR | (2) | Printer type supported in form software. |

PRIMARY KEY:

(FORM_SW)

INDEXES:

None defined.

RELATIONSHIP TO OTHER TABLES:

PARENT OF:

FORM FILENAMES TABLE - FORM_FILES

DEPENDENT OF:

CREATED IN:

FAPDB.SQL script

CREATE TABLE FILE_EXT (

| | | |
|---|---|---|
| FORM_SW | CHAR | (8), |
| FILE_TYPE | CHAR | (1), |

```
MODEM_NO      CHAR      (15),
FAX_NO        CHAR      (15),
NO_REVS       NUMBER    (1)
);
```

FIG. 7 is a data flow diagram for the FAP 14. Utility, report generation, archiving, form maintenance, profile maintenance, and CLF 12 updating functions are provided, as illustrated in FIG. 7. The interrelationships between the various components as shown in FIG. 7 are more fully indicated by FIGS. 8a–8e.

FIG. 9 provides a flow chart indicating the general steps executed by FAP 14 for accessing the CLF 12 from the FAP to transfer form information. The program is initiated from a command file, as indicated at 100. A session with a target CLF 12 is allocated. This step is indicated since typically a vendor's FAP 14 can be associated with more than one CLF 12, for example a centralized location for the FAP 14 may serve a number of CLFs 12, one associated with each different customer (each customer having a plurality of geographically remote user stations). At 102, the files indicated for transfer are transferred from the FAP 14 to the targeted CLF 12, and confirmation is provided at 13. Then the remote CLF table population function is initiated at 104, and when that function is completed it is confirmed at 105. Data may then be sent to and from the CLF 12 from and to the FAP 14 at 106, for example data useful for determining the status of the forms. An acknowledgement is issued at 107, and any post completion processing done at 108 before the processing ends.

Figure 10:
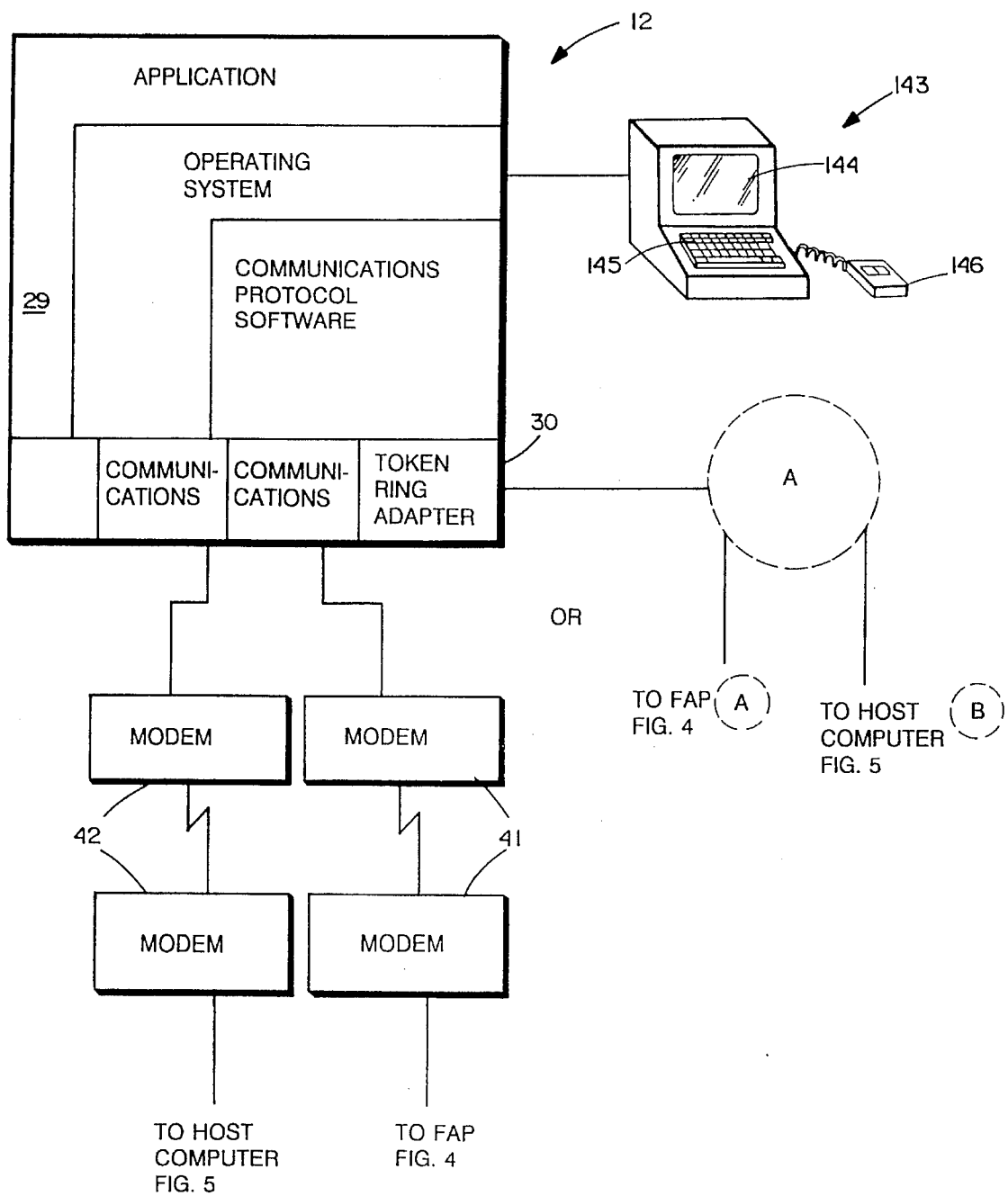
FIG. 10 is a schematic diagram illustrating exemplary components of the CLF of the system of FIGS. 1 and 2.

As illustrated in FIG. 10, the CLF 12 preferably communicates via modems 41 with the FAP 14, or token ring if located in the same facility, and via modems 42 with the host computer 34. In order to provide human interface, a terminal 143 having a video display 144 and a keyboard 145 and/or mouse 146, is provided associated with the CLF 12. Other technologies could also be utilized, such as optical disks, and the like, to store the forms on either magnetic or optical media.

Figure 3:
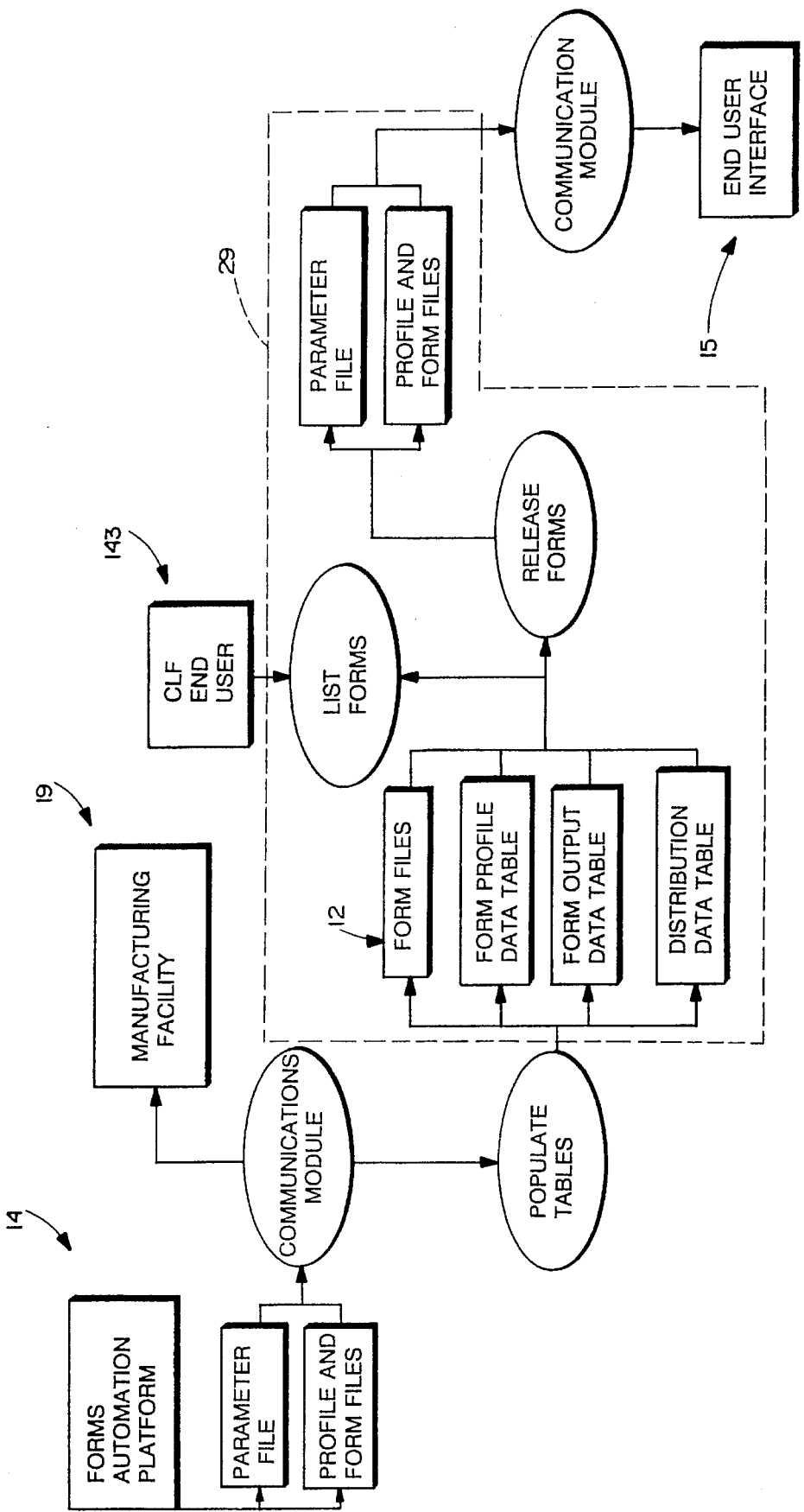
FIG. 3 is a block diagram showing an overview of the interconnections between the central library facility (CLF), forms automation platform (FAP), and end users.

As illustrated schematically in FIG. 3, major functions of the CLF 12 are forms management and distribution. The application software 29 creates, maintains, up-dates and ensures the integrity of the database 29 provided by CLF 12. The CLF 12 also processes end user requests inputted by device 143 (e.g. via the various electronic communications facilities already discussed), and distributes electronic forms to all of the user locations 15. Inherent in the CLF 12 is restricted user access based on security levels, the production of desired reports to support the customer's requirements, sorting of the contents of the library based upon user specified parameters, and up-dated processing. At the CLF a search will be conducted of the electronic forms database 29 on a predetermined basis, to determine all forms scheduled for release on a specified date. The forms will then be distributed based upon the end user profiles which have been designated. The CLF 12 is a logical entity, and its processes may be distributed over one or more processors, either directly on the customer's main frame 34, or at the vendor's facility, utilizing a file server, or the like.

User interface software executed by CLF 12 is menu driven in the preferred embodiment. The major menu items provided to the user of the CLF 12 main menu screen utilizing terminal 143 are forms, profile management, distribution management, release function, queries and report, and utilities. A typical main menu screen is as follows:

---
CENTRAL LIBRARY FACILITY
MAIN MENU
---

Enter the Capital Letter of the Item Below and
Press Enter –>
    Forms management
    Profile management
    Distribution management
    Release function
    Queries and reports
    Utilities
F3=EXIT

---

The first item of selection is "Forms management". The Forms management menu typically appears as follows:

---
CENTRAL LIBRARY FACILITY
FORMS MANAGEMENT MENU
---

Enter the Capital Letter of the Item Below and
Press Enter –>
    List/delete/update forms
    Field information list
    Output format list
    Print form
F2=REFRESH    F3=EXIT

---

The first selectable item from the Forms management menu is the forms list. A forms list screen, showing descriptions and other information of a few exemplary forms might appear as follows:

CENTRAL LIBRARY FACILITY
FORMS LIST
Type a P in the action column to print and press PF4.

| Action | Form Id | Status | Revision Date | Release Date | Creation Date | Forms Description |
|---|---|---|---|---|---|---|
| _ | CSADRTIN | CUR | — | — | — | CUSTOMER ADDRESS & TI |
| _ | CSDEMOGR | CUR | — | — | — | DEMOGRAPHIC INFORMATI |
| _ | CSSGNCRD | CUR | — | — | — | SIGNATURE CARD |
| _ | CSUNIVER | CUR | — | — | — | UNIVERSAL FORM |

F3-EXIT    F4=QUEUE PRINT

The last of the selectable items in the Forms management menu is the forms print selection, the screen for which might appear as follows:

```
                    CENTRAL LIBRARY FACILITY
                          PRINT FORMS

Enter number of copies and destination for each form   More:  +
                                      NUMBER   PRINTER   SITE    CANCEL
FORM ID     FORM DESCRIPTION          COPIES   ID        ID      PRINT
CSSGNCRD    SIGNATURE CARD                                       N
PF3=EXIT    PF4=PROCESS REQUEST    PF8=NEXT FORM
```

By filling information into the prompt sections of this screen, an operator of CLF terminal 43 can schedule printing of a desired number of copies of specific forms to a desired printer at a desired use location.

The second menu item in the main menu is the profile management option. The typical profile management menu screen appears as follows:

```
                    CENTRAL LIBRARY FACILITY
                    PROFILE MANAGEMENT MENU

Enter the Capital Letter of the Item Below and
   Press Enter ->
                       User profile
                       Category profile
                       Site profile
                       corporate proFile
                       Geographic profile
                       cusTomer profile
                       grOup profile
                       Printer profile
       F2=REFRESH   F3=EXIT
```

The first selectable item of the profile management menu is the user profile, a screen of which appears as follows:

```
                              USER PROFILE

Update/Delete: Type "U" and/or "D" in ACTION column and press "ENTER"
Add: Press F4; Associations: Type an "S" i ACTION column and press F6
       USER                    CORP    GEO.        ****** LOCK OUT ******
ACT    ID       USER NAME      ID      ID    FLAG    DATE         TIME —    TOM      Tom
  —    CLA      Cristie        111            Y     12-10-1990   10:10:10
  —    DLY      Donna
  —    FEA      Fran
  —    JOE      Joe            111     232
  —    JZA      Julie
  —    SAN      SAM
D002    ****       END OF OUTPUT      ****
F2=REFRESH F3=EXIT F4=ADD
```

If F4 is actuated from the above screen, then the following screen appears:

```
                            USER PROFILE ADD

Enter Data in all fields - THEN press "ENTER"
User ID . . . :   _____           User Name . . . :  _____

Corporate ID . . . :   _____
```

```
                        USER PROFILE ADD
Geographic ID . . . :      _____

Telephone No . . . :       _____   Distribution Tickler Flag . . .__Amin. flag.__

******************************Lock Out Data******************************
Lock Out Date:      _____    Lock Out Time:   _____   Lock Out Flag.:__ version 0.1
ekF2=REFRESH F3=EXIT
```

The third selectable item from the profile management menu is the site profile. The site profile screen appears as follows:

```
                    CENTRAL LIBRARY FACILITY
                         SITE PROFILE
Customer ID:              2-4561686-00000
Customer Name:       State Bank
Site ID    Site Description      Geographic ID    Network ID FLA001     Tampa Banking Dept    TPA001           FLATPA01
GE0001     Atlanta Branch        ATL001           GE0ATL01
NYC002     New York Branch       NYC001           NYNYC02
CHI003     Chicago Branch        CHI001           ILCHI01
SCA001     South Carolina Office CAE001           SCACAE01
PF3=EXIT
```

The sixth menu item on the profile management menu screen is the customer profile. When that menu item is selected, the customer profile screen typically appears as follows:

```
                    CENTRAL LIBRARY FACILITY
                       CUSTOMER PROFILE
         Customer ID:       2-4561686-00000
         Customer Name:     State Bank
         Address:           The American Road
                            Atlanta
                            GA 30123 USA
         Contact Name:      Don Jones
         Phone Number:      800-321-1234
         PF3=EXIT
```

The Group profile of groups list item provides the following exemplary screen:

```
                              GROUPS LIST
UPDATE/DELETE: Type U and/or D in action column and press Enter. ADD: Press F4;
ASSOCIATION: Type an S in action column and press F6.
Action     Group ID         Seq. #       Group Description —         G1               1            Test 1
 —         G2               1            Test 2
 —         G2               2            Test 3
 —         G3               1            Test 4
 —         G3               2            Test 5
 —         G3               3            Test 6
 —         GRP101           1            New Group Added
 —         NRC001           1            First MRC Group
D002       *****       END OF OUTPUT    ****
F3=EXIT    F4=ADD     F6=ASSOCIATIONS    F12=CANCEL
```

If F4 is actuated from the above screen, then the following exemplary screen appears.

```
                     ADD DISTRIBUTION GROUP
Type in entries for the distribution group and press
<Enter> to add.
   Group Id . . .           _____

Sequence Number . . .    _____

Group Description . . .  _____

F3=EXIT                                          E12=Cancel
```

If F6 is actuated from the Groups list screen, then the following appears:

```
                      ASSOCIATION MENU
Type the Id of a base item and press <Enter>, OR type an "S"
and press <Enter> for a selection listing of the base item.
                                            Association
Base Item            Id                     Items

_FORM . . .                                 _GROUPS

_GROUP ID . . .                             _FORMS    _SITES

SEQ. NUMBER . . .            ___

_USER . . .                                 _SITES

_SITE . . .                                 _USERS    _PRINTERS

_GROUPS
_PRINTER . . .                              _SITES

F3=Exit                                          F12=Cancel
```

Upon insertion of a particular group ID from the groups list screen (e.g. "G1"), the following exemplary screen appears:

| SITES ASSOCIATED WITH A GROUP | | | | | | |
|---|---|---|---|---|---|---|
| Group ID: GI    SEQ: 1    DESC: TEST 1 | | | | | | |
| ADD: Press F4; DELETE: Type a "D" in action column and press <Enter>. | | | | | | |
| ACT | SITE ID | DESCRIPTION | CORP ID | GEO. ID | MODEM TELEPHONE | NET ID |
| — | KANSAS | KANSAS | | | | |
| — | S1 | | | | | |
| — | SIT101 | NEW SITE ADDED | | | | |
| — | WISC | WISCONSIN | | | | |
| D002 | **** | END OF OUTPUT | **** | | | |
| | F3=EXIT | F4=ADD | | F12=CANCEL | | |

If F4 is actuated from the above screen, then the following exemplary screen appears, to support data entry to get sites associated with a group:

| ADD SITES ASSOCIATED WITH A GROUP | | | | | | |
|---|---|---|---|---|---|---|
| To add items to the association list, type one or more "S" in MORE:    + | | | | | | |
| the action column and press <Enter> | | | | | | |
| ACT | SITE ID | DESCRIPTION | CORP ID | GEO. ID | MODEM TELEPHONE | NET ID |
| — | ALA | ALABAMA | | | | |
| — | CALIF | CALIFORNIA | | | | |
| — | COLO | COLORADO | | | | COLNET |
| — | FLA | FLORIDA | | | | FLANET |
| — | KANSAS | KANSAS | | | | |
| — | MASS | MASSACHUSETTS | | | | |
| — | MICH | MICHIGAN | | | | |
| — | MINN | MINNESOTA | | | 55543210000000000 | |
| — | S1 | | | | | |
| — | S2 | | | | | |
| — | S3 | | | | | |
| — | SIT101 | NEW SITE ADDED 12-1-90 | | | | |
| F3=EXIT | | | F8=FWD | | F12=CANCEL | |

The last selectable item on the profile management menu is the printer profile option. When the printer profile option is selected, the screen that typically appears is as follows:

| CENTRAL LIBRARY FACILITY PRINTER PROFILE | | | |
|---|---|---|---|
| Customer ID: | 2-4561686-00000 | | |
| Customer Name: | State Bank | | |
| Printer ID | Printer Type | Printer Manufacturer Name | |
| 01 | PS | Adobe PostScript | |
| 02 | HP | Hewlett Packard LaserJet | |
| 03 | AF | IBM 3800 Printers | |
| 04 | AF | IBM 4019 Printer | |
| 05 | MF | XEROX 9700 Printer | |
| PF3=EXIT | | | |

The third selectable item on the main menu is the distribution management function. If that function is selected, the screen that typically appears is as follows:

| CENTRAL LIBRARY FACILITY DISTRIBUTION MENU |
|---|
| Enter the Capital Letter of the Item Below and Press Enter–> |
| New form distribution cycle |
| Add form distribution |

-continued

| CENTRAL LIBRARY FACILITY DISTRIBUTION MENU |
|---|
| Delete form distribution |
| FS=REFRESH    F3=EXIT |

The fourth selectable item on the main menu is the release function. If that function is selected, the screen that typically would appear is as follows:

| CENTRAL LIBRARY FACILITY RELEASE FORMS MENU |
|---|
| Enter the Capital Letter of the Item Below and Press Enter –> |
| Release forms to site |
| Automatic release |
| release From remote site |
| F2=REFRESH    F3=EXIT |

The first selectable item on the release forms menu is to release the form to desired sites. If that item is selected, the typical screen that would appear is as follows:

```
         CENTRAL LIBRARY FACILITY
             RELEASE TO SITES

Do you wish to release New/revised forms (N) or
 All forms (A)?
                      Enter Selection here (N, A) > _
        Also select one of the choices below:
           _Release All Forms to All Sites
           _Release All Forms for Specific Site(s)
           _Release Specific Forms(s) to All Sites
           _Release Specific Form(s) to Specific Sites
 F2=Refresh  F3=Exit
```

The above provides a description for the major screens that appear in the implementation of the CLF 12 functions, although other screens are provided too, for example customer specific screens depending upon what queries and reports are desired, and conventional utilities functions.

Figure 11:
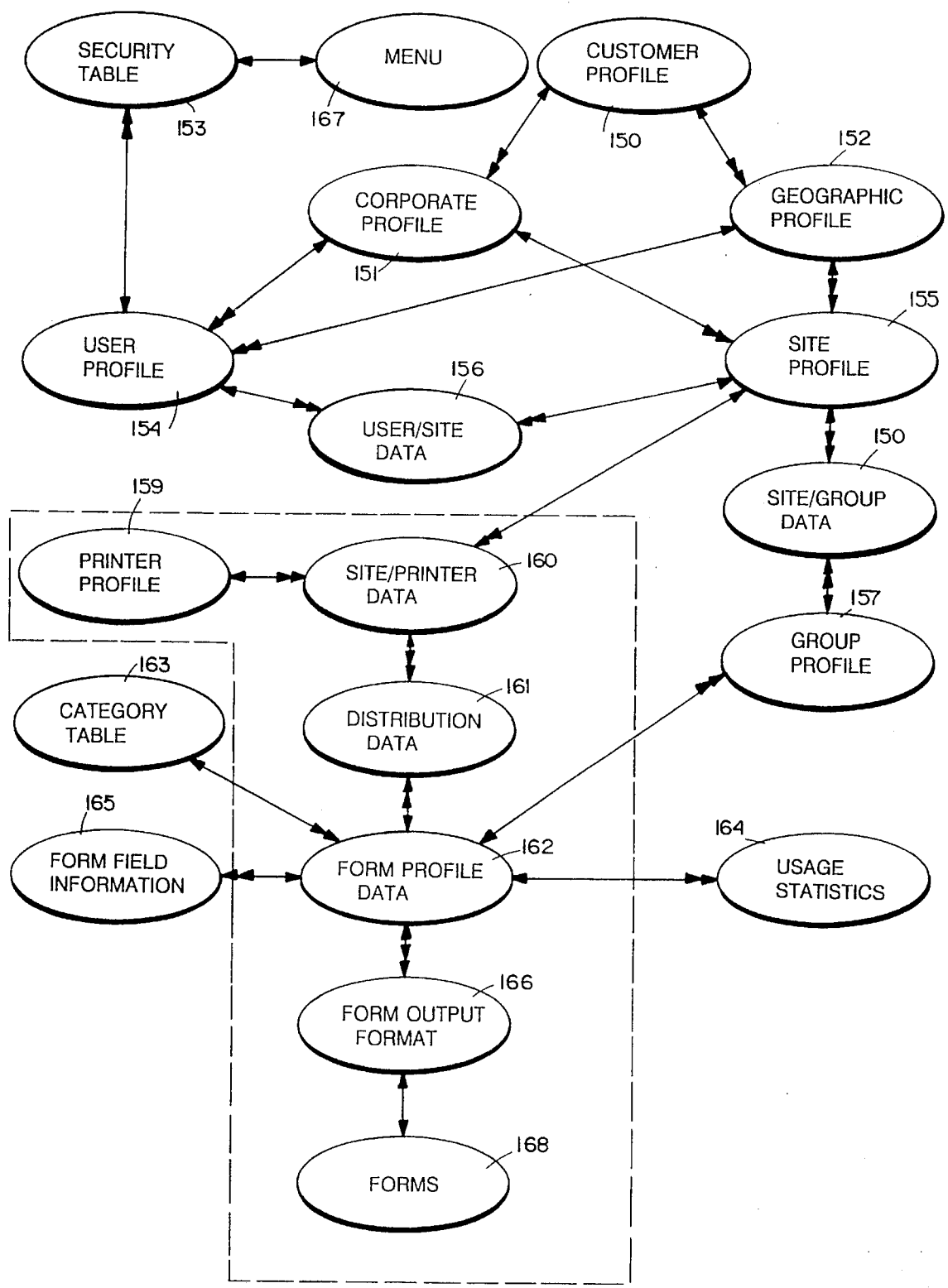
FIG. 11 is a CLF data model diagram, for detailed implementation according to the invention.

FIG. 11 is a data model diagram for the CLF 12. The individual components illustrated in FIG. 11 are individual files which have particular elements or records therein in predefined fields and with predefined addresses. The bare essentials of the system are contained within the dotted lines, but the other files are also important for ultimate maximum utilization. The connections in FIG. 11 refer to the relationship between the two entities; i.e. two entities connected by an arrow with one arrow head at one end and a double arrow head at the other end are said to have a "one-to-many" relationship. In a relational database construct, this means that for each parent record in the first entity there may/shall exist many child records in the second entity. In the preferred embodiment, the various files have the following major elements:

The customer profile file 150 contains all relevant information about the customer. The configuration of that file is as follow:

| TABLE NAME: CUSTOMER PROFILE   ALIAS: CP |||||
| --- | --- | --- | --- | --- |
| ELEMENT/RECORD | DB TABLE ELE. | KEY | LEN | DEFINITION |
| CLF Customer ID | CP_CUS_ID | 1 | 006 | Uniquely identifies each customer. |
| Country Indicator | CP_MBF_CTRY_ID | E | 001 | Country indicator for the customer ID. |
| Customer ID | CP_MBF_ID | E | 015 | Corporate identifier for a customer. |
| Customer Name | CP-NME | E | 030 | Name of customer. |
| ADDR1 | CP_ADR_1 | E | 030 | Street address one. |
| ADDR2 | CP_ADR_2 | E | 030 | Street address two. |
| City | CP_CTY | E | 030 | Name of city. |
| State Prov | CP_STE | E | 004 | State or province abbreviation. |
| Zip | CP_ZIP | E | 010 | The customer's zip code (U.S.) or postal code. |
| Country | CP_CTRY | E | 004 | Name of country in which the customer is located. |
| Num Versions | CP_NBR_ARC | E | 001 | Number of archived form versions to keep. |
| Contact Name | CP_CTC | E | 030 | Name of the contact person at the customer location. |
| Contact Phone | CP_CTC_TEL | E | 015 | Phone number of the customer contact person. |
| Customer Status | CP_STA_CDE | E | 001 | Current CLF customer status 'D' = deleted 'A' = Activated |
| Customer Status Date | CP_STA_DTE | E | 008 | Date of status change for customer |
| CLF ID | CP_CLF_ID | E | 010 | A unique identifier for each customer's CLF |
| Num Levels | CP_NBR_LVL | E | 001 | The number of corporate organization levels to be used |
| Level Name 1 | CP_CORP_LVL_1 | E | 015 | First name for corporate level definition |
| Level Name 2 | CP_CORP_LVL_2 | E | 015 | Second name for corporate level definition |
| Level Name 3 | CP_CORP_LVL_3 | E | 015 | Third name for corporate level definition |

Key Data:

Primary Key    (CLF Customer ID)

Indexes:

| Name | On Columns | Type of Work |
| --- | --- | --- |
| Cusidx | CLF Customer ID | Primary, Ascending, Unique |

Relationship to Other Tables:

| | | |
| --- | --- | --- |
| Parent of: | Form Profile | |
| | Category Profile | |
| | Printer Profile | |
| | Corporate Profile | |
| | Geographic Profile | |
| | User Profile | |
| | Site Profile | |
| | Group Profile | All Tables are Access Thru CLF Customer ID |

As many corporate level definitions may be provided as is necessary in order to meet the customer's needs.

The corporate profile provides a file 151 for the customer to charge back the forms to various entities within the organization. This file typically has the same number of levels as the number of levels for the corporate level definition in the customer profile file 150. An exemplary corporate profile file 151 is as follows:

| TABLE NAME: CORPORATE PROFILE ALIAS: CO | | | | |
|---|---|---|---|---|
| ELEMENT/ RECORD | DB TABLE ELE. | KEY | LEN | DEFINITION |
| CLF Customer ID | | 1 | 006 | Uniquely identifies each customer. |
| Corporate ID | | 2 | 006 | Code for each different corporate profile for a customer |
| Level 1 | E | | 020 | Highest level in corporate organization. |
| Level 2 | E | | 020 | Second highest level in corporate organization. |
| Level 3 | E | | 020 | Third highest level in corporate organization. |

Key Data:

Primary Key (CLF Customer ID, Corporate ID)
Foreign Key FK_CORPA (CLF Customer ID)
References Customer Profile
on Delete Cascade;

Indexes:

| Name | On Columns | Type of Index |
|---|---|---|
| CORPIDX | CLF Customer ID Corporate ID | Primary, Ascending, Unique |

Relationship to Other Tables:

| Parent of: | User Profile Thru CLF Customer ID, Corporate ID |
|---|---|
| | Site Profile Thru CLF Customer ID, Corporate ID |
| Dependent of: | Customer Profile Thru CLF Customer ID |

The geographic profile file 152 has data for the various geographically remote user locations, such as branches, offices, etc. A typical geographical profile file 152 is configured as follows:

| TABLE NAME: GEOGRAPHIC PROFILE ALIAS: GP | | | | |
|---|---|---|---|---|
| ELEMENT/ RECORD | DB TABLE ELE. | KEY | LEN | DEFINITION |
| CLF Customer ID | | 1 | 006 | Uniquely identifies each customer. |
| Geographic ID | | 2 | 006 | Unique Code for each different geographic profile used |
| SMSA-Code | E | | 003 | |
| Country Name | E | | 004 | Name of Country (International Code). |
| Region Name | E | | 020 | Name of Region. |
| State/Province Name | E | | 004 | Name of State or Province. |
| State Region Name | E | | 020 | Name of Region within a State or Province. |
| City Name | E | | 030 | Name of City. |
| City Region Name | E | | 030 | Name of Region within City. |
| Building/Branch ID | E | | 015 | Code to Identify a Building or Branch. |
| Floor Number | E | | 003 | Number of the Floor in the Building. |

Key Data:

Primary Key (CLF Customer ID, Geographic ID)
Foreign Key FK_GEOA (CLF Customer ID)
References Customer Profile
on Delete Cascade;

INDEXES:

| Name | On Columns | Type of Index |
|---|---|---|
| DEOIDX | CLF CUSTOMER ID GEOGRAPHIC ID | PRIMARY, ASCENDING, UNIQUE |

Relationship to other Tables:

| Parent of: | User Profile Thru CLF Customer ID, Geographic ID |
|---|---|
| | Site Profile Thru CLF Customer ID, Geographic ID |
| Dependent of: | Customer Profile Thru CLF Customer ID |

The security table 153 limits access to the various files in the data model of FIG. 11 to ensure that only people with the appropriate responsibility can command the system to perform important functions. The typical configuration of the security table 153 is as follows:

| TABLE NAME: SECURITY ALIAS: SE | | | | |
|---|---|---|---|---|
| ELEMENT/RECORD | DB TABLE ELE. | KEY | LEN | DEFINITION |
| CLF Customer ID | | 1 | 006 | Uniquely identifies each customer. |
| User ID | | 2 | 006 | The Logon ID associated with each CLF user. |
| Password | | 3 | 006 | The Password associated with each user ID. |
| Security Funct | E | | 001 | The Authority to maintain the security table. |
| Prof Mgmt Funct | E | | 001 | The Authority to maintain profile tables. |
| Form Mgmt Funct | E | | 001 | The Authority to maintain the central forms library. |
| Dist Funct | E | | 001 | The Authority to control form distribution to end site. |
| Release Funct | E | | 001 | The Authority to release forms to the end user site. |
| Report Funct | E | | 001 | The Ability to produce reports. |
| Security Level | E | | 001 | Defines the level of authority for each user. |
| Distribution Tickler Flag | E | | 001 | Flag to indicate if new forms have arrived in the system. |

Key Data:

Primary Key (CLF Customer ID, User ID, Password)
Foreign Key FK_Sea (CLF Customer ID, User ID)
References User Profile

| TABLE NAME: SECURITY ALIAS: SE | | |
|---|---|---|
| | On Delete Cascade; | |

Indexes:

| Name | On Columns | Type of Work |
|---|---|---|
| SEIDX | CLF Customer ID<br>User ID<br>Password | Primary, Ascending, Unique |

Relationship to Other Tables:

Dependent of: User Profile Thru CLF Customer ID, User ID

The user profile file 154 describes the end user, and it is interrelated with the security table 153. A typical configuration of the user profile file 154 is as follows:

| TABLE NAME: USER PROFILE ALIAS: UP | | | | |
|---|---|---|---|---|
| ELEMENT/RECORD | DB TABLE ELE. | KEY | LEN | DEFINITION |
| CLF Customer ID | | 1 | 006 | Uniquely identifies each customer. |
| User ID | | 2 | 006 | The Logon ID associated with each CLF user. |
| User Name | | E | 030 | Name of User. |
| User Phone | | E | 015 | Telephone number of user. |
| Lock Out Flag | | E | 001 | Indicator which allows or prevents a user from signing on. |
| Lock Out Date | | E | 002 | Date a user's ID is locked due to invalid access attempts. |
| Lock Out Time | | E | 008 | Time a user's ID is locked due to invalid access attempts. |
| Corporate ID | | E | 006 | Code for each different corporate profile for a customer. |
| Geographic ID | | E | 006 | Unique code for each different geographic profile used. |
| Distribution Tickler Flag | | E | 001 | Flag to indicate new forms have arrived in the database. |

Key Data:

| Primary Key | (CLF Customer ID, User ID) |
|---|---|
| Foreign Key | FK_USERA (CLF Customer ID, Corporate ID)<br>References Corporate Profile<br>On Delete Restrict; |
| Foreign Key | FK_USERB (CLF Customer ID, Geographic ID)<br>References Geographic Profile<br>On Delete Restrict; |
| Foreign Key | FK_USERC (CLF Customer ID)<br>References Customer Profile<br>On Delete Restrict; |

Indexes:

| Name | On Columns | Type of Index |
|---|---|---|
| USERIDX | CLF Customer ID<br>User ID | Primary, Ascending, Unique |
| USERIDXA | CLF Customer ID<br>Corporate ID | Ascending |
| USERIDXB | CLF Customer ID<br>Geographic ID | Ascending |

Relationship to Other Tables:

| Parent of: | User/Site Thru CLF Customer ID, Site<br>Security Thru CLF Customer ID, User ID |
|---|---|
| Dependent of: | Customer Profile thru CLF Customer ID<br>Corporate Profile thru CLF Customer ID, Corporate ID<br>Geographic Profile thru CLF Customer ID, Geographic ID |

The site profile 155 is interrelated with the geographic and corporate profiles. A file in the site profile 155 is provided for each user location. Typically hardware, such as a printer 16 and/or a PC (e.g. 94, at 15), is provided at the geographically remote user locations which correspond to the files in the site profile 155. A typical configuration of the site profile file 155 is as follows:

| TABLE NAME: SITE PROFILE ALIAS: ST | | | | |
|---|---|---|---|---|
| ELEMENT/RECORD | DB TABLE ELE. | KEY | LEN | DEFINITION |
| CLF Customer ID | ST_CLF_CUS_ID | 1 | 006 | Uniquely identifies each customer. |
| Site ID | ST_SITE_ID | 2 | 006 | Identifier to uniquely identify a site for a customer. |
| Site Description | ST_DESCRIPTION | E | 030 | Description of site |
| Corporate ID | ST_CORP_ID | E | 006 | Code for each different corporate profile for a customer |
| Geographic ID | ST_GEO_ID | E | 006 | Unique code for each different geographic profile used |
| Modem Phone | ST_MODEM_TEL | E | 015 | The phone number to be dialed for communications. |
| Network ID | ST_NETWORK_ID | E | 004 | The physical communication identifier |
| Data Type | ST_CHR_TYP | E | 001 | Code to indicate if the site is ASCII or EBCDIC data type |

Key Data:

Primary Key  (CLF Customer ID, Site ID)
Foreign Key  FK_SITEA (CLF Customer ID)
             References Customer Profile
             On Delete Restrict;
Foreign Key  FK_SITEB (CLF Customer ID, Corporate ID)
             References Corporate Profile
             On Delete Restrict;
Foreign Key  FK_SITEC (CLF Customer ID, Geographic ID)
             References Geographic Profile
             On Delete Restrict;

Indexes:

| Name | On Columns | Type of Work |
|---|---|---|
| SITEIDX | CLF Customer ID<br>Site ID | Primary, Ascending, Unique |
| SITEIDXA | CLF Customer ID<br>Corporate ID | Ascending |
| SITEIDXB | CLF Customer ID<br>Geographic ID | Ascending |

Relationship to Other Tables:

Parent of:     User/Site Profile thru CLF Customer ID, Site ID
               Site/Printer Profile thru CLF Customer ID, Site ID
               Site/Group Profile thru CLF Customer ID, Site ID
Dependent of:  Customer Profile thru CLF Customer ID
               Corporate Profile thru CLF Customer ID, Corporate ID
               Geographic Profile thru CLF Customer ID, Geographic ID Interrelated with the user profile 154 and the site profile 155 is the user/site data file 156. This relates a user to a site; a user can only access forms and perform functions as they relate to their accelerated site. A typical configuration of element 156 is as follows:

| TABLE NAME: SITE/USER DATA ALIAS: SU | | | | |
|---|---|---|---|---|
| ELEMENT/RECORD | DB TABLE ELE. | KEY | LEN | DEFINITION |
| CLF Customer ID | | 1 | 006 | Uniquely identifies each customer. |
| Site ID | | 2 | 006 | Identifier to uniquely identify a site for a customer |
| User ID | | 3 | 006 | The Logon ID associated with each CLE user. |

Key Data

Primary Key  (CLF Customer ID, Site ID, User ID)
Foreign Key  FK_SUA (CLF Customer ID, User ID)

-continued

| TABLE NAME: SITE/USER DATA ALIAS: SU |
|---|
| References User Profile<br>On Delete Cascade;<br>Foreign Key  FK_SUB (Clf Customer ID, Site ID)<br>References Site Profile<br>On Delete Cascade; |

Indexes:

| Name | On Columns | Type of Index |
|---|---|---|
| SUIDX | CLF Customer ID<br>Site ID<br>User ID | Primary, Ascending, Unique |
| SUIDXA | CLF Customer ID<br>User ID | Ascending |
| SUIDXB | CLF Customer ID<br>Site ID | Ascending |

Relationship to Other Tables:

Dependent of:  User Profile thru CLF Customer ID, User ID

| TABLE NAME: SITE/USER DATA   ALIAS: SU |
| --- |
| Site Profile thru CLF Customer ID, Site ID |

The group profile file 157 relates to groups of forms. A group is a particular combination of electronic forms, i.e. a segmentation scheme for the forms, grouped for the purpose of distribution to sites or different organizations. A typical configuration of the group profile file 157 is as follows:

| TABLE NAME: GROUP PROFILE   ALIAS: GR | | | | |
| --- | --- | --- | --- | --- |
| ELEMENT/RECORD | DB TABLE ELE. | KEY | LEN | DEFINITION |
| CLF Customer ID | GR_CLF_CUS_ID | 1 | 006 | Uniquely identifies each customer. |
| Group ID | GR_GRP_ID | 2 | 006 | Code to uniquely identify the distribution group. |
| Group Sequence Number | GR_GRP_SEQ_NBR | 3 | 003 | Sequence number to control level within a group. |
| Group Description | GR-GRP_DSC | E | 030 | Description of the distribution group. |

Key Data:

Primary Key    (CLF Customer ID, Group ID, Group Sequence Number)
Foreign Key    FK_GRPA (CLF Customer ID)
                References Customer Profile
                On Delete Cascade;

Indexes:

| Name | On Columns | Type of Index |
| --- | --- | --- |
| GRPIDX | CLF Customer ID<br>Group ID<br>Group Sequence Number | Primary, Ascending, Unique |

Relationship to Other Tables:

Parent of:    Site/Group thru CLF Customer ID, Group ID, Group Sequence Number
              Group/Form thru CLF Customer ID, Group ID, Group Sequence Number
Dependent of:    Customer Profile thru CLF Customer ID Interfacing between the site profile 155 and the group profile 157 is the site/group data file 158. This assigns a group to a site—i.e. specific groups of forms are distributed to the sites they are associated with. A typical configuration of the file 158 is as follows:

| TABLE NAME: SITE/GROUP DATA   ALIAS: SG | | | | |
| --- | --- | --- | --- | --- |
| ELEMENT/RECORD | DB TABLE ELE. | KEY | LEN | DEFINITION |
| CLF Customer ID | SG_CLF_CUS-ID | 1 | 006 | Uniquely identifies each customer. |
| Site ID | SG_SITE_ID | 2 | 006 | Identifier to uniquely identify a site for a customer |
| Group ID | SG_GRP_ID | 3 | 006 | Code to uniquely identify the distribution group |
| Group Sequence Number | SG_GRP_SEQ_NBR | 4 | 003 | Sequence number to control level within a group |

Key Data:

Primary Key    (CLF Customer ID, Site ID, Group ID, Group Sequence Number)
Foreign Key    FK_SGA (CLF Customer ID, Site ID)
                References Site Profile
                On Delete Cascade;
Foreign Key    FK_SGB (CLF Customer ID, Site ID)
                References Group Profile
                On Delete Cascade;

Indexes:

| Name | On Columns | Type of Index |
| --- | --- | --- |
| SGIDX | CLF Customer ID<br>Site ID<br>Group ID | Primary, Ascending, Unique |

-continued

| TABLE NAME: SITE/GROUP DATA ALIAS: SG | | | |
|---|---|---|---|
| SGIDXA | Group Sequence Number<br>CLF Customer ID<br>Site ID | Ascending | |
| SGIDXB | CLF Customer ID<br>Group ID<br>Group Sequence Number | Ascending | |

Relationship to Other Tables:

Dependent of: Site Profile thru CLF Customer ID, Site ID
Group Profile thru CLF Customer ID, Group ID, Group Sequence Number The printer profile file 159 has information regarding the model and manufacture of each of the printers that will be controlled by the computers of the system 10. The typical configuration of the printer profile file 159 is as follows:

| TABLE NAME: PRINTER PROFILE ALIAS: PP | | | | | |
|---|---|---|---|---|---|
| ELEMENT/RECORD | DB TABLE ELE. | KEY | LEN | DEFINITION | |
| CLF Customer ID | PP_CLF_CUS_ID | 1 | 006 | Uniquely identifies each customer. | |
| Printer ID | PP_PTR_ID | 2 | 006 | Code to uniquely identify each printer. | |
| Printer Type | PP_PTR_TYP | E | 002 | Code of printer type (see list below). | |
| Printer Type Description | PP_PTR_DSC | E | 015 | Description of the printer and printer type | |
| Printer MFR Name | PP_PTR_MFR_NME | E | 020 | Name of printer manufacturer | |

Key Data:

Primary Key (CLF Customer ID, Printer ID)
Foreign Key FK_PTRA (CLF Customer ID)
References Customer Profile
On Delete Cascade;

Indexes:

| Name | On Columns | Type of Index |
|---|---|---|
| PTRIDX | CLF Customer ID<br>Printer ID | Primary, Ascending, Unique |

Relationship to Other Tables:

Parent of: Site/Printer Thru CLF Customer ID, Printer ID
Dependent of: Customer Profile thru CLF Customer ID Printer Type Codes:

| Code | Description |
|---|---|
| HP | HP PCL |
| H5 | HP PCL 5 |
| AF | AFP |
| MF | META FILE |
| DT | DOT MATRIX |
| XC | XICS |
| PS | POSTSCRIPT |
| DC | DOT MATRIX COLOR |

Interrelated with the site profile file 155 and the printer profile file 159 is the site/printer data file 160. Some forms will be printed at the user sites, while other forms will be printed by the vendor. The site/printer data file 160 is utilized only for those forms which will be printed by the user at the user's locations, which printers (e.g. 16) may have different printer formats. A typical configuration of the site/printer data file 160 is as follows:

| TABLE NAME: SITE/PRINTER DATA   ALIAS: SP | | | | |
|---|---|---|---|---|
| ELEMENT/RECORD | DB TABLE ELE. | KEY | LEN | DEFINITION |
| CLF Customer ID | SP_CLF_CUS_ID | 1 | 006 | Uniquely identifies each customer |
| Site ID | SP_SITE_ID | 2 | 006 | Identifier to uniquely identify a site for a customer |
| Printer ID | SP_PTR_ID | 3 | 006 | Identifier to uniquely identify a printer |
| Printer Type | SP_PTR-TYP | 4 | 002 | Code of printer type (see list below under printer profile) |

Key Data:

| | |
|---|---|
| Primary Key | (CLF Customer ID, Site ID, Printer Type) |
| Foreign Key | FK_SPA (CLF Customer ID, Site ID) References Site Profile On Delete Cascade; |
| Foreign Key | FK_SPB (CLF Customer ID, Printer ID) References Printer Profile On Delete Cascade; |

Indexes:

| Name | On Columns | Type of Index |
|---|---|---|
| SPIDX | CLF Customer ID<br>Site ID<br>Printer ID | Primary, Ascending, Unique |
| SPIDXA | CLF Customer ID<br>Site ID | Ascending |
| SPIDXB | CLE Customer ID<br>Printer ID | Ascending |

Relationship to Other Tables:

| | |
|---|---|
| Parent of: | Distribution Profile thru CLF Customer ID, Site ID, Printer ID |
| Dependent of: | Printer Profile thru CLF Customer ID, Printer ID<br>Site Profile Thru CLF Customer ID, Site ID |

The distribution data file 161 is interrelated to the site/printer data file 160 and the form profile data file 162. The typical configuration of the distribution data file 161 is as follows:

| TABLE NAME: DISTRIBUTION PROFILE   ALIAS: DP | | | | |
|---|---|---|---|---|
| ELEMENT/RECORD | DB TABLE ELE. | KEY | LEN | DEFINITION |
| CLF Customer ID | DP_CLF_CUS_ID | 1 | 006 | Uniquely identifies each customer |
| FORM ID | DP_FRM_ID | 2 | 008 | Code to uniquely identify a form for a customer |
| SITE ID | DP_SIT_ID | 3 | 006 | Identifier to uniquely identify a site for a customer |
| Printer Type | DP_PTR_TYPE | 4 | 002 | Code of printer type (see list on printer profile) |
| Printer ID | DP_PTR_ID | 5 | 006 | Code to uniquely identify a printer |
| Release Code | SP_RLS_CDE | E | 001 | Code to indicate release action (see list below) |
| Xmit Date | DP_XMIT_DTE | E | 008 | Date the form was transmitted (released) to the site |

Key Data:

| | |
|---|---|
| Primary Key | (CLF Customer ID, Form ID, Site ID, Printer ID) |
| Foreign Key | FK_DPA (CLF Customer ID, Form ID) References Form Profile on Delete Cascade; |
| Foreign Key | FK_DPB (CLF Customer ID, Site ID, Printer ID, Printer Type) References Site/Printer Data On Delete Cascade; |

Indexes:

| Name | On Columns | Type of Index |
|---|---|---|
| DPIDX | CLF Customer ID<br>Form ID<br>Site ID<br>Printer ID | Primary, Ascending, Unique |
| DPIDXA | CLF Customer ID<br>Form ID | Ascending |
| DPIDXB | CLF Customer ID<br>Site ID<br>Printer ID | Ascending |

-continued

| TABLE NAME: DISTRIBUTION PROFILE   ALIAS: DP | | |
|---|---|---|
| DPIDXC | Printer Type<br>CLF Customer ID<br>Printer Type | Ascending |

Relationship to Other Tables:

Dependent of: Site/Printer Data thru CLF Customer ID, Site ID, Printer ID
Form Profile thru CLF Customer ID, Form ID Release Codes:

| Code | Description |
|---|---|
| 0 | Form is current |
| 1 | Form is new to distribution |
| 2 | Forms has been revised |
| 9 | Form is inactive (logically deleted) |

The form profile data file 162 has stored therein the elements of each form and characteristics of the form, e.g. descriptive information. Typically, a number of electronic forms will be stored therein that are identical except for printer formatting since it is necessary to be able to print the same form on a number of different types of printers. The necessary elements for recordation of each form include a unique identifier, a description of the form, the name of the software package (e.g DOCS) used to design the form, a code to indicate whether the form is new or revised, when the form was created and/or last revised, when the form is to be released and/or the previous release dates, the number of parts to the form, the code to identify whether it has a landscape or portrait orientation, the length of the form, and the width of the form. A typical configuration of the form profile data file 162 is as follows:

| TABLE NAME: FORM PROFILE   ALIAS: FP | | | | |
|---|---|---|---|---|
| ELEMENT/RECORD | DB TABLE ELE. | KEY | LEN | DEFINITION |
| CLF Customer ID | FP_CLF_CUS_ID | 1 | 006 | Uniquely identifies each customer. |
| Form ID | FP_FORM_ID | 2 | 008 | Code to uniquely identify a form for a customer. |
| Form Sub ID | FP_FRM_SUB_ID | 3 | 003 | Code to uniquely identify each revision of the form. |
| Customer Catalog Number | FP_CUS_CAT_NBR | E | 015 | Customers number to identify the form. |
| Form Description | FP-Description | E | 030 | Description of form. |
| Form Design Software | FP_Design_SFW | E | 010 | Software package used to design the form. |
| Form Status Code | FP_STA_CDE | E | 001 | Code to indicate that the form is new or revised. |
| Form Creation Date | FP_CRE-DATE | E | 010 | Date form was created (from FAP). |
| Form Revision Date | FP_REV_DATE | E | 010 | Date form was last revised (from FAP). |
| Form Release Date | FP_RLS_DATE | E | 010 | Date the form is to be released to users. |
| Prior Release Date | FP_OLD_RLS_DTE | E | 010 | Date of the previous release date |
| Category ID | FP_CTG_ID | E | 010 | Code of form category to which a form is assigned |
| FAP ID | FP_FAP_ID | E | 010 | Unique identifier of the FAP that created the form. |
| FAP Phone Modem Number | FP_FAP_TEL_MODEM | E | 015 | Telephone number of the FAP modem. |
| Number of Parts | FP_NBR_PRT | E | 003 | Number of parts to the form. |
| Forms Orientation | FP_ORT | E | 001 | Code to identify landscape (L) or portrait (P) mode. |
| Length of Form | FP_LEN | E | 008 | Length of the form. |
| Width of the Form | FP_WID | E | 008 | Width of the form. |

Key Data:

| Primary Key | (CLF Customer ID, Form ID, Form Sub ID) |
|---|---|
| Foreign Key | FK_FPA (CLF Customer ID)<br>References Customer Profile<br>On Delete Cascade; |
| Foreign Key | FK_FPB (CLF Customer ID, Category ID)<br>References Category Profile<br>On Delete Set Null; |

Indexes:

| Name | On Columns | Type of Index |
|---|---|---|
| FPIDX | CLF Customer ID<br>Form ID<br>Form Sub ID | Primary, Ascending, Unique |
| FPIDXA | CLF Customer ID<br>Category ID | Ascending |

Relationship to Other Tables:

Parent of: Distribution Profile thru CLF Customer ID, Form ID

TABLE NAME: FORM PROFILE  ALIAS: FP

| | |
|---|---|
| Dependent of: | Form Output Format thru CLF Customer ID, Form ID, Form Sub ID<br>Form Field Information thru CLF Customer ID, Form ID, Sub ID<br>Customer Profile thru CLF Customer ID<br>Category Profile thru CLF Customer ID, Category ID |

The category table file 163 is utilized to indicate the form category to which a particular form has been assigned. A typical configuration of the category table 163 is as follows:

TABLE NAME: CATEGORY TABLE  ALIAS: CT

| ELEMENT/RECORD | DB TABLE ELE. | KEY | LEN | DEFINITION |
|---|---|---|---|---|
| CLF Customer ID | CT_CLF_CUS_ID | 1 | 006 | Uniquely identifies each customer. |
| Category ID | CT_CTG_ID | 2 | 010 | Code of form category to which a form is assigned. |
| Category Description | CT_CTG_DSC | E | 030 | Description of form category. |

Key Data:

Primary Key (CLF Customer ID, Category ID)
Foreign Key (FK_CTA (CLF Customer ID)
References Customer Profile
on Delete Restrict;

| Name | On Columns | Type of Index |
|---|---|---|
| Indexes: | | |
| CTIDX | CLF Customer ID<br>Category ID | Primary, Ascending, Unique |
| Relationship to Other Tables: | | |
| Parent of: | Form Profile thru Category ID | |
| Dependent of: | Customer Profile thru CLF Customer ID | |

Also interrelated with the form profile data file 162 are the usage statistics file 164, the form field information file 165, and the form output format file 166. A typical configuration of the usage statistics file 164 is as follows:

TABLE NAME: USAGE STATISTICS  ALIAS: STAT

| ELEMENT/RECORD | DB TABLE ELE. | KEY | LEN | DEFINITION |
|---|---|---|---|---|
| CLF Customer ID | | E | 006 | Uniquely identifies each customer. |
| Form ID | | E | 008 | Code to uniquely identify a form for a customer. |
| Form Sub ID | | E | 002 | Code to uniquely identify each revision of the form. |
| User ID | | E | 006 | The logon ID associated with each CLF user. |
| Printer Type | | E | 002 | Code of printer type (HP-PCL, Postscript, etc.). |
| Site ID | | E | 006 | Identifier to uniquely identify a site for a customer. |
| Date Used | | E | 002 | Date the form was used |
| Time Used | | E | 002 | Time the form was used |
| Number of Copies | | E | 002 | The number of copies printed at user site. |

A typical configuration of the form field information file 165 used for form fill capabilities is as follows:

NAME: FORM FIELD INFORMATION  ALIAS: FF

| ELEMENT/RECORD | DB TABLE ELE. | KEY | LEN | DEFINITION |
|---|---|---|---|---|
| CLF Customer ID | | 1 | 006 | Uniquely identifies each customer. |
| Form ID | | 2 | 008 | Code to uniquely identify a form for a customer. |
| Form SUB ID | | 3 | 003 | Code to uniquely identify each revision of the form. |
| Field Number | | 4 | 003 | Sequential number of fields within a form. |
| Field Name | | E | 020 | Name of the field |

| NAME: FORM FIELD INFORMATION ALIAS: FF | | | |
|---|---|---|---|
| Data Description | E | 040 | Concise description of data used in this field |
| Field Length | E | 002 | Describes the length of the field |
| Field Format | E | 005 | Describes the field format. |
| Field Type | E | 001 | Defines the field type. I.E. Numeric |
| Field Location | E | 040 | The location of the data in the users file |
| Key Data: | | | |

Primary Key (CLF Customer ID, Form ID, Form Sub ID, Field Number)
Foreign Key FK_FF (CLF Customer ID, Form ID, Form Sub ID)
References Form Profile
on Delete Cascade;

| Name | On Columns | Type of Index |
|---|---|---|
| Indexes: | | |
| FFIDX | CLF Customer ID<br>Form ID<br>Form Sub ID<br>Field Number | Primary, Ascending, Unique |
| Relationship to Other Tables: | | |
| Dependent of: | Form Profile thru CLF Customer ID, Form ID, Form Sub ID | |

A typical configuration of the form output format file 166 provides how the form is to be printed—the various print formats available. It is as follows (note that the output format of each form may be "source", "print ready" (and various versions), or "compiled"):

| NAME: FORM OUTPUT FORMAT ALIAS: FO | | | | |
|---|---|---|---|---|
| ELEMENT/RECORD | DB TABLE ELE. | KEY | LEN | DEFINITION |
| CLF Customer ID | FO_CLF_CUS_ID | 1 | 006 | Uniquely identifies each customer. |
| Form ID | FO_FORM_ID | 2 | 008 | Code to uniquely identify a form for a customer. |
| Form Sub ID | FO_FRM_SUB_ID | 3 | 002 | Code to uniquely identify each revision of the form. |
| Output Format Type | FO_FRMT_TYP | 4 | 001 | Code that describes from type S = Source C = Compile P = Print Ready |
| Printer Type | FO_PTR_TYP | 5 | 002 | Code of printer type (HP-PCL, Postscript, etc.). |
| Form Format File ID | FO_FILE_NAME | E | 012 | File ID where form format data is stored. DOS 8.3 Format. |
| Compression Indicator | FO_COMPRESS_IND | E | 001 | Code to tell if the form is compressed. Y = Yes N = No |
| Key Data: | | | | |

Primary Key (CLF Customer ID, Form ID, Form Sub IS, Output Format Type, Printer Type)
Foreign Key FK_FOA (CLF Customer ID, Form ID, Form Sub ID)
References Form Profile
On Delete Cascade;

| Name | On Columns | Type of Index |
|---|---|---|
| Indexes: | | |
| FOIDX | CLF Customer ID<br>Form ID<br>Form Sub ID<br>Output Format Type<br>Printer Type | Primary, Ascending, Unique |
| Relationship to Other Tables: | | |
| Dependent of: | Form Profile thru CLF Customer ID, Form ID, Form Sub ID | |

The security interface for all of the files is provided through menu file 167. A typical configuration of the file 167 is as follows:

| | | | | |
|---|---|---|---|---|
| NAME: MENU ALIAS: MENU | | | | |
| ELEMENT/RECORD | DB TABLE ELE. | KEY | LEN | DEFINITION |
| Security Level<br>Program ID<br>Program Name<br>Program Desc<br>Screen Loc<br>Trans ID<br>Key Data: | | 1 | 000 | Defines the level of authority for each user. |

Primary Key (CLF Customer ID, ????)
Foreign Key CATA (CLF Customer ID)
References Customer Profile
On Delete Cascade;

Where desired, as a dependent of the group profile file 157, a group/form file may be provided associates forms to a group. The group/form file is illustrated at 169 in FIG. 12. A typical configuration of the group/form file, if utilized, is as follows:

| | | | | |
|---|---|---|---|---|
| NAME: GROUP/FORM ALIAS: GF | | | | |
| ELEMENT/RECORD | DB TABLE ELE. | KEY | LEN | DEFINITION |
| CLF Customer ID | | 1 | 006 | Uniquely identifies each customer. |
| Group ID | | 2 | 006 | Code to uniquely identify the distribution group. |
| Group Sequence Number | | 3 | 003 | Sequence number to control level within a group |
| Form ID | | 4 | 008 | Code to uniquely identify a form for a customer. |
| Key Data: | | | | |

Primary Key (CLF Customer ID, Group ID, Group Sequence Number, Form ID)
Foreign Key FK_GFA (CLF Customer ID, Group ID, Group Sequence Number)
References Group Profile
On Delete Cascade;

| Name | On Columns | Type of Index |
|---|---|---|
| Indexes: | | |
| GFIDX | CLF Customer ID<br>Group ID<br>Group Sequence Number<br>Form ID | Primary, Ascending, Unique |
| GFIDXA | CLF Customer ID<br>Group ID<br>Group Sequence Number | Ascending |
| GFIDXB | CLF Customer ID<br>Form ID | Ascending |
| Relationship to Other Tables: | | |
| Dependent of: | Group Profile thru CLF Customer ID, Group ID,<br>Group Sequence Number | |

After selection of the appropriate form and other information, the form is printed and/or displayed, as indicated schematically at 168 in FIG. 11.

Figure 12:
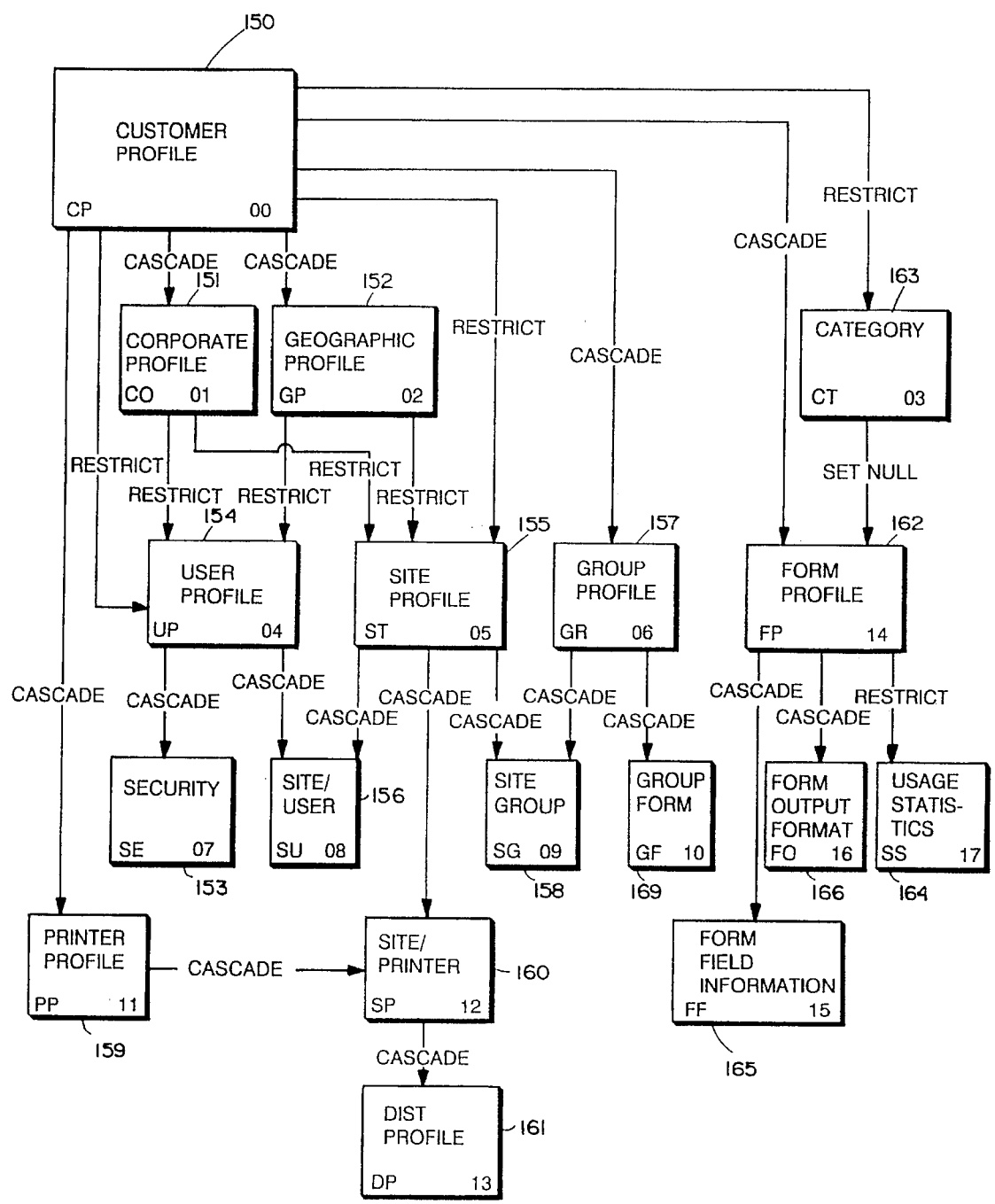
FIG. 12 is a schematic showing the CLF data base relationships, for detailed implementation according to the invention.

FIG. 12 contains the same basic information as FIG. 11, but shows the data base relationships for referential integrity purposes, and is self-explanatory.

FIGS. 13a through 13i provide a detailed structure chart which shows the program-defined menu structure for the CLF 12. The interrelationship between the individual figures are specifically illustrated thereon, and the relationships between the various elements are self-explanatory from FIGS. 13a through 13i. Elements 190 are elaborated upon in FIG. 14.

Figure 13A:
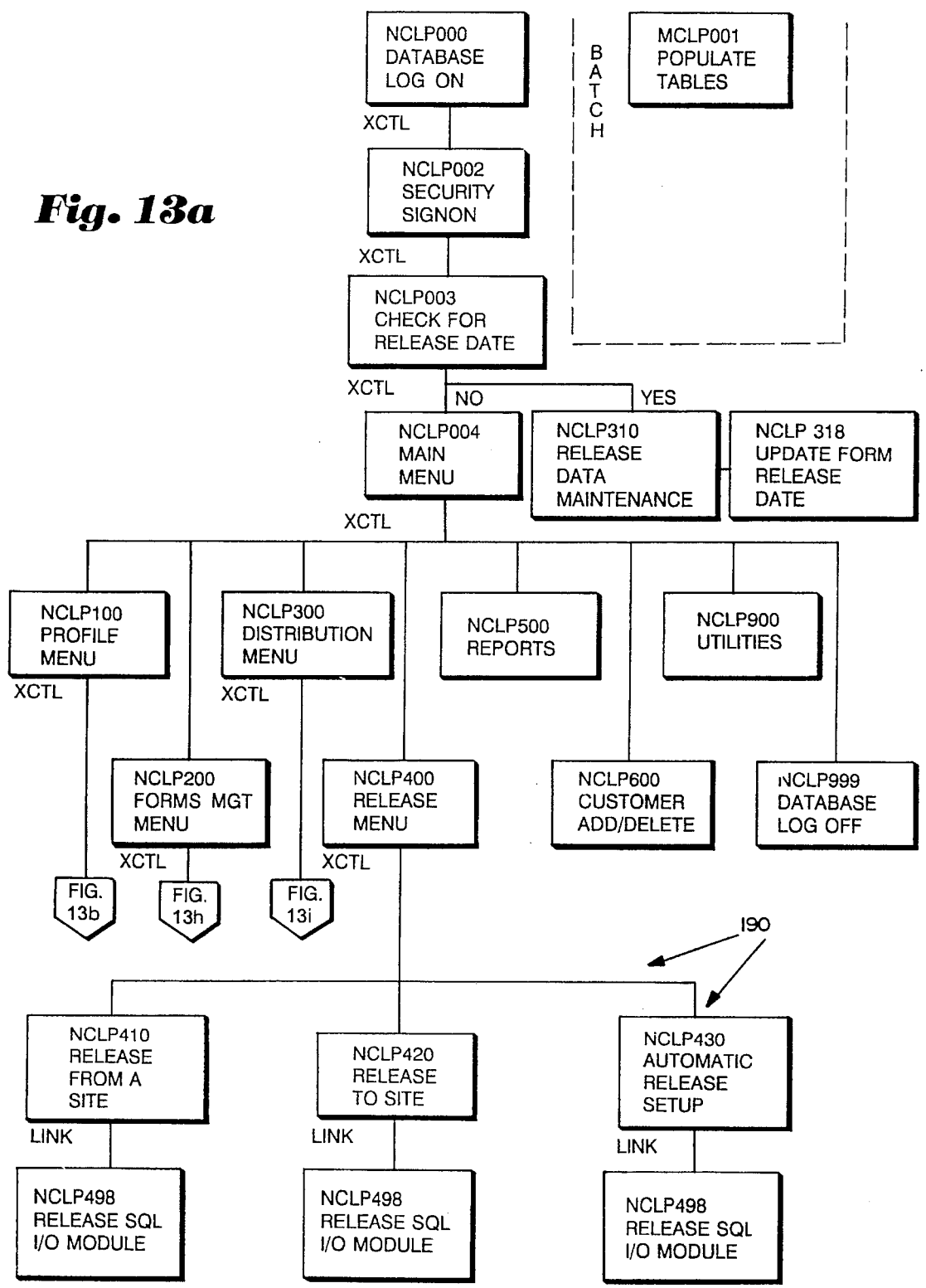
FIGS. 13a–13i provide a schematic structure chart for the CLF, for detailed implementation according to the invention.
Figure 13B:
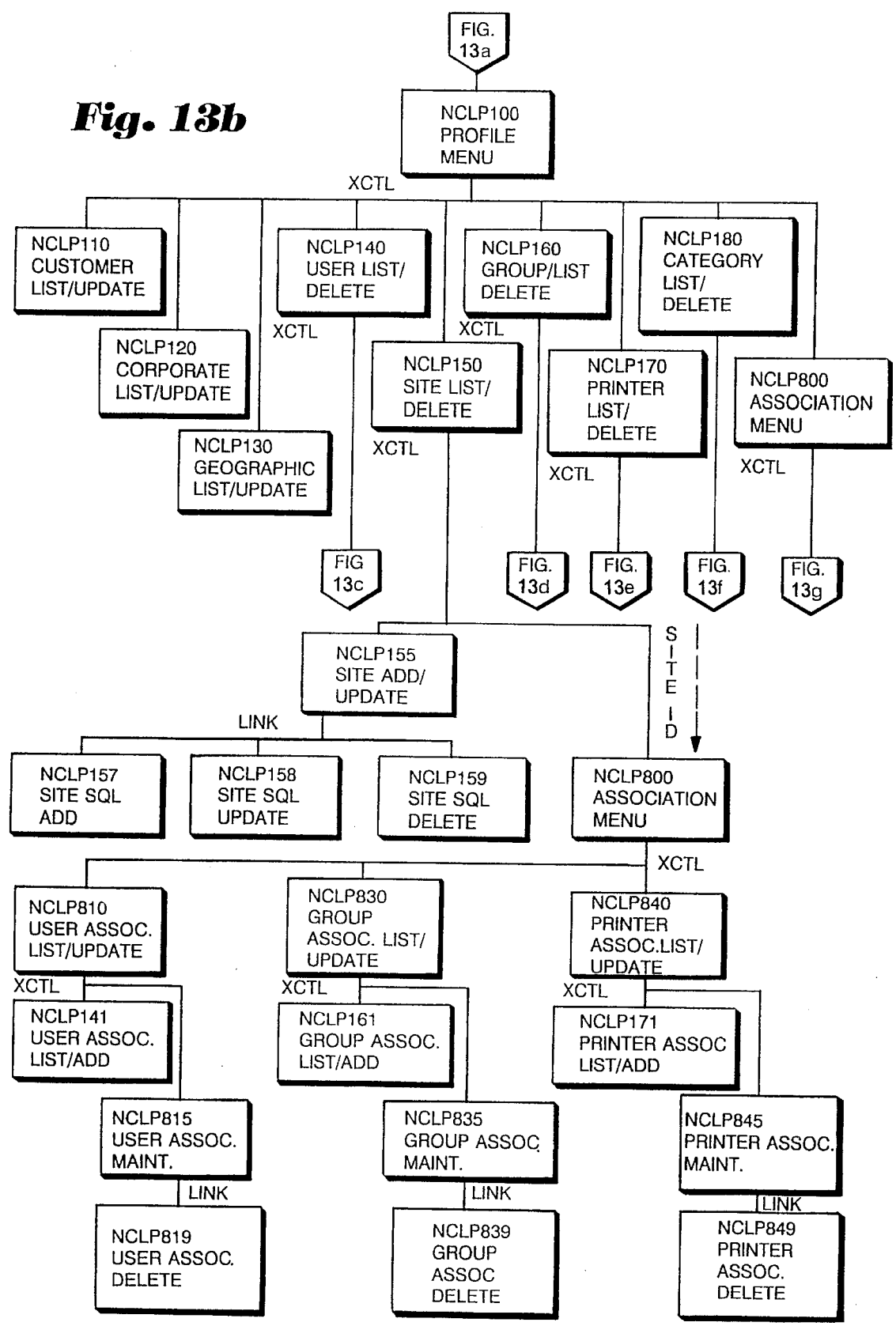
Figure 13C:
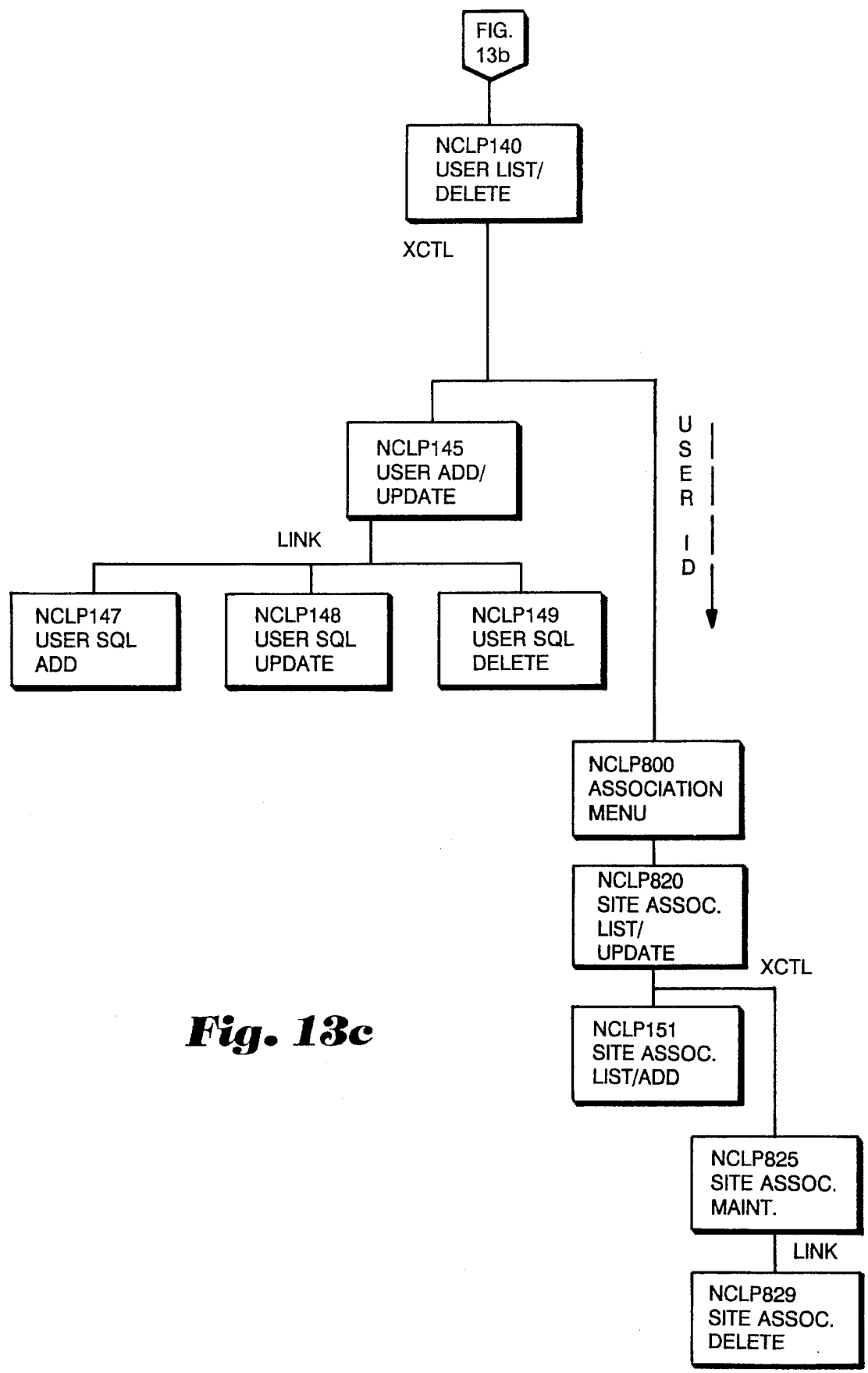
Figure 13D:
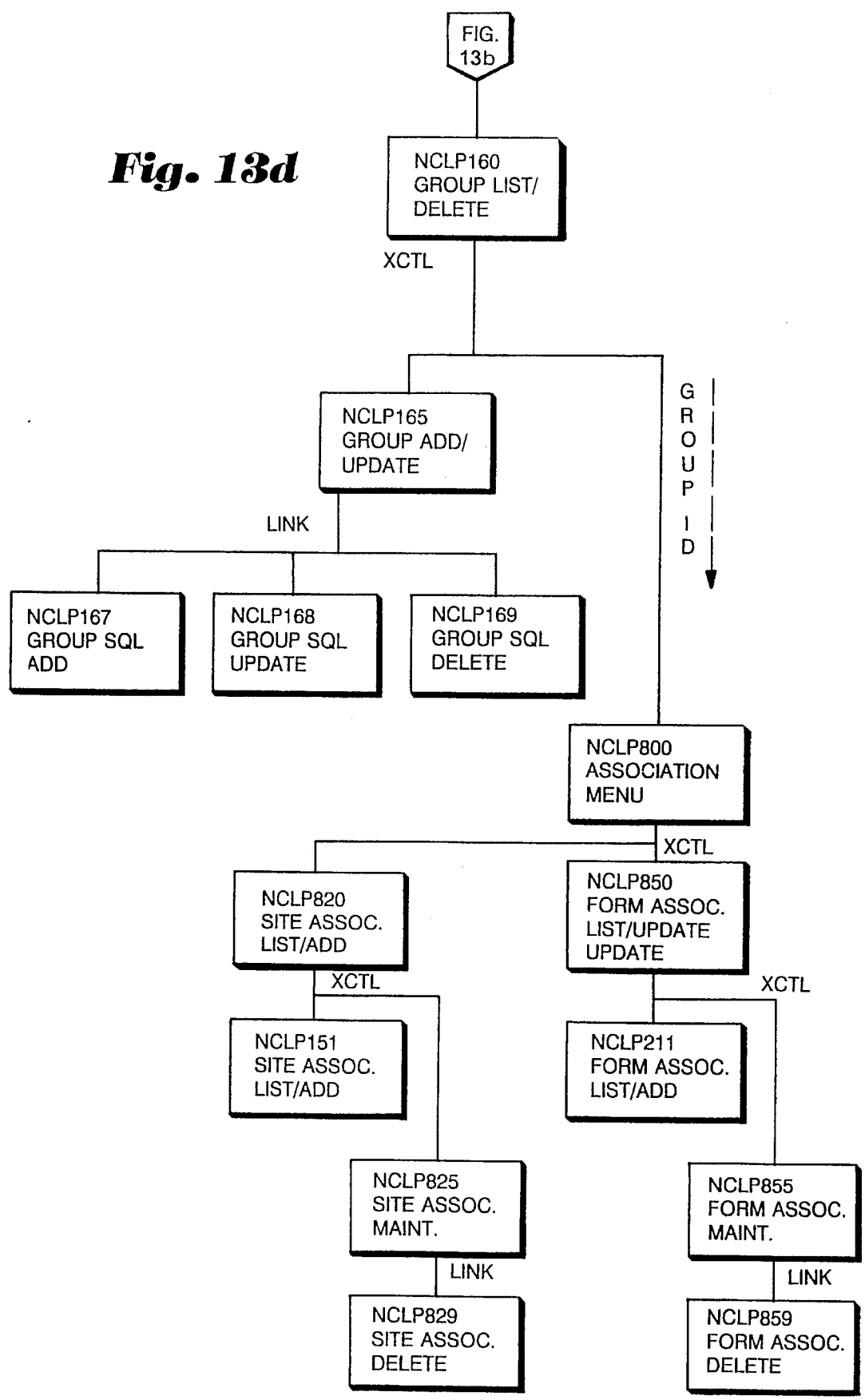
Figure 13E:
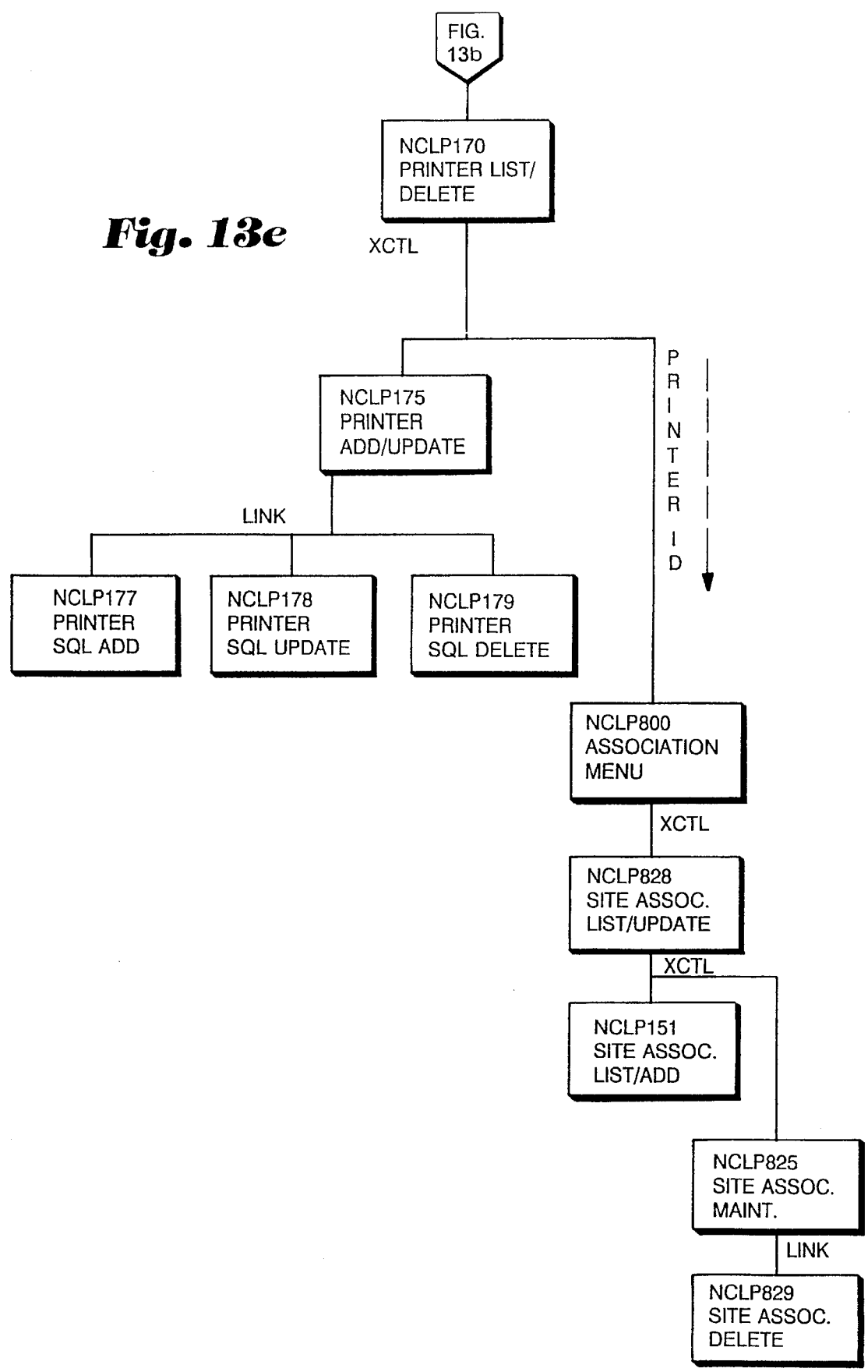
Figure 13F:
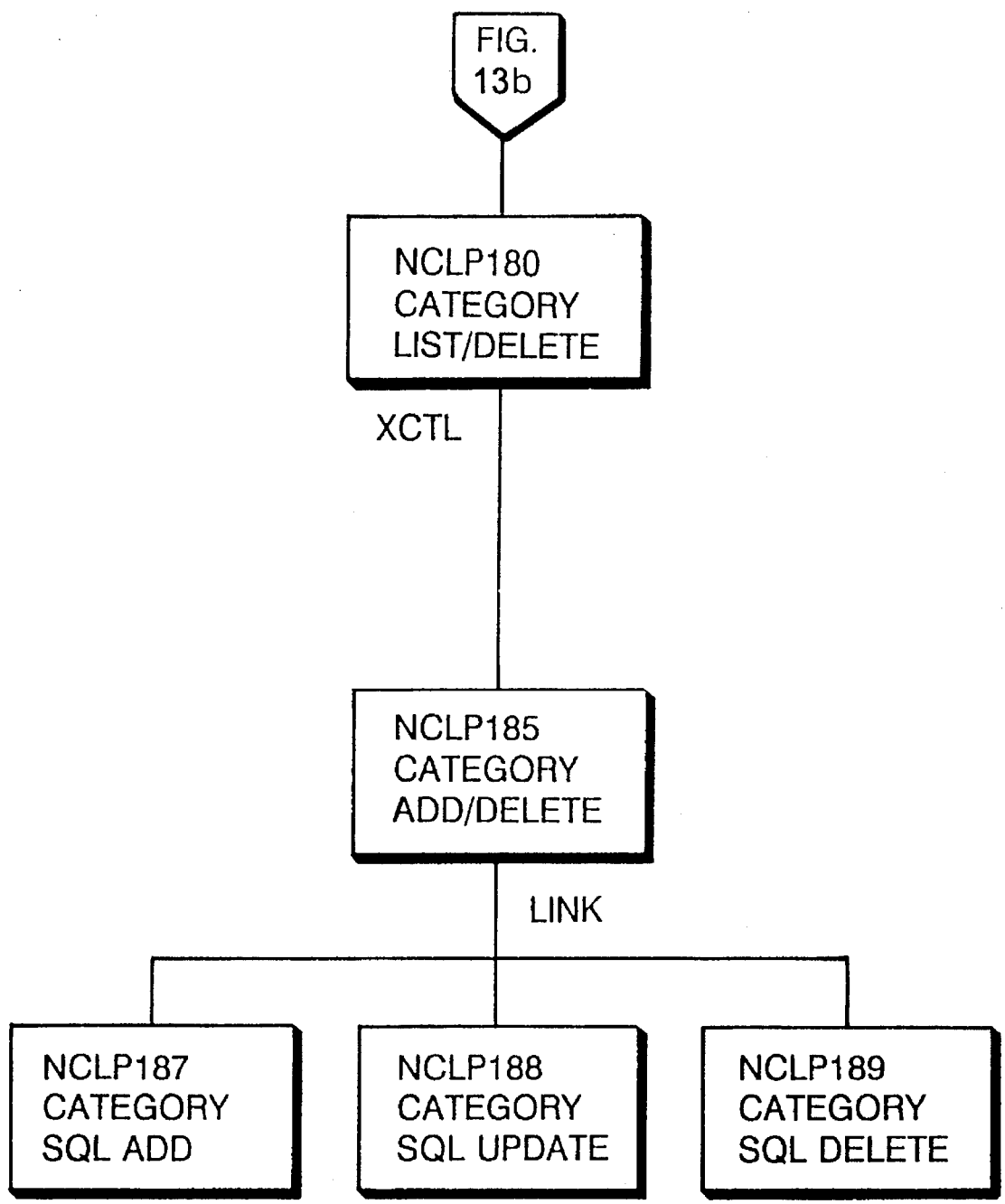
Figure 13G:
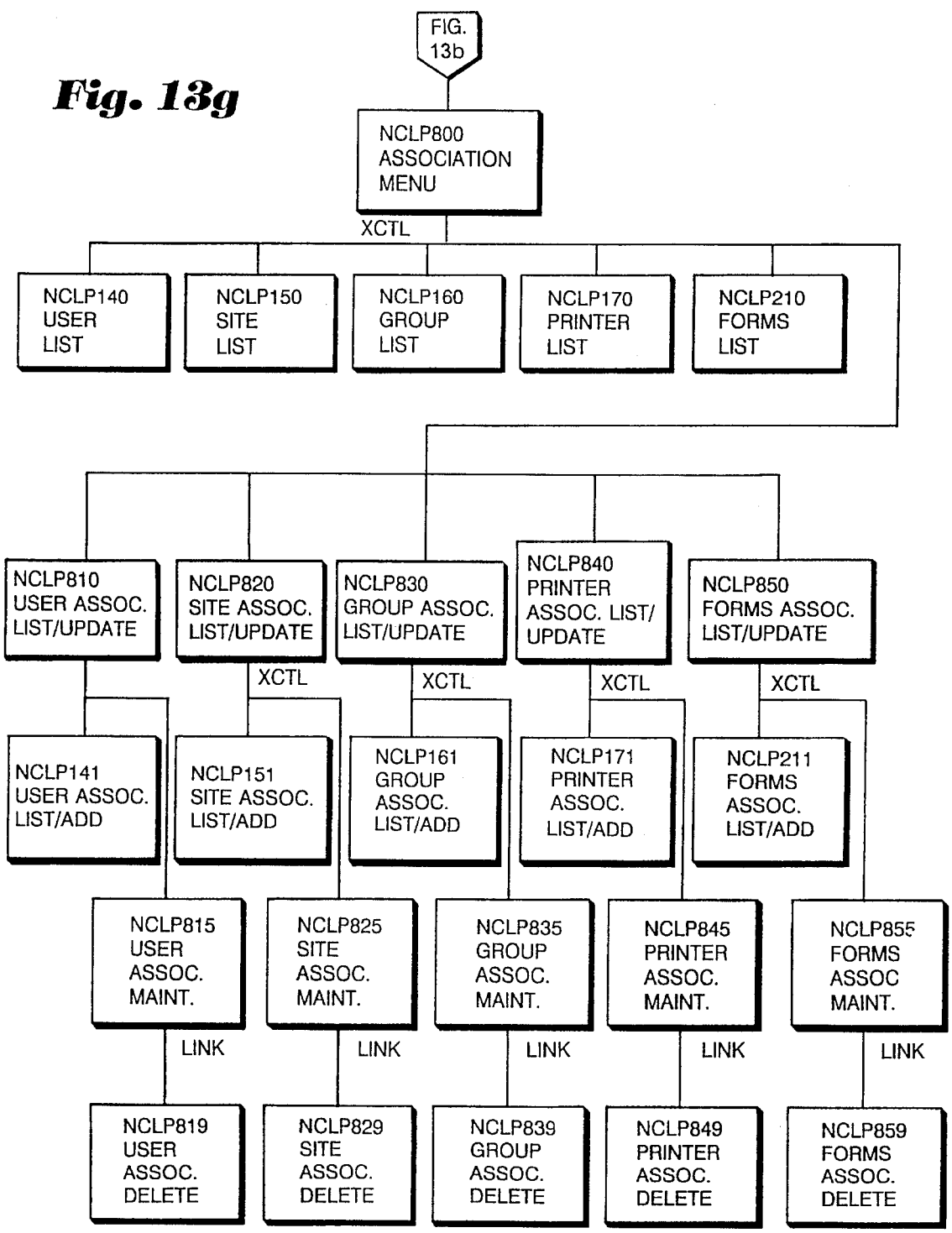
Figure 13H:
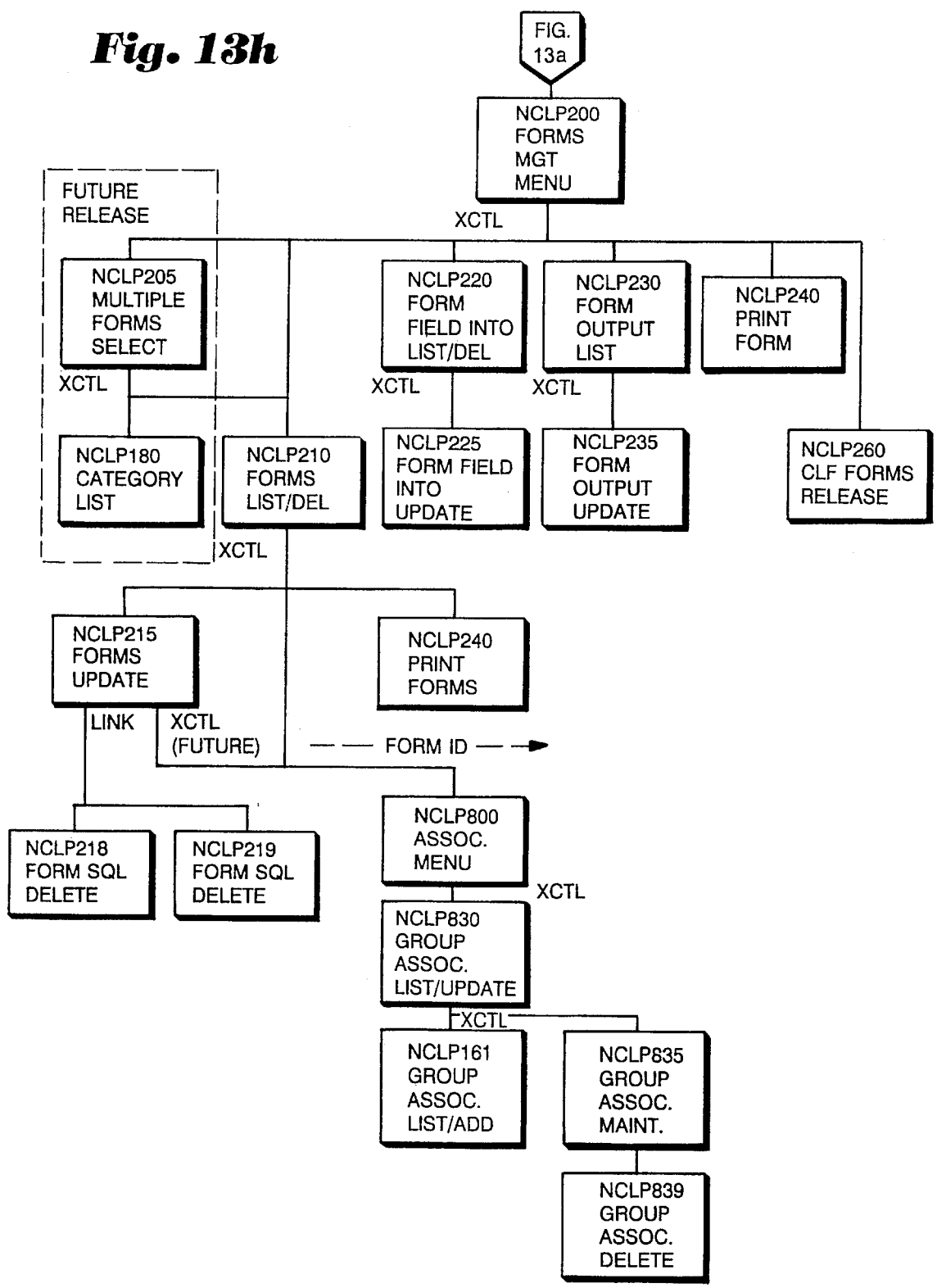
Figure 13I:
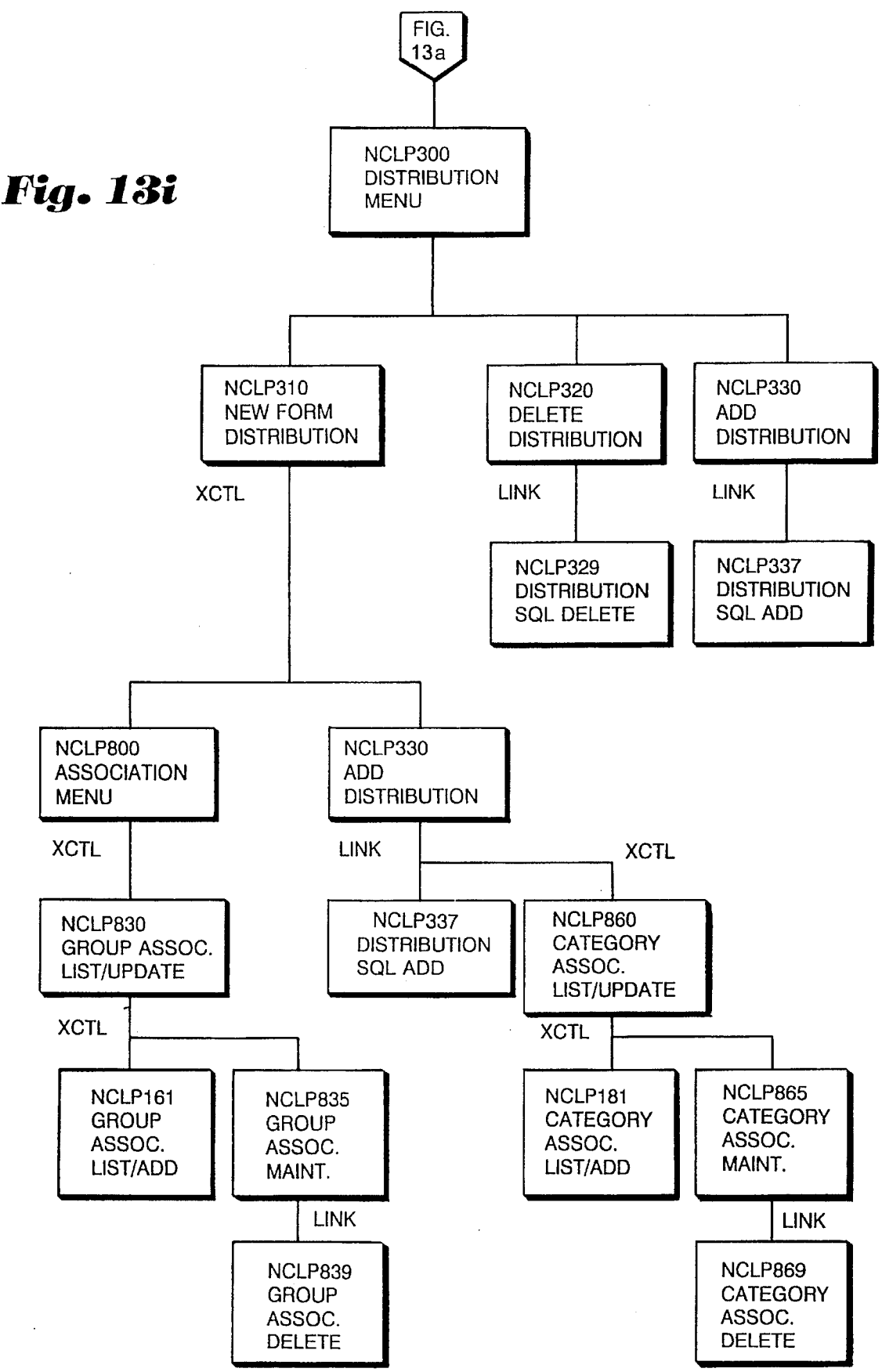
Figure 14:
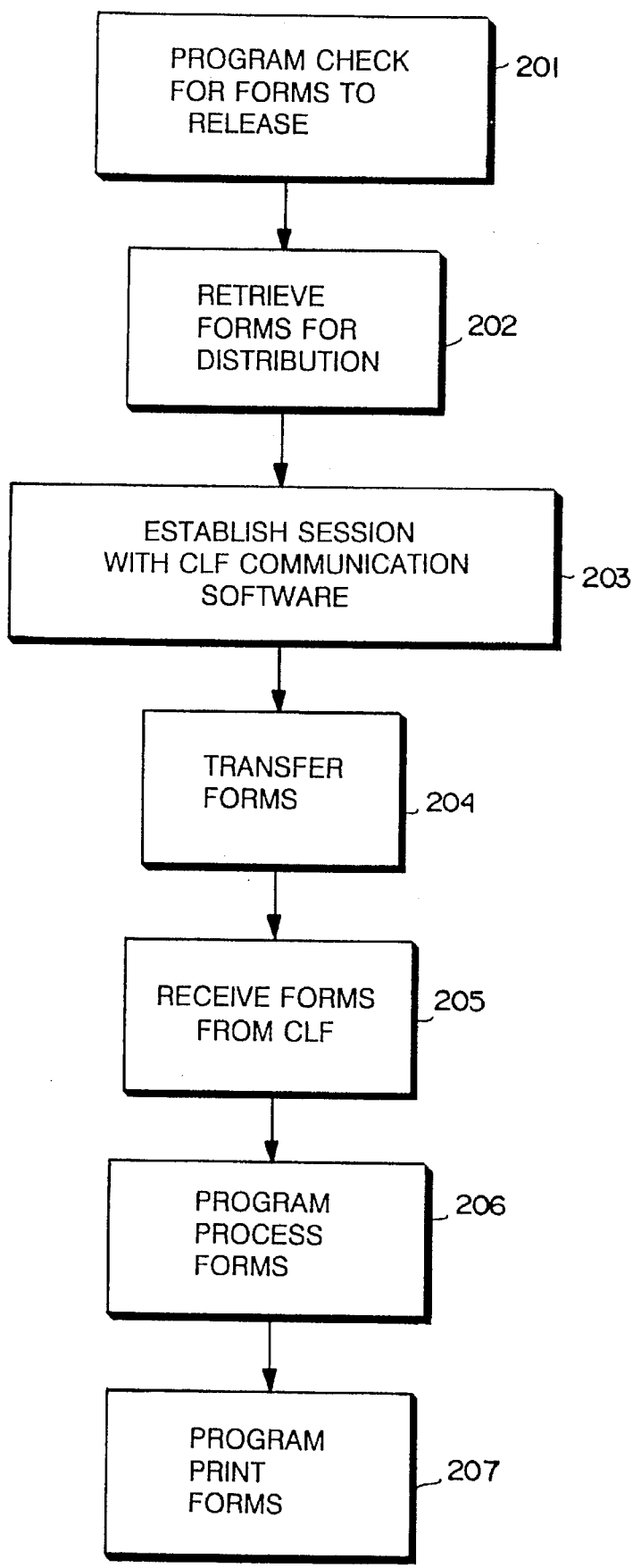
FIG. 14 is an exemplary flow diagram for releasing forms from the CLF to end user sites based upon a distribution profile.

FIG. 14 illustrates the general flow for the release of forms from the CLF 12 to the end user sites 15 (190 in FIG. 13a). At 201, the CLF software periodically (e.g every weekday) polls the distribution profile for forms in the computer hosting the CLF to release electronic forms based upon release date (that is, if the release date has now been reached). At 202, the forms available for release are gathered. At 203, the communications software is alerted, and the forms are passed in as an input. At 204, the forms are transferred using the telecommunications infrastructure in place to the sites 15 (e.g. the PCs 154 thereat), as defined by the distribution profile. At 205, the receiving site communication software (e.g. OS/2, version 1.2) receives the forms. At 206, upon receipt of the forms, the applications software is alerted for processing of the transmission. The forms are preferably initially stored on disk. Ultimately, at 207, the applications software may direct the electronic forms to be printed at a printer (e.g. 16), to produce a paper form.

Figure 15:
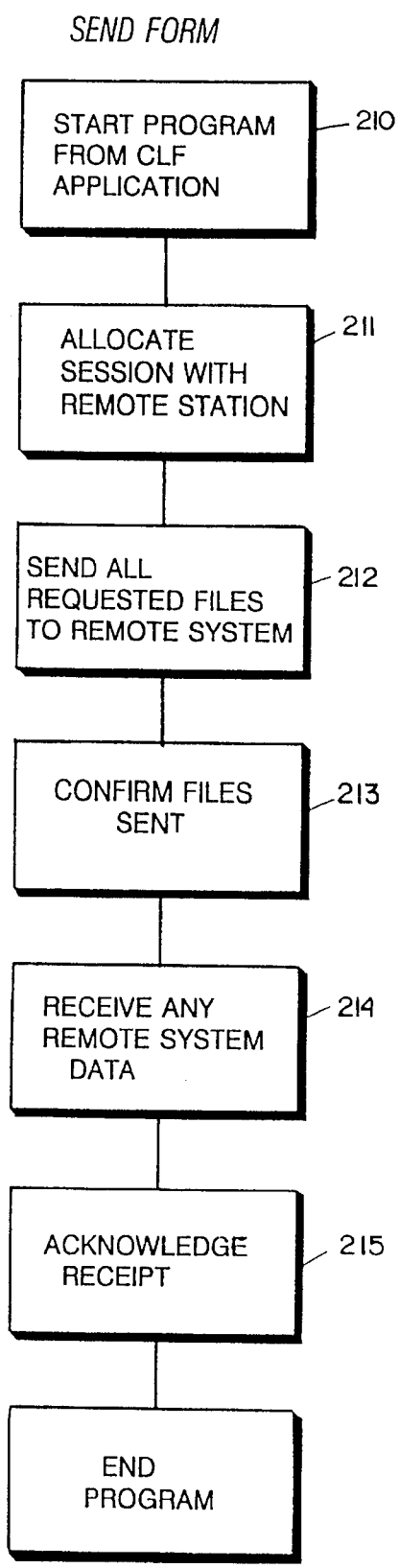
FIG. 15 is an exemplary flow diagram for transmitting an electronic form, initiated at the CLF.

FIG. 15 indicates the general flow for sending a form to one of the geographically remote user locations from the CLF 12. At 210 the program is initiated from the CLF 12 applications file 29. A session with the desired remote station or stations (locations) is allocated at 211, and all requested files are sent at 212. Confirmation that the files have been sent is provided at 213. Any data to be received from the remote location is received at 214, and receipt acknowledged at 215, before the program ends.

Figure 16:
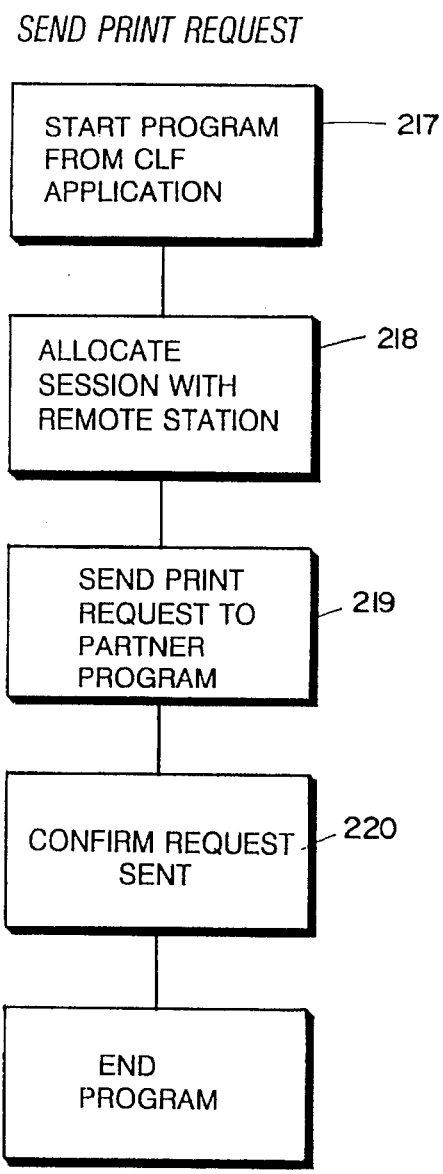
FIG. 16 is an exemplary flow diagram for transmitting a print request, initiated at the CLF.
Figure 35:
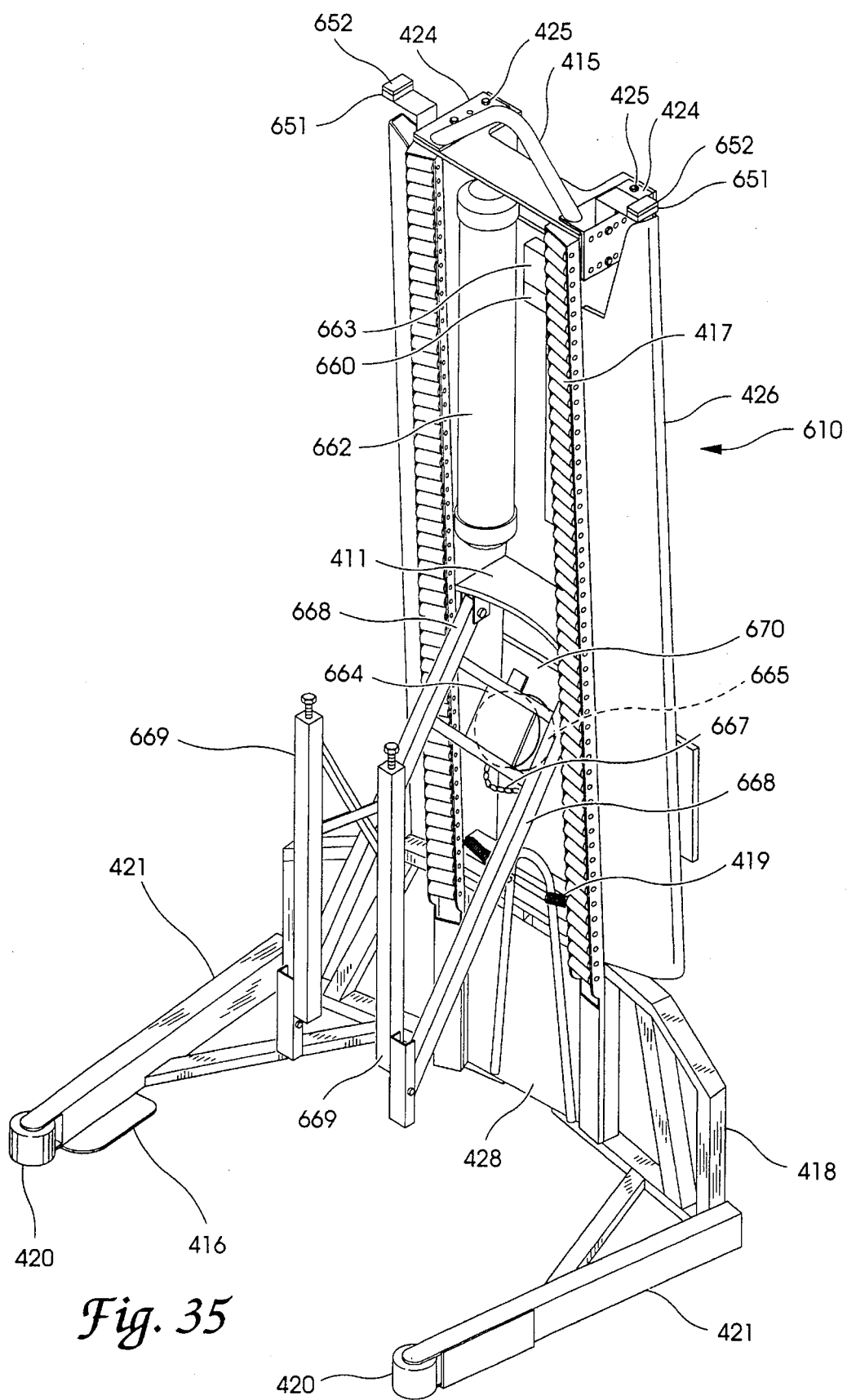
Figure 37:
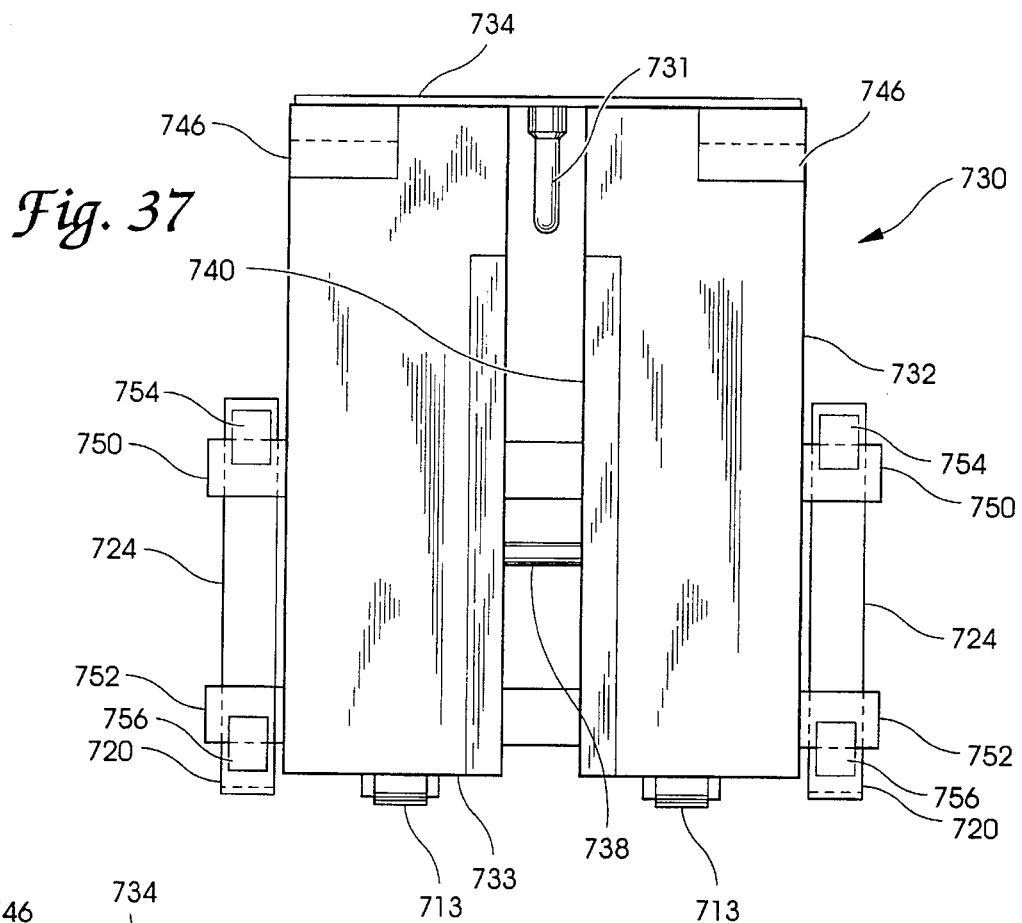
Figure 38:
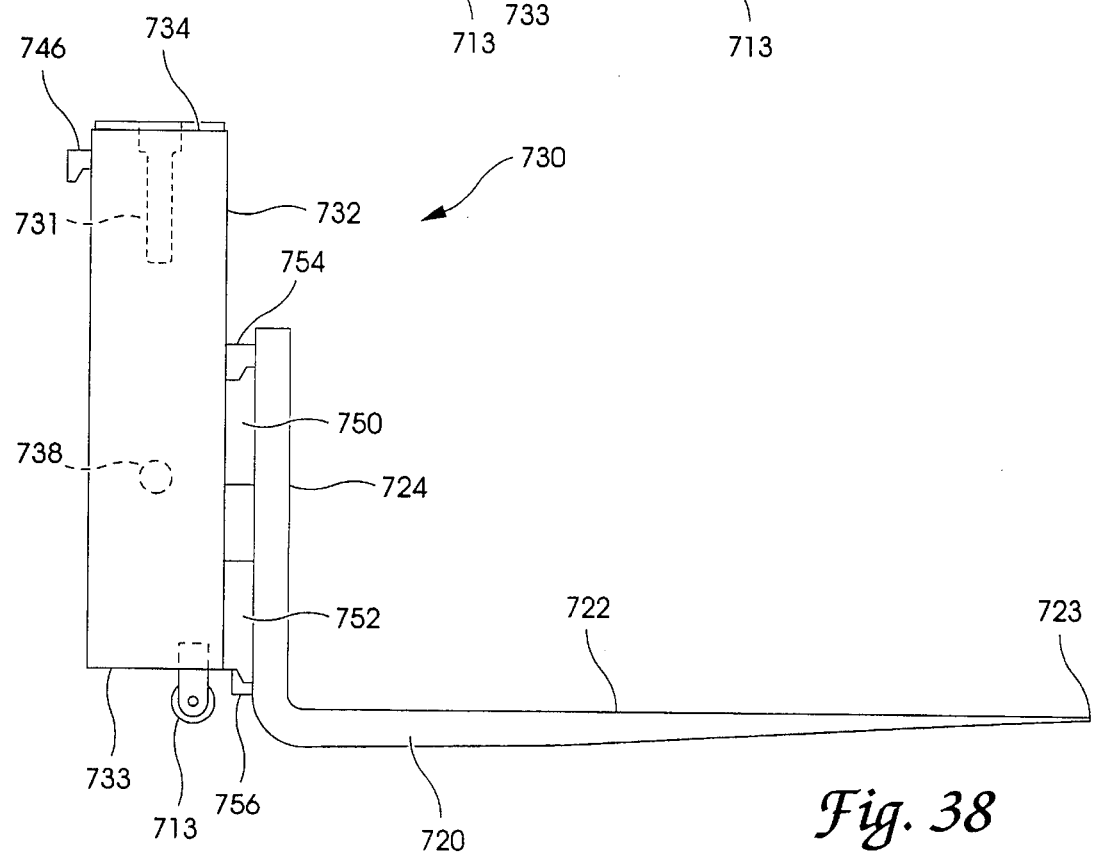
Figure 39:
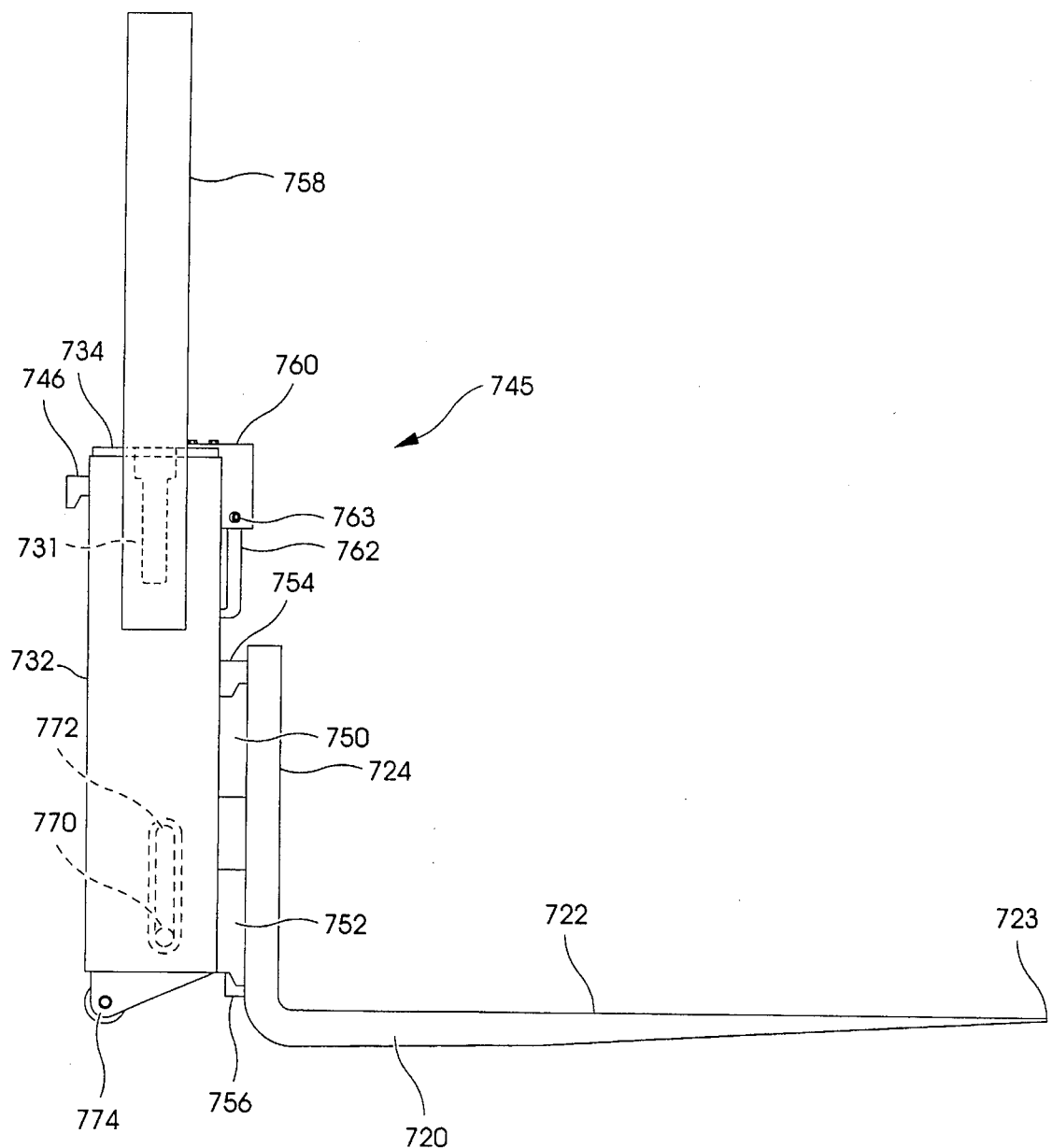
Figure 41:
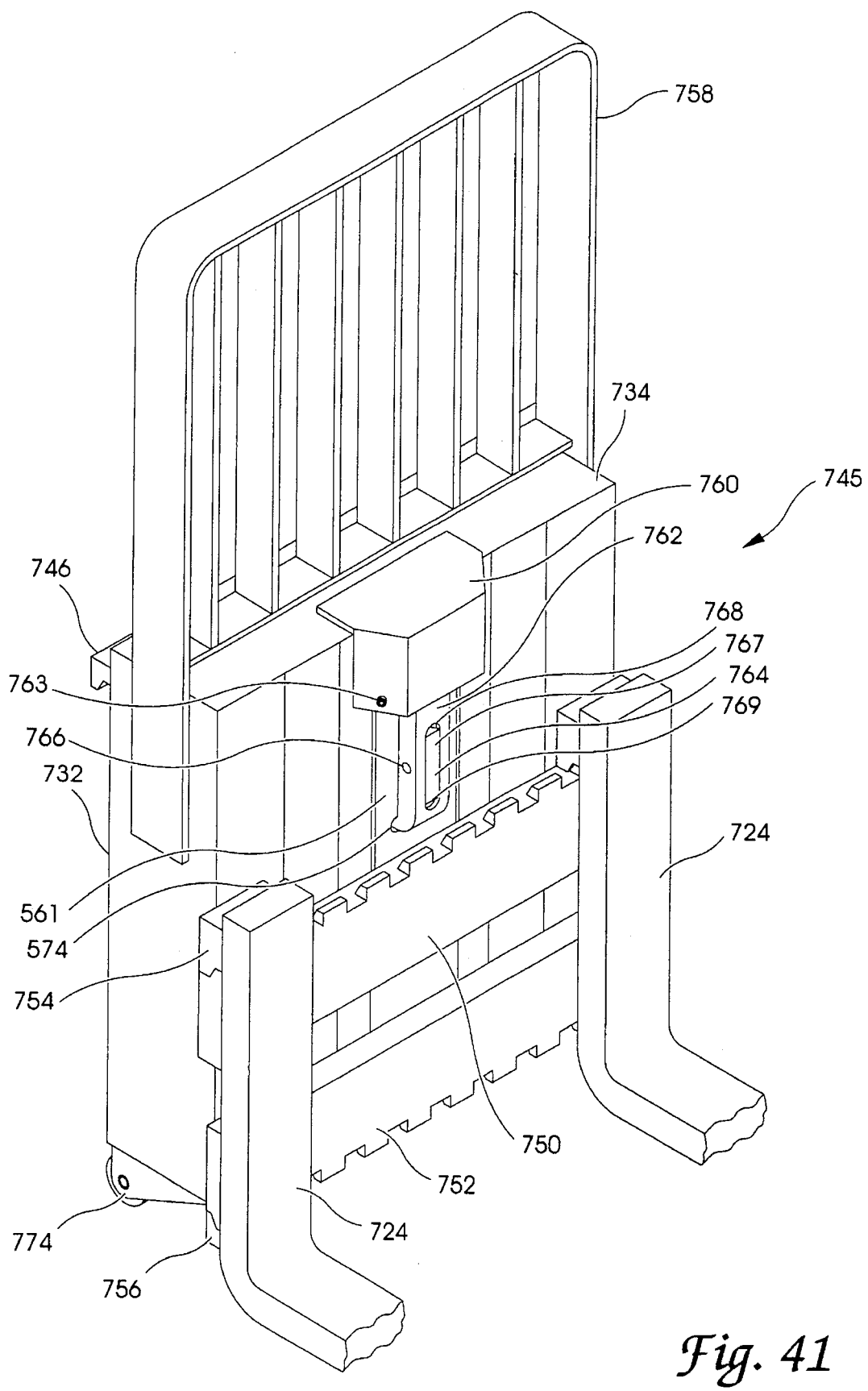

FIG. 16 illustrates the general flow chart for sending a print request from CLF 12 to a remote user location having a printer, e.g. 16, for actually printing the form that was sent according to 210–213. The program is started from the CLF 12 applications software 29 at 217, a session is allocated with the remote location at 218, the print request is sent at 219 to the corresponding software at the remote location, and is confirmed at 220 before the program ends.

It will thus be seen that according to the present invention a system and method have been provided for eliminating or minimizing warehousing, inventory, and obsolescence costs that a customer typically incurs in association with preprinted paper forms. Forms distribution costs are minimized, and the number of preprinted forms can be greatly minimized (for example the number of forms can be dropped from 20,000 to 5,000 in conventional operations). Centralized control is provided for electronic forms design, and the co-existence of a form in electronic and paper media is provided. Labor savings are achieved by eliminating redundant entry and processing of information by providing a centralized system, and where a customer desires, off load processing may be provided from the customer's main frame computer 34 to the vendor's computer (e.g. location of the FAP 14). Based upon geographic location, volume requirements, form construction (e.g. number of parts, MCP, etc.), and equipment profiles, exactly how paper forms will be constructed and delivered to end user sites 15 will be determined.

The system as described above has numerous special applications, and it is impossible within the scope of a patent application to designate all possible uses of the system for particular functions and businesses. However a rough and general description of one particular implementation may serve to illustrate the versatility and functionality of the invention.

A FAP 14 is provided at the vendor's facility, and is used to design electronic and preprinted forms, to control variable data fields for the electronic forms, and to control and directly communicate with the CLF 12 located on the customer's premises. Upon release of new forms or update of existing forms, the CLF populates the forms library containing appropriate form images and updates the appropriate tables with and control information. This file is sent to a software distribution resource in a main frame computer at a centralized location, which is central to a number of geographically remote user locations which it will service. Preferably, a main frame computer utilizes the customer environment; although the forms could be stored in the customer's main frame, if desired. At the scheduled release dates, either automatically, or by operator control or verification at the centralized location, the CLF will effect distribution of the electronic forms to a file server residing in each of the geographically remote user locations.

The forms automation system 10 in this particular example is used to automate the ultimate customer interview process that occurs when new accounts are established at a banking institution, or changes are made to existing accounts. The exact detail of the processing performed during the customer (bank's) interview will determine the forms which are to be printed. For example opening of checking accounts, time deposit accounts, and savings accounts will generate different forms that are ultimately printed. In addition to printing the electronic forms, the forms automation system 10 according to the invention will produce a check list of all forms printed as a result of specific activity on an account, and all forms required to document an interview will be printed immediately at the completion of the interview process so that the bank's customer will have—before he or she leaves the bank—a paper form. Three to five bank customer interviews can take place concurrently and the common data for each will automatically be transferred from one electronic form to the other.

ARGO Bankpro software is downstream of the CLF 12, as an end user interface. The customer data is transferred to the main frame through platform automation support software (PASS), a commercially available system, and at the main frame the data is stored in a CIS software package, provided by Hogan.

The file server in each bank remote user site is networked to other devices in that location, for example by an IBM Lan 1.2. A laser printer will be located in each remote site, such as an HP LASERJET, to provide actual printing at the user location. Different printers can be provided at different locations since the forms creation software at the FAP 14 will format each individual electronic form in whatever formats are necessary to properly print with the various printers at the user locations at which the printers are located. JF MERGE software, from the same manufacturer as the JETFORM forms design package, will reside on the file server, and will be provided to produce the forms, which will be printed as soon as the transaction is completed.

During processing, the customer will store the variable data to be added to the form at a generic data base. At the completion of the transaction/end bank customer interview, the forms automation software will be invoked. Variable data will be extracted from the generic data base and an Ascii file created, which will be used to input to the form merge software (e.g. JF MERGE). The forms required to verify the transaction will be printed, and a check list form to make sure that all necessary steps have been completed will also be printed.

While the implementation described above is practiced with only a few (e.g. five) different forms, it may be expanded to encompass literally thousands of different forms.

While the invention has been described in connection with what is presently considered to be the most practical and preferred embodiment, it is to be understood that the invention is not to be limited to the disclosed embodiment, but on the contrary, is intended to cover various modifications and equivalent arrangements and methods included within the spirit and scope of the appended claims.

What is claimed is:

1. A method of electronically developing, producing, managing, and distributing a plurality of different business forms for an entity having a plurality of geographically remote use locations with different needs for different business forms, comprising the steps of:

(a) at a centralized location, storing the plurality of business forms in electronic format, each form having the following data associated therewith: identification code for the form; word description of the form; software package used to design the form; date of form creation or last revision; number of parts to the form; whether the form has landscape or portrait mode; length of the form; and width of the form;

(b) based upon geographic location, volume requirements, form construction, and equipment profile, determining which of the geographically remote use locations will be provided with business forms in electronic and/or preprinted form, and storing that information at said centralized location; and (c) through electronic scheduling or in response to commands inputted at said centralized location, automatically distributing forms in electronic form, or distributing preprinted forms, from the centralized location to the geographically remote use locations for that particular form, according to the determinations provided in step (b).

2. A method as recited in claim 1 wherein a first of the use locations has a first printer with a first printer format, and wherein a second of the use locations has a second printer utilizing a second printer format different than the first printer format; and wherein step (a) is practiced to store the business forms to be distributed to both the first and second use locations in both the first and second printer formats; and wherein step (c) is practiced to distribute formats in electronic format to the first and second printers, for printing into paper forms at the first and second use locations.

3. A method as recited in claim 2 wherein a plurality of printers are provided at the use locations, and comprising the further step of assigning a unique printer code to each of the printers, and wherein steps (b) and (c) are practiced by transmitting an appropriate printer format electronic form to each selected printer utilizing the unique printer code.

4. A method of electronically creating and managing a plurality of different business forms, utilizing a first computer at a first location, and a second computer at a second location, comprising the steps of:

(a) at the first computer, creating a plurality of business forms in electronic format, including printer formats;

(b) allocating a session with the second computer;

(c) designating business forms for transfer;

(d) electronically transferring the designated forms from the first computer to the second computer;

(e) confirming that the transfer has taken place; and (f) initiating a table population function at the second computer, and confirming when that function has been completed.

5. A system for production of business forms, comprising:

first computer means comprising a forms automation platform means: for establishing each of a plurality of business forms in electronic format; for determining print format information for said forms; and for converting said electronic format to appropriate print formats based upon distribution profile information and print format information, to design a business form in electronic format;

second computer means at each of a plurality of end user sites, and including means for inputting variable information, if any, to be contained in the business forms to be produced;

third computer means comprising a central library means: for processing requests for distribution to effect electronic distribution of forms; and for providing information about print formats and distribution profiles to said second computer means; said third computer means including a display and an inputting means for inputting commands regarding a specific business form or forms requested;

electronic communications means for providing communication between said forms automation platform means and said central library means, and between said central library means and said end user sites; and said third computer means comprising a file comprising customer profile information including an identification uniquely identifying each customer, and address information for the customer; a geographic profile including the customer identification and a unique code for each different geographic location of the customer's facilities; a printer profile file including the customer identification, and a code identifying each printer, and the type of printer, at each geographic location of the customer; a distribution data file including the customer identification, a code to uniquely identify each form for a customer, and the code to uniquely identify each printer; a form profile data file including the customer identification, and the code to identify each form for a customer; and a form output file including the customer identification, and a code to uniquely identify the format of each form of the customer.

6. A system as recited in claim 5 wherein the form output file also includes a code that describes the form type, a code that describes the printer type, a file identification of where the format is stored, and a code to tell if the form is compressed; and wherein the code to identify the format of each form identifies "print ready", "source", or "compiled".

7. A system as recited in claim 5 wherein the form profile data file includes therein a code to uniquely identify each revision of each form, a description of the form, the software package used to design the form, the date the form was created, the number of parts to the form, a code to identify landscape or portrait mode, the length of the form, and the width of the form.

8. A system as recited in claim 5 wherein the printer profile file also includes a description of the printer and printer type, a code of the printer type, and the name of the printer manufacturer.

9. A system as recited in claim 5 wherein the form profile data file is a parent of the form output format file and the distribution data file, and is a dependent of the file containing customer profile information.

10. A system as recited in claim 5 further comprising a user profile file having the customer identification, an indicator which either allows or prevents a user from signing on to the system and a flag to indicate new forms have arrived in the third computer means.

11. A system as recited in claim 5 further comprising a site profile file interrelated with the geographic profile file, and including the customer identification, an identifier to uniquely identify each site for the customer, a description of each site, and a unique code for each different geographic profile used.

12. A system as recited in claim 11 further comprising a corporate profile file having the customer identification, a code for each different corporate profile within a customer, and a plurality of levels in the corporate organization; said corporate profile file being a dependent of the customer profile file, and a parent of the site profile file.

13. A system as recited in claim 5 further comprising a corporate profile file having the customer identification, a code for each different corporate profile within a customer, and a plurality of levels in the corporate organization; said corporate profile file being a dependent of the customer profile file.

14. A system as recited in claim 5 further comprising a form field information file which is a dependent of the form profile data file, and includes the customer identification, the code to uniquely identify a form for a customer, a code to uniquely identify each revision of the form, a sequential number of fields within a form, a description of the length of the field, a description of the field format, and a description of whether the field is numeric, character, or the like.

15. A system for production of business forms, comprising:

first computer means comprising a forms automation platform means: for establishing each of a plurality of business forms in electronic format; for determining print format information for said forms; and for converting said electronic format to appropriate print formats based upon said distribution profile information and print format information, to design a business form in electronic format;

second computer means at each of a plurality of end user sites, including means for inputting variable information, if any, to be contained in the business forms to be produced;

third computer means comprising a central library means: for processing requests for distribution to effect electronic distribution of forms; and for providing information about print formats and distribution profiles to said second computer means, said means including a display and an inputting means for inputting commands regarding the specific business form or forms requested;

communications means for providing communication between said forms automation platform means and said central library means, and between said central library means and said end user sites; and said first computer means having: a customer profile file including an identifier uniquely identifying a customer and a customer's address; a form profile file including the unique customer identifier, a unique identifier of a form for a customer, and physical information about the form; a form file name file including the unique customer identifier and unique identifier for the form, and the type of printer the form is designed for; and a distribution information file including the unique customer identifier, an indicator of whether or not a form has been selected for distribution to said third computer means, the unique form identifier, and the date of distribution of the form.

16. A system as recited in claim 15 wherein said form profile file includes as the form physical information therein; the software on which the form was designed, the width of the form, the length of the form, the number of pages in the form, the number of parts of the form, and the page orientation of the form.

17. A system as recited in claim 16 wherein said form profile file also includes the release status of the form, the system date on which the form was created or revised, and the system date on which the form was last released.

18. A system as recited in claim 16 wherein said form profile file is a dependent of said customer profile file, and a parent to a field description file having the customer identifier, the unique form identifier, the form field length, the form field data type, and the form field data format.

19. A system as recited in claim 15 wherein said distribution information file is not a parent or dependent of other files.

20. A method of distributing business forms to each of a plurality of geographically remote end users, comprising the steps of:

(a) storing in electronic format in a computer a plurality of different business forms;

(b) also storing in the computer predefined commands, including date and extent of distribution commands, relating to the distribution of the electronic business forms;

(c) periodically polling the computer to locate applicable date commands;

(d) identifying forms for distribution in the computer;

(e) establishing a session between the computer and an end user;

(f) transferring the forms electronically from the computer to the end user; and (g) acknowledging receipt of the forms by the end user from the computer.

* * * * *